(12) United States Patent
Silbert et al.

(10) Patent No.: US 12,210,030 B2
(45) Date of Patent: Jan. 28, 2025

(54) RECEPTACLE TRANSPORT SYSTEM FOR AN ANALYTICAL SYSTEM

(71) Applicant: Gen-Probe Incorporated, San Diego, CA (US)

(72) Inventors: Rolf Silbert, Del Mar, CA (US); HongRan Peng, San Diego, CA (US); David Aaron Buse, San Diego, CA (US); David H. Combs, San Diego, CA (US)

(73) Assignee: GEN-PROBE INCORPORATED, San Diego, CA (US)

( * ) Notice: Subject to any disclaimer, the term of this patent is extended or adjusted under 35 U.S.C. 154(b) by 0 days.

(21) Appl. No.: 18/429,318

(22) Filed: Jan. 31, 2024

(65) Prior Publication Data

US 2024/0168044 A1    May 23, 2024

Related U.S. Application Data

(63) Continuation of application No. 17/608,745, filed as application No. PCT/US2020/030481 on Apr. 29, 2020.

(Continued)

(51) Int. Cl.
*G01N 35/04* (2006.01)
*B01L 3/00* (2006.01)
(Continued)

(52) U.S. Cl.
CPC ............ *G01N 35/04* (2013.01); *B01L 3/5453* (2013.01); *B01L 9/06* (2013.01); *B65G 43/08* (2013.01);

(Continued)

(58) Field of Classification Search
None
See application file for complete search history.

(56) References Cited

U.S. PATENT DOCUMENTS 1,589,616 A    6/1926    Alford
3,572,998 A    3/1971    Anthon
(Continued)

FOREIGN PATENT DOCUMENTS

CN    1148892 A    4/1997
CN    1689958 A    11/2005
(Continued)

OTHER PUBLICATIONS

Machine Translation, JP6900268, retrieved Sep. 21, 2024 (Year: 2021).*

(Continued)

*Primary Examiner* — William R Harp
(74) *Attorney, Agent, or Firm* — Rothwell, Figg, Ernst & Manbeck, P.C.; Biju Chandran; Charles B. Cappellari

(57) ABSTRACT

A method of delivering a receptacle to an instrument includes the steps of supporting a receptacle containing a fluid on a carrier, transporting the carrier supporting the receptacle on a conveyor extending adjacent to each of a plurality of instruments, transferring the receptacle from the carrier to a puck supported on a carriage when the carriage is positioned at a first location, moving the carriage with the receptacle seated in the puck from the first location to a second location within an instrument of the plurality of instruments, and drawing at least a portion of the fluid from the receptacle seated in the puck into a tip associated with a fluid extraction device of the instrument when the carriage is positioned at the second location.

13 Claims, 48 Drawing Sheets

Related U.S. Application Data

(60) Provisional application No. 62/951,019, filed on Dec. 20, 2019, provisional application No. 62/842,585, filed on May 3, 2019.

(51) Int. Cl.
  *B01L 9/06* (2006.01)
  *B65G 43/08* (2006.01)
  *B65G 47/90* (2006.01)
  *G01N 35/00* (2006.01)
  *G01N 35/10* (2006.01)

(52) U.S. Cl.
  CPC ..... *B65G 47/902* (2013.01); *G01N 35/00584* (2013.01); *G01N 35/0099* (2013.01); *G01N 35/1079* (2013.01); *B01L 2300/021* (2013.01); *B65G 2201/0235* (2013.01); *B65G 2203/044* (2013.01); *G01N 2035/00752* (2013.01); *G01N 2035/0406* (2013.01); *G01N 2035/0494* (2013.01); *G01N 2035/103* (2013.01)

(56) References Cited

U.S. PATENT DOCUMENTS

| | | |
|---|---|---|
| 4,067,106 A | 1/1978 | Brown et al. |
| 4,178,977 A | 12/1979 | Sur et al. |
| 4,834,944 A | 5/1989 | Wakatake |
| 5,102,599 A | 4/1992 | Shults |
| 5,259,238 A | 11/1993 | Miura et al. |
| 5,269,918 A | 12/1993 | Lapidus et al. |
| 5,350,564 A | 9/1994 | Mazza et al. |
| 5,382,128 A | 1/1995 | Takahashi et al. |
| 5,578,268 A | 11/1996 | Champseix et al. |
| 5,651,941 A | 7/1997 | Stark et al. |
| 5,895,631 A | 4/1999 | Tajima |
| 5,897,090 A | 4/1999 | Smith et al. |
| 5,941,366 A | 8/1999 | Quinlan et al. |
| 6,274,092 B1 | 8/2001 | Itoh |
| 6,843,357 B2 * | 1/2005 | Bybee ............ B65G 37/02 422/65 |
| 6,932,942 B2 | 8/2005 | Itoh |
| 6,938,502 B2 | 9/2005 | Tanoshima et al. |
| 6,984,527 B2 | 1/2006 | Miller |
| 7,207,241 B2 | 4/2007 | Itoh |
| 7,233,838 B2 | 6/2007 | Barry et al. |
| 7,485,264 B2 | 2/2009 | Itoh |
| 7,622,078 B2 | 11/2009 | Pinyol |
| 8,147,778 B2 | 4/2012 | Pedrazzini |
| 8,367,024 B2 | 2/2013 | Itoh |
| 9,114,394 B2 | 8/2015 | Yanez et al. |
| 9,182,419 B2 | 11/2015 | Hecht |
| 9,423,410 B2 | 8/2016 | Buehr |
| 9,636,681 B2 | 5/2017 | Ohga et al. |
| 9,804,181 B2 | 10/2017 | German et al. |
| 9,851,369 B2 | 12/2017 | Reisch et al. |
| 10,041,965 B2 | 8/2018 | Pedrazzini |
| 10,345,205 B2 | 7/2019 | McKeen et al. |
| 10,359,442 B2 | 7/2019 | Kaeppell et al. |
| 10,502,751 B2 | 12/2019 | Jaeggi |
| 10,900,877 B1 | 1/2021 | Pandey et al. |
| 10,948,505 B2 | 3/2021 | Diamond et al. |
| 11,022,620 B2 | 6/2021 | Kluckner et al. |
| 11,073,529 B2 | 7/2021 | Ewoniuk et al. |
| 11,204,360 B2 | 12/2021 | Huber et al. |
| 11,846,644 B2 * | 12/2023 | Walker ............ B65G 47/46 |
| 2002/0040618 A1 | 4/2002 | Dervaes |
| 2002/0074057 A1 | 6/2002 | Rubin |
| 2005/0180896 A1 | 8/2005 | Itoh |
| 2006/0166371 A1 | 7/2006 | Testa et al. |
| 2010/0028214 A1 | 2/2010 | Howard et al. |
| 2012/0085068 A1 | 4/2012 | Cirio |
| 2013/0088031 A1 | 4/2013 | Jones et al. |
| 2014/0086808 A1 | 3/2014 | Itoh |
| 2017/0254827 A1 * | 9/2017 | Walker ............ G01N 35/04 |
| 2018/0052183 A1 | 2/2018 | Takaya et al. |
| 2019/0018027 A1 | 1/2019 | Hoehnel |
| 2019/0033209 A1 | 1/2019 | Kluckner et al. |
| 2019/0049477 A1 | 2/2019 | Muramatsu et al. |
| 2019/0076845 A1 | 3/2019 | Huber et al. |
| 2019/0076846 A1 | 3/2019 | Durco et al. |
| 2019/0101558 A1 | 4/2019 | Kinugawa et al. |
| 2019/0346473 A1 | 11/2019 | Gröhbühl et al. |
| 2020/0200783 A1 | 6/2020 | Durco |
| 2020/0209270 A1 | 7/2020 | Kaeppeli et al. |
| 2020/0278369 A1 | 9/2020 | Walker et al. |
| 2021/0061584 A1 | 3/2021 | Silbert |
| 2022/0349910 A1 | 11/2022 | Silbert et al. |

FOREIGN PATENT DOCUMENTS

| | | |
|---|---|---|
| CN | 102556912 A | 7/2012 |
| CN | 208697454 U | 4/2019 |
| EP | 0090550 A1 | 10/1983 |
| EP | 0414644 A2 | 2/1991 |
| EP | 0 972 744 A2 | 1/2000 |
| EP | 0 825 898 B1 | 7/2003 |
| EP | 2 073 017 A1 | 6/2009 |
| EP | 2 237 046 A2 | 10/2010 |
| EP | 2943422 B1 | 6/2017 |
| EP | 3 373 015 A1 | 9/2018 |
| EP | 3136109 B1 | 1/2019 |
| EP | 3 591 407 A1 | 1/2020 |
| EP | 2612154 B1 | 3/2020 |
| EP | 3 734 279 A1 | 11/2020 |
| EP | 2 613 156 B1 | 3/2021 |
| JP | 04-051393 A | 2/1992 |
| JP | H04-172250 A | 6/1992 |
| JP | H08-240594 A | 9/1996 |
| JP | H09264831 A | 10/1997 |
| JP | H10-325838 A | 12/1998 |
| JP | 11-070831 A | 3/1999 |
| JP | 2000-009737 A | 1/2000 |
| JP | 2002-326025 A | 11/2002 |
| JP | 2005-059833 A | 3/2005 |
| JP | 2008-114653 A | 5/2008 |
| JP | 2010-156716 A | 7/2010 |
| JP | 2010-271204 A | 12/2010 |
| JP | 2012-173251 A | 9/2012 |
| JP | 2013-002937 A | 1/2013 |
| JP | 2014-077772 A | 5/2014 |
| JP | 2014-206443 A | 10/2014 |
| JP | 2018-205316 A | 12/2018 |
| JP | 2019-095259 A | 6/2019 |
| JP | 2019-105509 A | 6/2019 |
| JP | WO2018042915 A1 | 6/2019 |
| JP | 2019-132785 A | 8/2019 |
| JP | 2020-051961 A | 4/2020 |
| JP | 2020-060393 A | 4/2020 |
| JP | 2020-067398 A | 4/2020 |
| JP | 2021-094864 A | 6/2021 |
| JP | 6900268 B2 * | 7/2021 |
| WO | 03/008099 A2 | 1/2003 |
| WO | 2003/091109 A1 | 11/2003 |
| WO | 2005/077547 A1 | 8/2005 |
| WO | 2014/110587 A1 | 7/2014 |
| WO | 2015/036878 A1 | 3/2015 |
| WO | 2017/081412 A1 | 5/2017 |
| WO | 2017143182 A2 | 8/2017 |
| WO | 2017184242 A2 | 10/2017 |
| WO | 2018/017753 A1 | 1/2018 |
| WO | 2018/206841 A1 | 11/2018 |
| WO | 2020/061369 A1 | 3/2020 |
| WO | 2020/135128 A1 | 7/2020 |
| WO | 2020/219869 A1 | 10/2020 |
| WO | 2020/226969 A2 | 11/2020 |
| WO | 2021/007851 A1 | 1/2021 |
| WO | 2021/086719 A1 | 5/2021 |

OTHER PUBLICATIONS

JPO Official Communication, Japanese Patent Application No. 2023-020537, May 15, 2024.

(56) References Cited

OTHER PUBLICATIONS

CIPO Examination Report, Canadian Application No. 3,176,699, Feb. 26, 2024.
International Search Report and Written Opinion dated Oct. 30, 2020 in International Application No. PCT/US2020/030481 (19 pages).
CNIPA, First Office Action, Chinese Patent Application No. 202080031948.7, Mar. 2, 2023.
CNIPA, Search Report, Chinese Patent Application No. 202080031948.7, Feb. 27, 2023.
Non-Final Office Action dated Jun. 13, 2024 in related U.S. Appl. No. 18/489,516 (16 pages).
Non-Final Office Action dated Mar. 28, 2024 in related U.S. Appl. No. 17/608,745 (10 pages).
Ex Parte Quayle dated Jun. 14, 2024 in related U.S. Appl. No. 18/489,478 (7 pages).
EPO Communication pursuant to Rule 164(2)(b) and Article 94(3) EPC, European Application No. 20726646.1, Aug. 10, 2023.
CNIPA, Second Office Action, Chinese Patent Application No. 202080031948.7, Aug. 3, 2023.
CNIPA, Search Report, Chinese Patent Application No. 202080031948.7, Jul. 28, 2023.
JPO Official Communication, Japanese Patent Application No. 2021-564992, Dec. 4, 2023.
Non-Final Office Action issued for U.S. Appl. No. 18/429,170 on Sep. 23, 2024, 9 pages.
Non-Final Office Action issued for U.S. Appl. No. 18/592,344 on Sep. 26, 2024, 12 pages.
Non-Final Office Action issued for U.S. Appl. No. 18/592,371 on Sep. 25, 2024, 18 pages.
Non-Final Office Action issued for U.S. Appl. No. 18/593,529 on Sep. 26, 2024, 10 pages.
Notice of Allowance issued for U.S. Appl. No. 18/489,516 on Sep. 28, 2024, 9 pages.
Examination Report issued for the Australian Patent Application No. 2020268193 dated Nov. 13, 2024, 3 pages.

* cited by examiner

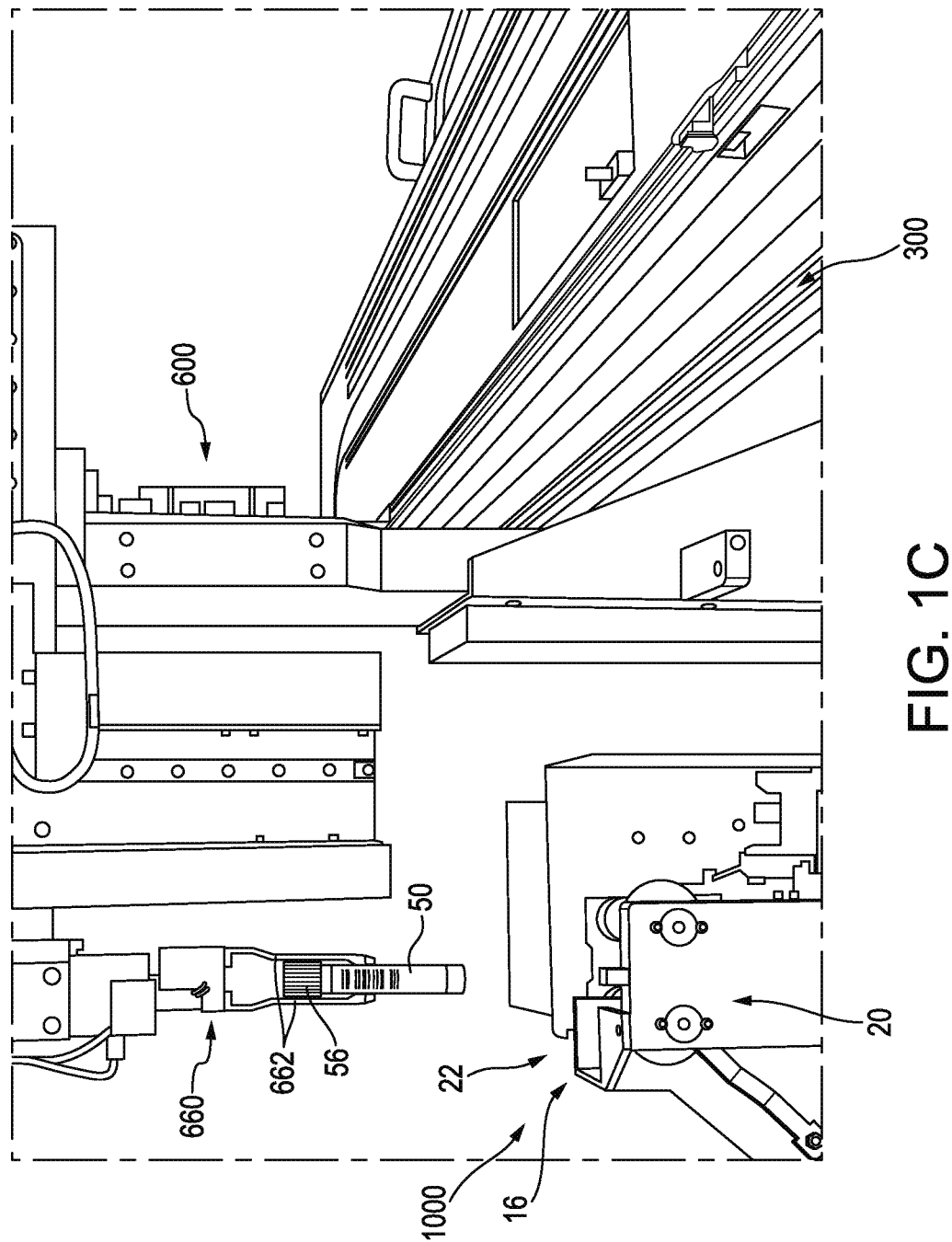

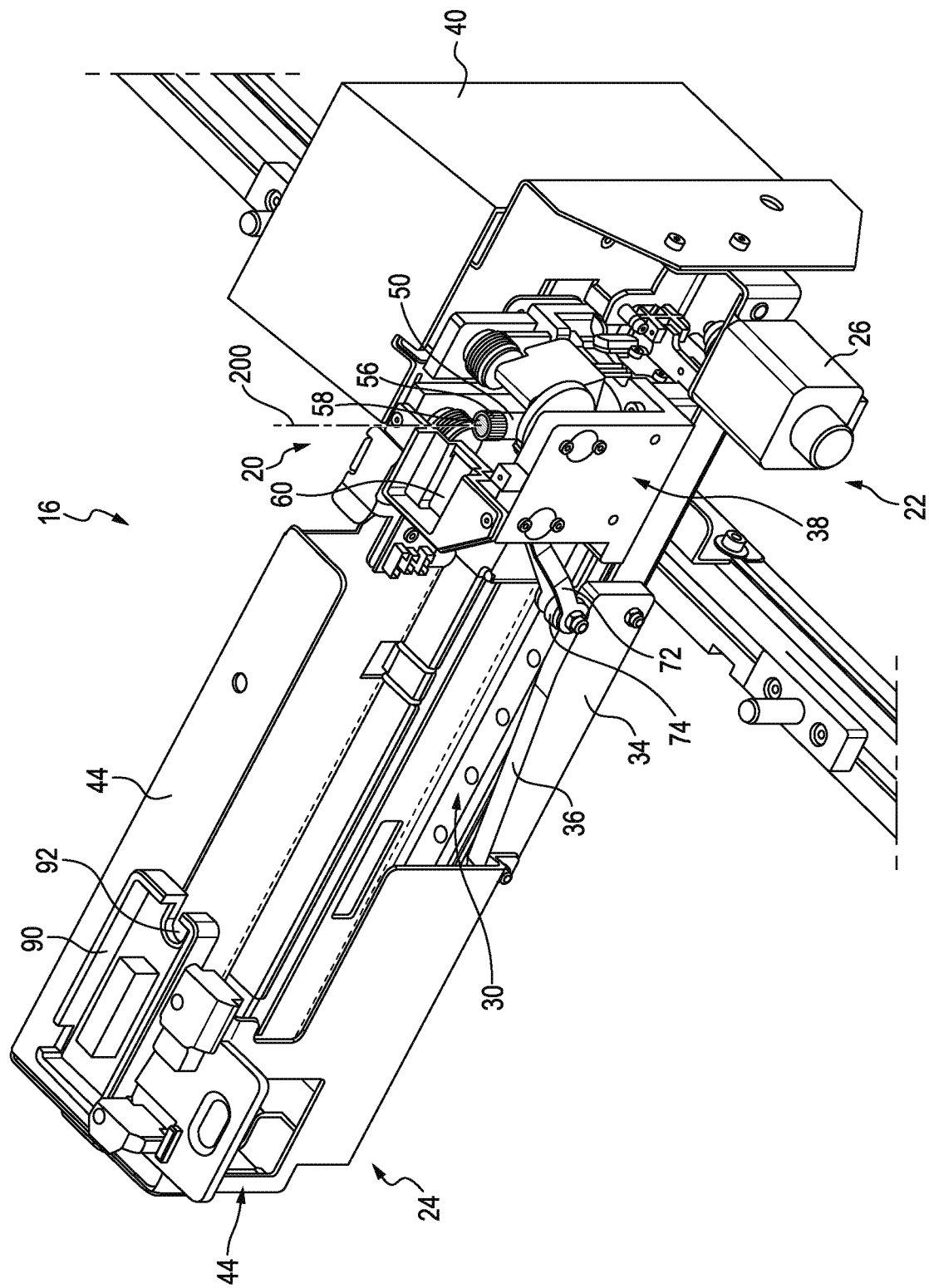

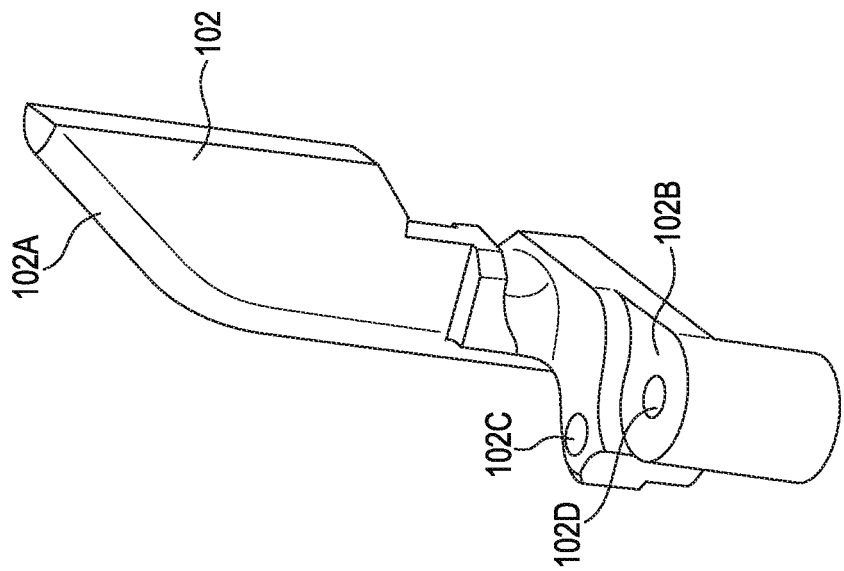
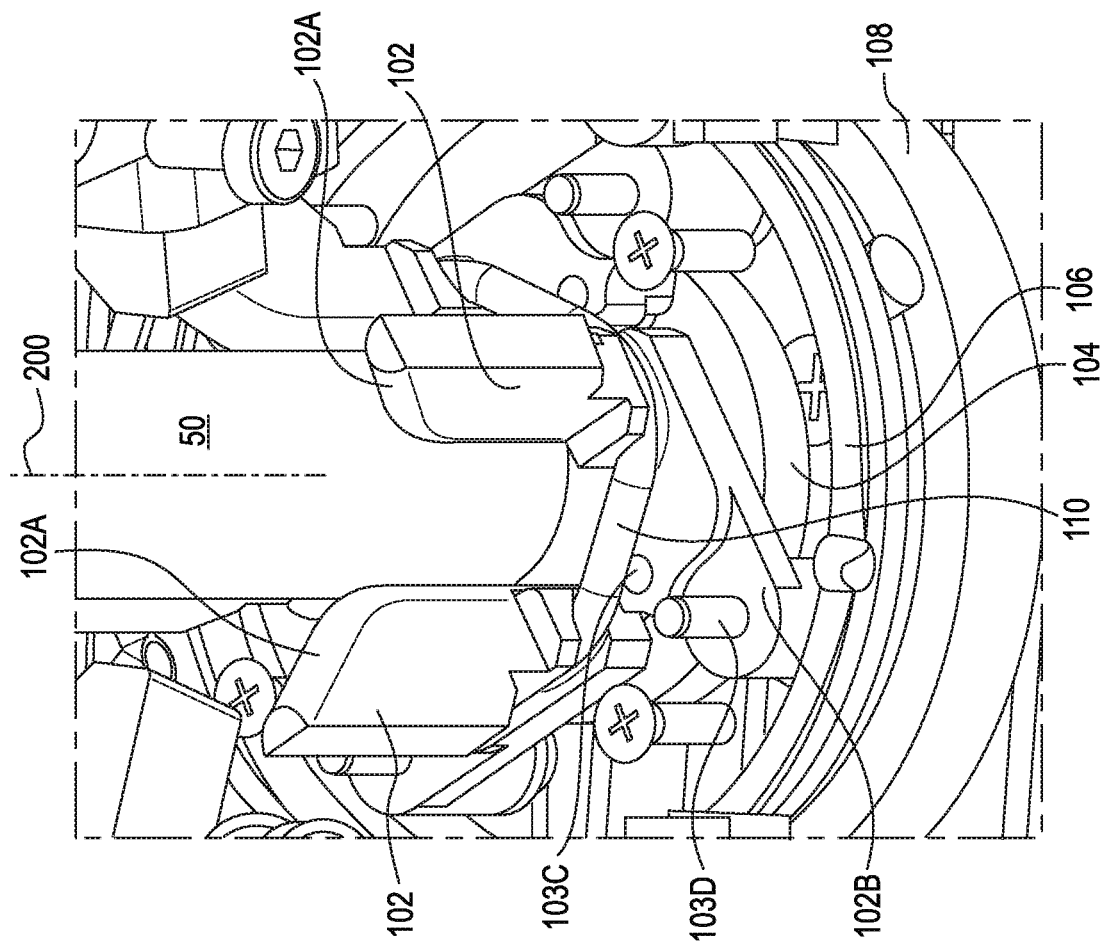
FIG. 5E
FIG. 5D

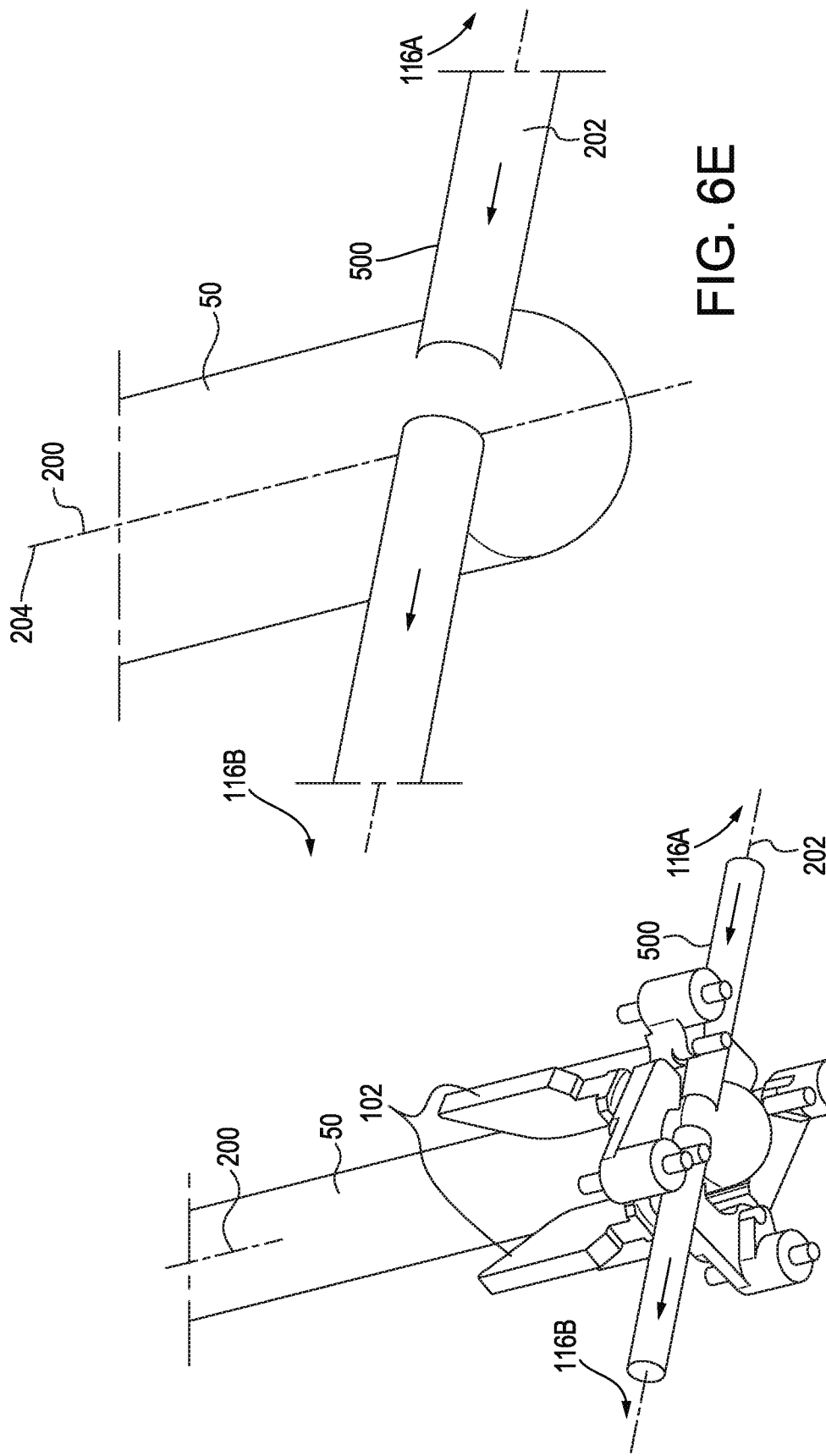

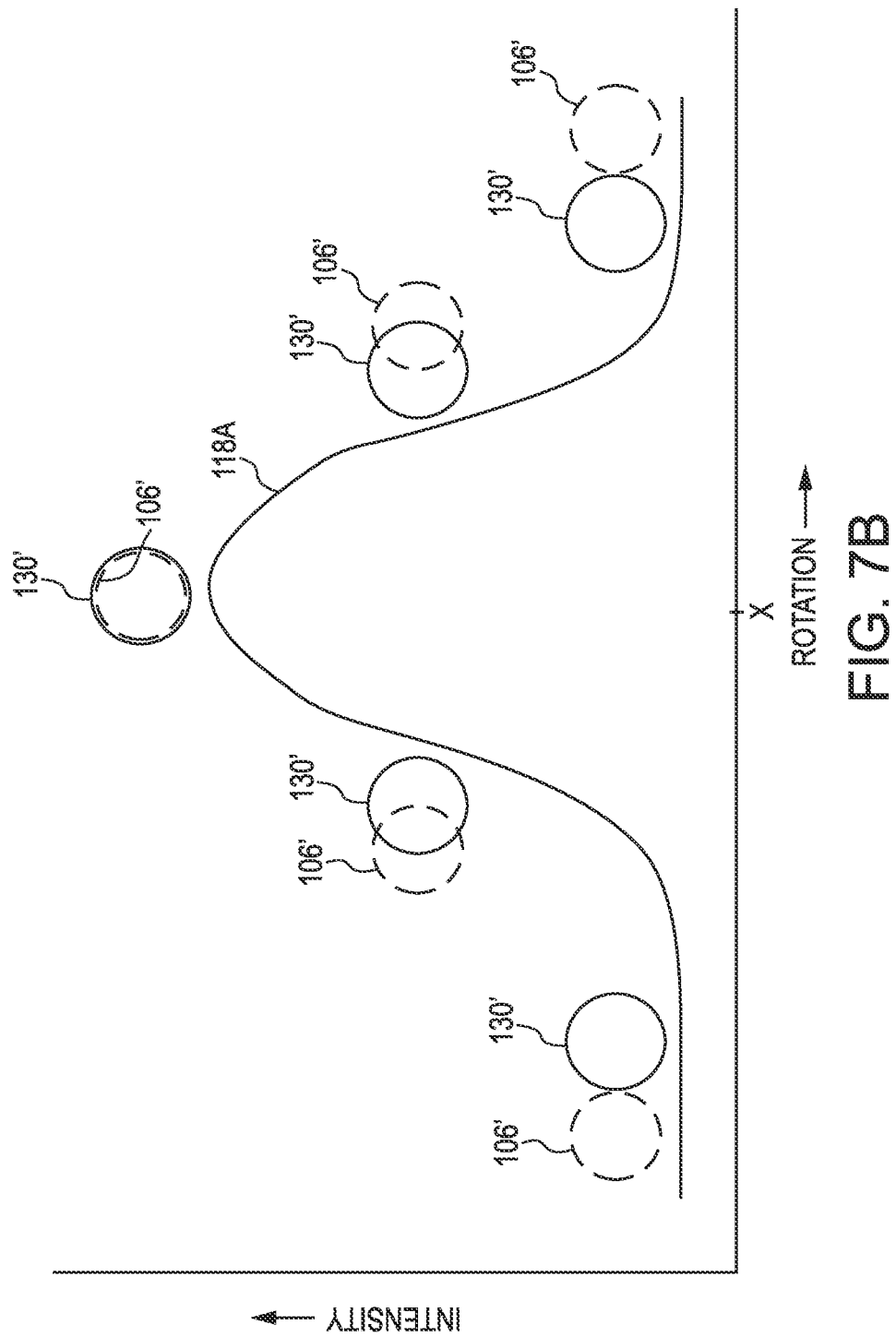

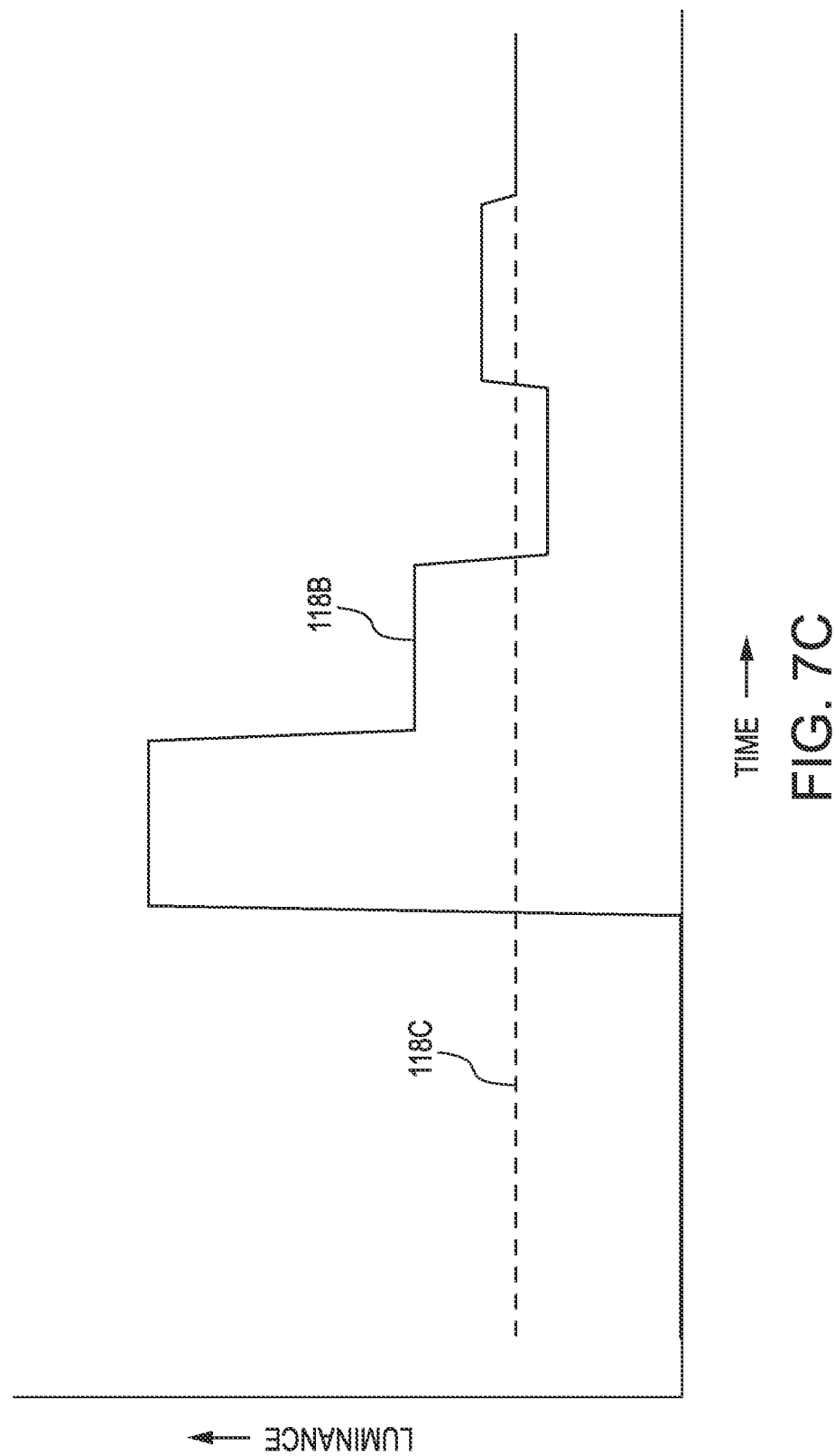

RECEPTACLE TRANSPORT SYSTEM FOR AN ANALYTICAL SYSTEM

CROSS-REFERENCE TO RELATED APPLICATIONS

This application is a continuation claiming the benefit under 35 U.S.C. § 120 of the filing date of U.S. application Ser. No. 17/608,745, filed Nov. 3, 2021, which is a national phase entry pursuant to 35 U.S.C. § 371 of International Application No. PCT/US2020/030481, filed Apr. 29, 2020, which claims the benefit under 35 U.S.C. § 119(e) of the filing date of U.S. Provisional Application No. 62/951,019, filed Dec. 20, 2019, and U.S. Provisional Application No. 62/842,585, filed May 3, 2019, the disclosures of which applications are hereby incorporated by reference.

TECHNICAL FIELD

The present disclosure relates to receptacle transport systems for an analytical system and methods of using the disclosed receptacle transport systems.

BACKGROUND

Laboratories today face increasing pressure to automate their operations to increase throughput and processing consistency, address a shortage of medical technologists, and decrease errors. In some laboratories, a sample transport system, such as a conveyor, may be used to connect instruments within the laboratory, thereby allowing samples provided to a single sample loading area to be automatically and sequentially delivered to multiple instruments without human intervention. Instruments connected in this manner may be used to perform the same or different types of tests.

SUMMARY

In some embodiments, a receptacle delivery system for an instrument is disclosed. The system may include a puck configured to removably support a receptacle therein. The puck may include a plurality of fingers arranged about a vertical axis, one or more springs coupling the plurality of fingers and thereby biasing the plurality of fingers toward the vertical axis, a supporting disc, a synchronization disc, and a retaining ring. Each finger of the plurality of fingers may have a contact surface configured to be in contact with a receptacle seated in the puck. The supporting disc may include (i) a disc sidewall projecting from a base to define a pocket for seating a receptacle, (ii) a plurality of first cavities formed in the base and extending in a direction of the vertical axis, and (iii) a puck passageway extending through opposed portions of the disc sidewall in a direction transverse to and offset from the vertical axis. Each of the plurality of fingers may be rotatably coupled to the supporting disc at a corresponding first cavity of the plurality of first cavities. The synchronization disc may be positioned in the pocket of the supporting disc. Each of the plurality of fingers may be coupled to the synchronization disc such that the contact surfaces of the plurality of fingers move toward and away from the vertical axis in a synchronous manner. And the retaining ring may couple the plurality of fingers, the supporting disc, and the synchronization disc together.

Various embodiments of the disclosed system may, additionally or alternatively, include one of more of the following features: the plurality of fingers may be arranged substantially symmetrically about the vertical axis; at least an upper portion of the contact surface of each finger of the plurality of fingers may be sloped; each finger of the plurality of fingers may include a first end and a second end extending substantially transverse to the first end, the first end may include the contact surface and the second end may include an inner cavity and an outer cavity, and the inner cavity may be positioned closer to the vertical axis than the outer cavity; the synchronization disc may include a plurality of radially extending slots, each finger of the plurality of fingers may be slidably coupled to the synchronization disc by a first pin that extends through a slot of the plurality of radially extending slots and the inner cavity of the finger; each first cavity of the plurality of first cavities of the supporting disc may include a bearing positioned at least partly therein; each finger of the plurality of fingers may be rotatably coupled to the supporting disc by a second pin that extends through the bearing of a first cavity of the plurality of first cavities of the supporting disc and the outer cavity of the finger; one end of each second pin may extend through the bearing and an opposite end of the second pin may extend into a corresponding cavity in the retaining ring; the one or more springs coupling the plurality of fingers may be an O-ring; the O-ring may comprise an elastomeric material; the puck may further include a first bearing positioned on one side of the supporting disc and a second bearing positioned on an opposite side of the supporting disc; the system may further include a holder, the holder may have a central cavity defined by holder sidewalls and a holder passageway extending through the holder sidewalls, the holder passageway may extend in a direction transverse to and offset from the vertical axis, and the puck may be positioned in the central cavity and configured to rotate about the vertical axis relative to the holder; the holder sidewalls may include a first holder sidewall positioned on one side of the central cavity and a second holder sidewall positioned on an opposite side of the central cavity, and the holder passageway may include a first holder passageway portion extending though the first holder sidewall and a second holder passageway portion extending though the second holder sidewall; the system may further include a signal emitter and a signal detector, the signal emitter may be positioned at one end of the holder passageway and the signal detector may be positioned at an opposite end of the holder passageway; and the signal emitter may be coupled to the first holder sidewall and the signal detector may be coupled to the second holder sidewall.

Various embodiments of the disclosed system may, additionally or alternatively, also include one of more of the following features: the puck may be configured to rotate about the vertical axis relative to the holder to bring the puck passageway into alignment with the holder passageway such that a signal from the signal emitter is received by the signal detector when a receptacle is not seated in the puck; the system may further include a first sensor coupled to the holder, the first sensor may be configured to detect when the puck has rotated to a predetermined position in the holder; the first sensor may be a Hall effect sensor; the system may further include an electric motor coupled to the supporting disc of the puck via a belt; the supporting disc of the puck may include a flange projecting from the base in a direction opposite the disc sidewall, and the belt may be engaged with the flange of the supporting disc; the system may further include a label reader configured to read data encoded in a machine-readable label on a receptacle seated in the puck; the label reader may be a barcode reader, and the machine-readable label may be a barcode; the system may further include a carriage configured to move from a first location to a second location of the instrument, and the holder may be coupled to the carriage; the disc sidewall of the puck may include multiple sidewall segments spaced apart from each other and arranged around the pocket, the multiple sidewall segments may include a first sidewall segment positioned on one side of the pocket and a second sidewall segment positioned on an opposite side of the pocket, and the puck passageway may include a first puck passageway portion extending through the first sidewall segment and a second puck passageway portion extending through the second sidewall segment; each first cavity of the plurality of first cavities of the puck may be positioned in a space formed between two adjacent sidewall segments of the multiple sidewall segments; when a receptacle is seated in the puck, the pocket of the supporting disc may receive a bottom portion of the receptacle; the plurality of fingers may consist of four fingers; each of the plurality of fingers may include anodized aluminum; each of the plurality of fingers may include anodized aluminum coated with polytetrafluoroethylene or a fluoropolymer; the one or more springs may couple the plurality of fingers together such that, when a receptacle is inserted in a space between the contact surfaces of the plurality of fingers, the one or more springs stretch to allow the contact surfaces to move away from the vertical axis and increase the space between the contact surfaces; a longitudinal axis of the puck passageway may be offset from the vertical axis; and the longitudinal axis of the puck passageway may be offset from the vertical axis by a distance of from about 3 mm to about 6 mm. In some embodiments, a receptacle delivery system for an instrument is disclosed. The disclosed system may include a carriage supporting a puck. The carriage may be configured to move with the puck from a first location to a second location within an instrument of the plurality of instruments. The first location may be a location where a receptacle supported by the carrier is configured to be transferred to the puck supported by the carriage. And, the second location may be a location where fluid from the receptacle seated in the puck is configured to be drawn into a tip associated with a fluid extraction device of the instrument.

Various embodiments of the disclosed system may, additionally or alternatively, include one or more of the following features: the puck may be configured to rotate relative to the carriage about a vertical axis of the puck; the system may further include a label reader configured to read information encoded in a machine-readable label on the receptacle seated in the puck when the carriage is positioned at the first location; the system may further include a sensing system coupled to the carriage, the sensing system may be configured to determine whether a receptacle is seated in the puck; the sensing system may be configured to detect (a) whether a longitudinal axis of a receptacle seated in the puck is inclined with respect to a vertical axis of the puck, and/or (b) whether a receptacle seated in the puck is inserted to a desired depth; the puck may include a first passageway that extends transverse to and is offset from a vertical axis of the puck, and the carriage may include a second passageway that extends transverse to and is offset from the vertical axis of the puck; the sensing system may include a signal emitter and a signal detector, and when the first and second passageways are aligned, the signal detector may be configured to receive a signal from the signal emitter through the aligned first and second passageways; the signal emitter may be an optical emitter, the signal detector may be an optical detector, and the signal may be an optical beam; the system may further include a conveyor extending adjacent to each of a plurality of instruments; the system may further include a carrier configured to support a receptacle containing a fluid and move on the conveyor while the receptacle is supported by the carrier; the system may further include a pick and place device configured to transfer a receptacle from the carrier to the puck; the system may further include a rail, and the carriage may be configured to move on the rail from the first location to the second location; the system may further include a first electric motor operatively coupled to the carriage and configured to move the carriage from the first location to the second location; the fluid extraction device may be a pipettor; the carriage may further include a support mechanism configured to selectively apply a force on the receptacle when the carriage is positioned at the second location to prevent extraction of the receptacle from the puck, when the tip associated with the fluid extraction device is withdrawn from the receptacle; the puck may include a plurality of spring-loaded members configured to removably support the receptacle therebetween.

In some embodiments, a method of delivering a receptacle to an instrument is disclosed. The method may include supporting a receptacle containing a fluid on a carrier, transporting the carrier supporting the receptacle on a conveyor extending adjacent to each of a plurality of instruments, transferring the receptacle from the carrier to a puck supported on a carriage when the carriage is positioned at a first location, moving the carriage with the receptacle seated in the puck from the first location to a second location within an instrument of the plurality of instruments, and drawing at least a portion of the fluid from the receptacle seated in the puck into a tip associated with a fluid extraction device of the instrument when the carriage is positioned at the second location.

Various embodiments of the disclosed method may, additionally or alternatively, include one or more of the following features: rotating the puck relative to the carriage about a vertical axis of the puck; using a label reader to read information encoded in a machine-readable label on the receptacle seated in the puck when the carriage is positioned at the first location; determining if the receptacle is seated in the puck; if it is determined that the receptacle is seated in the puck, then using a sensing system to detect (a) whether a longitudinal axis of the receptacle seated in the puck is inclined with respect to a vertical axis of the puck, and/or (b) whether the receptacle seated in the puck is inserted to a desired depth; the puck may include a first passageway that extends transverse to and is offset from a vertical axis of the puck, and the carriage may include a second passageway that extends transverse to and is offset from the vertical axis of the puck, and using the sensing system may include rotating the puck to align the first and second passageways; the sensing system may include a signal emitter and a signal detector, and when the first and second passageways are aligned, the signal detector may be configured to receive a signal from the signal emitter through the aligned first and second passageways when a receptacle is not seated in the puck; the signal emitter may be an optical emitter, the signal detector may be an optical detector, and the signal may be an optical beam; transferring the receptacle from the carrier to the puck may be performed with a pick and place device having a plurality of arms for releasably grasping the receptacle; moving the carriage may include operating an electric motor to move the carriage on a rail from the first location to the second location; the fluid extraction device may be a pipettor; the method may further include selectively applying a force on the receptacle when the carriage is positioned at the second location, and the force is not applied to the receptacle when the carriage is positioned at the first location; and transferring the receptacle from the carrier to the puck may include removably supporting the receptacle between a plurality of spring-loaded members of the puck.

In some embodiments, a receptacle delivery system for an instrument is disclosed. The disclosed system may include a carriage configured to move from a first location to a second location, a puck coupled to the carriage, and a receptacle clamping mechanism. The puck may be configured to removably support a receptacle therein. The receptacle clamping mechanism may include a pair of opposed support pads configured to be (a) in contact with a receptacle seated in the puck when the carriage is positioned at the second location, and (b) separated from the receptacle when the carriage is positioned at the first location.

Various embodiments of the disclosed system may, additionally or alternatively, include one or more of the following features: the pair of support pads may be configured to move toward each other as the carriage moves from the first location to the second location and move away from each other as the carriage moves from the second location to the first location; a pair of meshed gears coupled to the pair of support pads, wherein, when the carriage moves from the first location to the second location, the pair of meshed gears rotate in opposite directions relative to each other to move the pair of support pads toward each other; a pair of actuator arms, wherein each actuator arm of the pair of actuator arms may be coupled at one end to a different support pad of the pair of support pads and coupled at an opposite end to a different gear of the pair of meshed gears; a cam arm, wherein one end of the cam arm may be coupled to a gear of the pair of meshed gears and an opposite end of the cam arm may be configured to move on a downwardly inclined path when the carriage moves from the first location to the second location; the opposite end of the cam arm may include a roller configured to roll on the inclined path when the carriage moves from the first location to the second location; (a) a cam arm having a first end coupled to a first gear of the pair of meshed gears and a second end opposite the first end and (b) a ramp having an inclined surface extending substantially parallel to a path of the carriage from the first location to the second location, wherein when the carriage moves along the path between the first and second locations, the second end of the cam arm may move along the inclined surface to rotate the first gear; a cam arm configured to (a) rotate a first gear of the pair of meshed gears in a first direction and a second gear of the pair of meshed gears in a second direction opposite the first direction when the carriage moves from the first location to the second location, and (b) rotate the first gear in the second direction and the second gear in the first direction when the carriage moves from the second location to the first location; and each support pad of the pair of support pads may include a contoured surface, and wherein the support pads face each other.

Various embodiments of the disclosed system may, additionally or alternatively, also include one or more of the following features: each support pad of the pair of support pads may include a substantially V-shaped groove, and wherein the support pads face each other; each support pad of the pair of support pads may include an elastomer; the elastomer may be selected from the group consisting of silicone, EPDM (ethylene propylene diene monomer), and rubber; the receptacle clamping mechanism may further include one or more springs configured to bias the pair of support pads away from each other when the carriage is positioned at the first location; the pair of support pads may be configured to apply a clamping force to the receptacle when the carriage is positioned at the second location and not to apply a clamping force to the receptacle when the carriage is positioned at the first location; the pair of support pads may be configured to apply a clamping force of from about 10N to about 30N to the receptacle when the carriage is positioned at the second location; a first electric motor may be operatively coupled to the carriage and configured to move the carriage between the first location and the second location; a second electric motor may be operatively coupled to the puck and configured to rotate the puck in the carriage when the carriage is positioned at the first location; the carriage may further include a sensor configured to detect when the puck has rotated to a predetermined position in the carriage; the sensor may be a Hall effect sensor; a sensing system configured to detect whether a receptacle is seated in the puck; the puck may include a first passageway that extends transverse to and is offset from a vertical axis of the puck; a sensing system may be configured to detect (a) whether a longitudinal axis of a receptacle seated in the puck is inclined with respect to the vertical axis of the puck, and/or (b) whether a receptacle seated in the puck is inserted to a desired depth in the puck; the puck may be rotatably supported in a housing of the carriage, and the housing may include a second passageway that extends transverse to and is offset from the vertical axis of the puck; and the sensing system may include a signal emitter and a signal detector, and wherein when the first and second passageways are aligned, the signal detector may be configured to receive a signal from the signal emitter through the aligned first and second passageways when a receptacle is not seated in the puck.

Various embodiments of the disclosed system may, additionally or alternatively, include one or more of the following features: the signal emitter may be an optical emitter, the signal detector may be an optical detector, and the signal may be an optical beam; when the first and second passageways are aligned, (a) the optical emitter may be configured to direct the optical beam on an incident area on an external surface of a receptacle seated in the puck and (b) the optical detector may be configured to receive at least a portion of the optical beam from the optical emitter if a receptacle is not seated in the puck, wherein if the receptacle is properly seated in the puck, the incident area is offset from a longitudinal axis of the receptacle; if a receptacle is properly seated in the puck, the incident area may be offset from the longitudinal axis of the receptacle by a distance from about 3 mm to about 6 mm; if a receptacle is properly seated in the puck, the incident area is offset from a base of the receptacle by a distance from about 3 mm to about 8 mm; the signal emitter and the signal detector may be coupled to the carriage; a first shelf may be attached to the carriage and a second shelf may be positioned at the second location, wherein when the carriage is positioned at the second location, the first shelf may be positioned below the second shelf; when the carriage is positioned at the second location, a vertical clearance between the first shelf and the second shelf may be from about 1 mm to about 6 mm; the second shelf may define a first opening, and wherein when the carriage is positioned at the second location, the first opening may be aligned with a receptacle seated in the puck, such that a tip associated with a fluid extraction device of the instrument is moveable through the first opening and into the receptacle; the first opening may be an inwardly extending recess defined by a side wall of the second shelf; a label reader configured to read information encoded in a machine-readable label on the receptacle when the carriage is positioned at the first location; a rail, wherein the carriage is configured to move on the rail between the first and second locations; a pick-and-place device configured to transfer a receptacle to the puck from a location outside the instrument; the pick-and-place device may be configured to transfer a receptacle to the puck from a receptacle carrier supported on a receptacle delivery conveyor, wherein the receptacle delivery conveyor is configured to transport the receptacle carrier supporting the receptacle to locations adjacent multiple instruments; the puck may include a plurality of spring-loaded members configured to removably support a receptacle therebetween.

In some embodiments, a method of delivering a receptacle to an instrument is disclosed. The method may include supporting a receptacle in a carriage, activating an electric motor to move the carriage between a first location and a second location of the instrument while the receptacle is supported by the carriage, applying a clamping force to the receptacle as the carriage moves from the first location to the second location, and releasing the clamping force from the receptacle as the carriage moves from the second location to the first location. In some embodiments, applying a clamping force to the receptacle as the carriage moves from the first location to the second location means that the clamping force is applied to receptacle when the carriage is in the process of moving from the first to second location. Similarly, in some embodiments, releasing the clamping force from the receptacle as the carriage moves from the second location to the first location means that the clamping force is released from the receptacle when the carriage is in the process of moving from the second to the first location.

Various embodiments of the disclosed method may, additionally or alternatively, include one or more of the following features: applying the clamping force may include applying a force of from about 10N to about 30N to the receptacle; applying the clamping force to the receptacle may include moving a pair of support pads into contact with the receptacle as the carriage moves from the first location to the second location; releasing the clamping force may include moving the pair of contact pads away from the receptacle as the carriage moves from the second location to the first location; applying the clamping force and releasing the clamping force may each include rotating a pair of meshed gears coupled to the pair of support pads in opposite directions relative to each other as the carriage moves between the first and second locations; rotating the pair of meshed gears may include (a) rotating a first gear of the pair of meshed gears in a first direction and a second gear of the pair of meshed gears in a second direction opposite the first direction when the carriage moves from the first location to the second location, and (b) rotating the first gear in the second direction and the second gear in the first direction when the carriage moves from the second location to the first location; rotating the pair of meshed gears may include (a) moving a first end of a cam arm on a downwardly inclined path when the carriage moves from the first location to the second location and (b) moving the first end on an upwardly inclined surface when the carriage moves from the second location to the first location, wherein a second end of the cam arm is coupled to a gear of the pair of meshed gears; supporting the receptacle in the carriage may include removably supporting the receptacle in a rotatable puck positioned in the carriage; removably supporting the receptacle may include positioning the receptacle between a plurality of spring-loaded members of the puck, and the method may further include transferring the receptacle to the puck from a receptacle delivery system using a pick-and-place device; the electric motor may be a first electric motor, and the method may further include activating a second electric motor to rotate the puck in the carriage when the carriage is positioned at the first location; the method may further include using a sensor to detect when the puck has rotated to a predetermined position in the carriage; and using a label reader to read information encoded in a machine-readable label on the receptacle as the puck is rotating; using a sensing system associated with the carriage to detect (a) whether a longitudinal axis of the receptacle supported by the puck is inclined with respect to a vertical axis of the puck, and/or (b) whether the receptacle supported by the puck is inserted to a desired depth in the puck; the puck may be rotatably supported in a housing of the carriage, wherein the puck includes a first passageway that extends transverse to a vertical axis of the puck, and the housing includes a second passageway that extends transverse to the vertical axis of the puck.

Various embodiments of the disclosed method may, additionally or alternatively, include one or more of the following features: the sensing system may include a signal emitter and a signal detector, wherein when the first and second passageways are aligned, the signal detector may be configured to receive a signal from the signal emitter through the aligned first and second passageways when a receptacle is not seated in the puck; the signal emitter may be an optical emitter, the signal detector may be an optical detector, and the signal is an optical beam; using the sensing system may include directing the optical beam from the optical emitter toward the optical detector, wherein the receptacle seated in the puck is at least partially positioned between the optical emitter and the optical detector, and determining what portion of the optical beam, if any, is received by the optical detector; directing the optical beam may include directing at least a portion of the optical beam on an incident area of an external surface of the receptacle seated in the puck; when the receptacle is properly seated in the puck, the incident area may be offset from the vertical axis of the puck by a distance of from about 3 mm to about 6 mm; when the receptacle is properly seated in the puck, the incident area may be offset from the base of the receptacle by a distance of from about 3 mm to about 8 mm; activating the electric motor may include positioning the carriage at the second location such that a first shelf attached to the carriage is positioned below a second shelf coupled to the instrument and positioned at the second location; the second shelf may be removably coupled to the instrument at the second location; when the carriage is positioned at the second location, the first shelf may be vertically spaced apart from the second shelf by a distance from about 1 mm to about 6 mm; positioning the carriage at the second location may include positioning the carriage such that a first opening formed in the second shelf is positioned above, and aligned with, the receptacle, and the method may further include directing a tip associated with a fluid extraction device of the instrument through the first opening and into the receptacle, thereby contacting a fluid contained in the receptacle; and aspirating an aliquot of the fluid into the tip; after aspirating the aliquot of the fluid into the tip, removing the tip from the receptacle to a position above the first opening; the receptacle may include a pierceable cap that covers an opening of the receptacle, and wherein (i) directing the tip into the receptacle may include piercing the cap with the tip, and (ii) removing the tip from the receptacle may include moving the tip through the pierced cap.

Various embodiments of the disclosed method may, additionally or alternatively, include one or more of the following features: after removing the tip from the receptacle, moving the tip to a position above a top surface of the second shelf; after moving the tip to the position above the top surface of the second shelf, lowering the tip to a distance of from about 1 mm to about 5 mm from the top surface of the shelf; after moving the tip to the position above the top surface of the second shelf, moving the tip to trace a predefined path along the surface of the second shelf after the lowering; moving the tip to trace the predefined path comprises moving the tip around an upwardly extending projection on the top surface of the second shelf; after moving the tip to trace the predefined path, removing the tip from above the top surface of the second shelf through a second opening formed in a sidewall of the second shelf; removing the tip from above the top surface of the second shelf may include moving the tip through the second opening without changing a vertical position of the tip above the surface; a portion of the fluid is suspended from the tip when removing the tip from the receptacle, and wherein at least a portion of the fluid suspended from the tip is deposited onto the top surface of the second shelf while moving the tip to trace the path; after moving the tip to the position above the top surface of the second shelf, a portion of the fluid suspended from the tip when removing the tip from the receptacle is suspended from the second shelf beneath the first opening; activating the electric motor may further include moving the carriage from the second location to the first location after moving the tip to trace the predefined path, thereby cleaving at least a portion of the fluid suspended from the second shelf and depositing the cleaved fluid on a top surface of the first shelf; decoupling the second shelf from the instrument; removing at least a portion of the fluid deposited on the top surface of the second shelf after decoupling the second shelf from the instrument; coupling the second shelf to the instrument after removing at least a portion of the fluid deposited on the top surface of the second shelf; and removing at least a portion of the fluid deposited on the top surface of the first shelf after moving the carriage from the second location to the first location.

In some embodiments, a receptacle delivery system for an instrument is disclosed. The disclosed system may include a carriage, a puck rotatably supported by the carriage, a first electric motor configured to move the carriage between a first location and a second location of the instrument, and a second electric motor configured to rotate the puck about the vertical axis. The puck may include a plurality of spring-loaded fingers arranged around a vertical axis and configured to removably support a receptacle therebetween.

Various embodiments of the disclosed system may, additionally or alternatively, include one or more of the following features: an O-ring biases the plurality of fingers toward the vertical axis of the puck; the O-ring may be comprised of an elastomer; the elastomer may be selected from the group consisting of silicone, EPDM (ethylene propylene diene monomer), and rubber; each finger of the plurality of fingers may include a top portion that is configured to contact the receptacle and a base portion that extends substantially transverse to the top portion, the base portion of each finger may be rotatably coupled to a supporting disc of the puck at a pivot point; the base portion of each finger of the plurality of fingers may be configured to rotate about the associated pivot point; the top portion of each finger of the plurality of fingers may include an inclined surface, and the inclined surfaces of the plurality of fingers may be arranged in a funnel-like configuration with respect to the vertical axis; the plurality of fingers may include four equally spaced-apart fingers; each of the plurality of fingers may include anodized aluminum at least partially coated with PTFE (polytetrafluoroethylene); a sensor configured to detect when the puck has rotated to a predetermined position in the carriage; the sensor may be a Hall effect sensor; a sensing system may be configured to detect whether a receptacle is seated in the puck; the puck may include a first passageway that extends transverse to and is offset from the vertical axis of the puck; a sensing system may be configured to detect (a) whether a longitudinal axis of a receptacle seated in the puck is inclined with respect to the vertical axis of the puck, and/or (b) whether a receptacle seated in the puck is insert to a desired depth in the puck; the puck may be rotatably supported in a housing of the carriage, and the housing may include a second passageway that extends transverse to and is offset from the vertical axis of the puck; the sensing system may include a signal emitter and a signal detector, and when the first and second passageways are aligned, the signal detector may be configured to receive a signal from the signal emitter through the aligned first and second passageways when a receptacle is not seated in the puck; the signal emitter may be an optical emitter, the signal detector may be an optical detector, and the signal may be an optical beam; and when the first and second passageways are aligned, (a) the optical emitter may be configured to direct the optical beam on an incident area on an external surface of a receptacle seated in the puck and (b) the optical detector may be configured to receive at least a portion of the optical beam from the optical emitter if a receptacle is not seated in the puck, wherein if the receptacle is properly seated in the puck, the incident area may be offset from a longitudinal axis of the receptacle; when a receptacle is properly seated in the puck, the incident area may be offset from the vertical axis of the puck by a distance from about 3 mm to about 6 mm; when a receptacle is properly seated in the puck, the incident area may be offset from a base of the receptacle by a distance from about 3 mm to about 8 mm; the signal emitter and the signal detector may be coupled to the carriage.

In some embodiments, a receptacle delivery system for an instrument is disclosed. The disclosed system may include a carriage configured to move on a rail from a first location to a second location of the instrument. The carriage may include a bracket having opposed first and second sidewalls and a base extending between the first and second sidewalls. The carriage may be configured to support a receptacle. The carriage may also include a pair of opposed support pads and a pair of meshed cam gears rotatably coupled to the first sidewall. The pair of support pads may be configured to (a) move toward a receptacle supported by the carriage as the carriage moves from the first location toward the second location, and (b) move away from a receptacle supported by the carriage as the carriage moves from the second location toward the first location. And, each cam gear of the pair of meshed cam gears may be coupled to a different support pad of the pair of support pads.

Various embodiments of the disclosed system may, additionally or alternatively, include one or more of the following features: the bracket may be substantially U-shaped; the second sidewall of the bracket may include an elongated slot aligned with a receptacle supported by the carriage, and the carriage may include a label reader configured to read information encoded in a machine-readable label on the receptacle through the elongated slot when the carriage is positioned at the first location; the carriage may further include a rotatable puck comprising a plurality of spring-loaded fingers configured to support the receptacle therebetween, and the puck may be coupled to the bracket below the base such that the plurality of fingers extend into a space between the first and second sidewalls of the bracket through an opening in the base; a first electric motor may be operatively coupled to the puck and configured to rotate the puck in the carriage when the carriage is positioned at the first location; a sensor may be configured to detect when the puck has rotated to a predetermined position in the carriage; the sensor may be a Hall effect sensor; the carriage may further include a pair of actuator arms, and each actuator arm of the pair of actuator arms may be coupled at one end to a different support pad of the pair of support pads and coupled at an opposite end to a different gear of the pair of meshed gears; and the carriage may further include (a) a cam arm having a first end and a second end, and (b) a ramp having an inclined surface extending substantially parallel to the rail, wherein the first end of the cam arm is coupled to a gear of the pair of meshed gears and the second end of the cam arm is configured to move on the inclined surface of the ramp as the carriage moves between the first and second locations. Various embodiments of the disclosed system may, additionally or alternatively, include one or more of the following features: the second end of the cam arm may include a roller configured to roll on the inclined surface when the carriage moves between the first and second locations; the cam arm may be configured to (a) rotate a first gear of the pair of meshed gears in a first direction and a second gear of the pair of meshed gears in a second direction opposite the first direction when the carriage moves from the first location to the second location, and (b) rotate the first gear in the second direction and the second gear in the first direction when the carriage moves from the second location to the first location; each support pad of the pair of support pads may include a contoured surface; each support pad of the pair of support pads may include a substantially V-shaped groove; each support pad of the pair of support pads may include an elastomer; the elastomer may be selected form the group consisting of silicone, EPDM (ethylene propylene diene monomer), and rubber; one or more springs may be configured to bias the pair of support pads away from each other when the carriage is positioned at the first location; the pair of support pads may be configured to apply a clamping force of from about 10N to about 30N to a receptacle supported by the carriage when the carriage is positioned at the second location; a second electric motor may be operatively coupled to the carriage and configured to move the carriage between the first and second locations; the carriage may further include a sensing system configured to detect whether a receptacle is properly supported seated in the puck; the puck may include a first passageway that extends transverse to and is offset from a vertical axis of the puck; a sensing system may be configured to detect (a) whether a longitudinal axis of a receptacle seated in the puck is inclined with respect to the vertical axis of the puck, and/or (b) whether a receptacle seated in the puck is inserted to a desired depth in the puck; the puck may be rotatably supported in a housing of the carriage, and the housing may include a second passageway that extends transverse to and is offset from the vertical axis of the puck; and the sensing system may include a signal emitter and a signal detector, and when the first and second passageways are aligned, the signal detector may be configured to receive a signal from the signal emitter through the aligned first and second passageways when a receptacle is not seated in the puck.

Various embodiments of the disclosed system may, additionally or alternatively, include one or more of the following features: the signal emitter may be an optical emitter, the signal detector may be an optical detector, and the signal may be an optical beam; when the first and second passageways are aligned, (a) the optical emitter may be configured to direct the optical beam on an incident area on an external surface of a receptacle seated in the puck and (b) the optical detector may be configured to receive at least a portion of the optical beam from the optical emitter if a receptacle is not seated in the puck, wherein if the receptacle is properly seated in the puck, the incident area may be offset from a longitudinal axis of the receptacle; if a receptacle is properly seated in the puck, the incident area may be offset from the longitudinal axis of the receptacle by a distance of from about 3 mm to about 6 mm; if a receptacle is properly seated in the puck, the incident area may be offset from a base of the receptacle by a distance of from about 3 mm to about 8 mm; the signal emitter and the signal detector may be coupled to the carriage; a first shelf may be attached to the carriage and a second shelf may be positioned at the second location, wherein when the carriage is positioned at the second location, the first shelf may be positioned below the second shelf; when the carriage is positioned at the second location, a vertical clearance between the first shelf and the second shelf may be from about 1 mm to about 6 mm; the second shelf may define a first opening, and wherein when the carriage is positioned at the second location, the first opening may be aligned with a receptacle supported by the carriage, such that a tip associated with a fluid extraction device of the instrument is moveable through the first opening and into the receptacle.

In some embodiments, a receptacle delivery system for an instrument is disclosed. The disclosed system may include a carriage configured to move from a first location of the instrument to a second location of the instrument, a puck supported by the carriage, and a first shelf positioned at the second location of the instrument. The puck may be configured to removably support a receptacle such that a longitudinal axis of the receptacle is substantially coincident with a vertical axis of the puck. The shelf may include (a) a base extending substantially transverse to the vertical axis of the puck and (b) a first opening defined by the base. When the carriage is positioned at the second location, the longitudinal axis of a receptacle seated in the puck may extend through the first opening.

Various embodiments of the disclosed system may, additionally or alternatively, include one or more of the following features: the shelf may be removably coupled to a housing of the instrument; the shelf may be removably coupled to the housing of the instrument using one or more magnets; the one or more magnets may include a pair of corresponding magnets, and wherein the shelf may include a first projection extending upward from the base, and the housing of the instrument may include a second projection, the first projection may contain a first magnet of the pair of magnets and the second projection may contain a second magnet of the pair of magnets; a top surface of the base may include a passageway defined by an interior projection extending upward from the top surface the base and a sidewall circumscribing the base; the sidewall may include a second opening, the second opening may be sized to permit the lateral passage of a distal end of a pipette tip; the shelf and the housing may include mated registration elements configured to correctly align the shelf on the instrument; the mated registration elements may include a third opening on the shelf and third projection coupled to the housing, wherein the third projection extends through the third opening when the second shelf is coupled to the housing; a shape of an outer surface of the third projection may generally conform to a shape of the third opening; the third projection of the housing may include a first recess located at an end of the third projection, and the shelf may include a fourth projection positioned proximate the third opening, and wherein when the second shelf is coupled to the housing, the fourth projection may be positioned in the first recess; the surface of the shelf may include a recessed thumb grip; the carriage may include a second shelf coupled to a top surface of the carriage; the second shelf may include a recessed region configured to contain a fluid; the second shelf may be removably coupled to the top surface of the carriage; and when the carriage is positioned at the second location, a vertical clearance between the first shelf and the second shelf may be from about 1 mm to about 6 mm.

In some embodiments, a receptacle clamping mechanism of an instrument is disclosed. The system may include a carriage configured to move between a first location and a second location of the instrument. The carriage may include (a) one or more support members configured to removably support a receptacle therebetween, and (b) a pair of opposed support pads configured to apply a clamping force to a receptacle supported by the carriage as the carriage moves from the first location to the second location and release the clamping force from the receptacle as the carriage moves from the second location to the first location. The system may also include a sensing system configured to determine whether a receptacle is properly supported by the carriage.

Various embodiments of the disclosed system may, additionally or alternatively, include one or more of the following features: the sensing system may be configured to determine (a) whether a longitudinal axis of a receptacle supported by the carriage is inclined with respect to a vertical axis, and/or (b) whether a receptacle supported by the carriage is inserted to a desired depth; the sensing system may include a signal emitter and a signal detector positioned at two ends of a linear axis, and wherein when a receptacle is properly supported by the carriage, the linear axis (a) passes through a sidewall of the receptacle and (b) is offset from the longitudinal axis of the receptacle; the signal emitter may be an optical emitter and the signal detector may be an optical detector; wherein (a) the optical emitter may be configured to direct an optical beam on an incident area on an external surface of a receptacle supported by the carriage and (b) the optical detector may be configured to receive at least a portion of the optical beam from the optical emitter if a receptacle is not supported by the carriage, wherein when a receptacle is properly supported by the carriage, the incident area is offset from a longitudinal axis of the receptacle; when a receptacle is properly supported by the carriage, the incident area may be offset from a longitudinal axis of the receptacle by a distance of from about 3 mm to about 6 mm; when a receptacle is properly supported by the carriage, the incident area may be offset from a base of the receptacle by a distance of from about 3 mm to about 8 mm; the signal emitter and the signal detector may be coupled to the carriage; the pair of support pads may be configured to be (a) in contact with a receptacle supported by the one or more support members when the carriage is positioned at the second location, and (b) separated from the receptacle when the carriage is positioned at the first location; the pair of support pads may be configured to move toward each other as the carriage moves from the first location to the second location and move away from each other as the carriage moves from the second location to the first location; and a pair of meshed gears may be coupled to the pair of support pads, wherein when the carriage moves from the first location to the second location, the pair of meshed gears may rotate in opposite directions relative to each other to move the pair of support pads toward each other; further include a pair of actuator arms, wherein each actuator arm of the pair of actuator arms may be coupled at one end to a different support pad of the pair of support pads and coupled at an opposite end to a different gear of the pair of meshed gears.

Various embodiments of the disclosed system may, additionally or alternatively, include one or more of the following features: further include a cam arm, wherein one end of the cam arm may be coupled to a gear of the pair of meshed gears and an opposite end of the cam arm may be configured to move on a downwardly inclined path when the carriage moves from the first location to the second location; the opposite end of the cam arm may include a roller configured to roll on the inclined path when the carriage moves from the first location to the second location; the cam arm may be configured to (a) rotate a first gear of the pair of meshed gears in a first direction and a second gear of the pair of meshed gears in a second direction opposite the first direction when the carriage moves from the first location to the second location, and (b) rotate the first gear in the second direction and the second gear in the first direction when the carriage moves from the second location to the first location; each support pad of the pair of support pads may include a contoured surface or a V-shaped groove; each support pad of the pair of support pads may include an elastomer; the elastomer may be selected from the group consisting of silicon, EPDM (ethylene propylene diene monomer), and rubber; further include one or more springs configured to bias the pair of support pads away from each other when the carriage is positioned at the first location; the pair of support pads may be configured to apply a clamping force of from about 10N to about 30N to a receptacle supported by the one or more support members when the carriage is positioned at the second location.

In some embodiments, a method of delivering a receptacle to an instrument is disclosed. The method includes supporting a receptacle in a carriage when the carriage is positioned at a first location of the instrument, activating a sensing system coupled to the carriage to confirm that the receptacle is supported by the carriage, moving the carriage and the receptacle supported therein to a second location of the instrument, applying a clamping force to the receptacle as the carriage moves from the first location to the second location, at the second location, extracting at least a portion of a fluid contained in the receptacle using a fluid extraction device of the instrument, moving the carriage and the receptacle supported therein from the second location to the first location, and releasing the clamping force from the receptacle as the carriage moves from the second location to the first location.

Various embodiments of the disclosed system may, additionally or alternatively, include one or more of the following features: further comprising using the sensing system to determine (a) whether a longitudinal axis of the receptacle supported by the carriage is inclined with respect to a vertical axis, and/or (b) whether the receptacle supported by the carriage is inserted to a predetermined depth; applying the clamping force may include applying a force of from about 10N to about 30N to the receptacle; applying the clamping force to the receptacle may include moving a pair of opposed support pads into contact with the receptacle as the carriage moves from the first location to the second location; releasing the clamping force may include moving the pair of support pads away from the receptacle as the carriage moves from the second location to the first location; applying the clamping force and releasing the clamping force may each include rotating a pair of meshed gears coupled to the pair of support pads in opposite directions relative to each other as the carriage moves between the first and second locations; rotating the pair of meshed gears may include (a) rotating a first gear of the pair of meshed gears in a first direction and a second gear of the pair of meshed gears in a second direction opposite the first direction when the carriage moves from the first location to the second location, and (b) rotating the first gear in the second direction and the second gear in the first direction when the carriage moves from the second location to the first location; rotating the pair of meshed gears may include (a) moving a first end of a cam arm on a downwardly inclined path when the carriage moves from the first location to the second location and (b) moving the first end of the cam arm on an upwardly inclined surface when the carriage moves from the second location to the first location, and wherein a second end of the cam arm is coupled to a gear of the pair of meshed gears; supporting the receptacle in the carriage may include removably supporting the receptacle in a rotatable puck positioned in the carriage; and removably supporting the receptacle may include positioning the receptacle between a plurality of spring-loaded members of the puck, and wherein the method may further include transferring the receptacle to the puck from a conveyor located outside of the instrument using a pick-and-place device.

Various embodiments of the disclosed system may, additionally or alternatively, include one or more of the following features: rotating the puck in the carriage when the carriage is positioned at the first location; using a sensor to detect when the puck has rotated to a predetermined position in the carriage; using a label reader to read information encoded in a machine-readable label on the receptacle as the puck is rotating; activating the sensing system may include directing a signal from a signal emitter toward a signal detector, wherein the receptacle supported by the carriage is positioned between the signal emitter and the signal detector, and determining what portion of the signal, if any, is received by the signal detector; directing the signal may include directing at least a portion of the signal on an incident area of an external surface of the receptacle supported by the carriage; the signal emitter may be an optical emitter, the signal detector may be an optical detector, and the signal may be an optical beam; when the receptacle is properly supported by the carriage, the incident area may be offset from a longitudinal axis of the receptacle by a distance of from about 3 mm to about 6 mm; when the receptacle is properly supported by the carriage, the incident area may be offset from the base of the receptacle by a distance of from about 3 mm to about 8 mm; moving the carriage, and the receptacle supported therein, to the second location may include positioning the carriage at the second location such that (a) at least a portion of the carriage is positioned below a second shelf of the instrument positioned at the second location and (b) the receptacle is positioned below a first opening defined by the second shelf; moving the carriage, and the receptacle supported therein, to the second location may include positioning the carriage at the second location such that (a) a first shelf coupled to the carriage is positioned below a second shelf removably coupled to the instrument at the second location and (b) the receptacle is aligned with a first opening defined by the second shelf; when the carriage is positioned at the second location, the first shelf may be vertically spaced apart from the second shelf by a distance of from about 1 mm to about 6 mm; extracting at least a portion of the fluid from the receptacle may include directing a tip associated with the fluid extraction device through the first opening and into the receptacle to contact the fluid contained in the receptacle; extracting at least a portion of the fluid from the receptacle may include drawing at least a portion of the fluid into the tip; after drawing at least a portion of the fluid into the tip, removing the tip from the receptacle to a position above the first opening; the receptacle may include a pierceable cap that covers an opening of the receptacle, and wherein (i) directing the tip into the receptacle may include piercing the cap with the tip, and (ii) removing the tip from the receptacle may include moving the tip through the pierced cap; after removing the tip from the receptacle, laterally moving the tip to a position above the second shelf; after laterally moving the tip to the position above the second shelf, lowering the tip to a distance of from about 1 mm to about 5 mm above a top surface of the second shelf; after laterally moving the tip to a position above the second shelf, moving the tip along a predefined path above the top surface of the second shelf; and moving the tip along the predefined path may include moving the tip around a projection extending upward from the top surface of the second shelf; after moving the tip along the predefined path, removing the tip from above the top surface of the second shelf through a second opening formed in a sidewall of the second shelf.

Various embodiments of the disclosed system may, additionally or alternatively, include one or more of the following features: a portion of the fluid extracted from the receptacle is suspended from the tip prior to moving the tip along the predefined path, and wherein at least a portion of the fluid suspended from the tip is deposited on the top surface of the second shelf while moving the tip along the predefined path; at least a portion of the fluid suspended from the tip prior to moving the tip along the predefined path is suspended from the second shelf beneath the first opening after moving the tip along the predefined path; moving the carriage, and the receptacle supported therein, from the second location to the first location may include cleaving at least a portion of the fluid suspended from the second shelf directly beneath the first opening and depositing the cleaved fluid onto a top surface of a first shelf supported by the carriage as the carriage moves from the second location to the first location; decoupling the second shelf from the instrument; removing at least a portion of the fluid deposited on the top surface of the second shelf after decoupling the second shelf from the instrument; coupling the second shelf to the instrument after removing at least a portion of the fluid deposited on the top surface of the second shelf; removing at least a portion of the fluid deposited on the first shelf after moving the carriage to the first location; removing the receptacle from the carriage using a pick-and-place device after releasing the clamping force from the receptacle.

In some embodiments, a method of delivering a receptacle to an instrument is disclosed. The method may include positioning a carriage at a first location of the instrument, wherein the carriage may include a rotatable puck and may be configured to move from the first location to a second location of the instrument. The puck may be configured to seat a receptacle therein. The method may also include rotating the puck in the carriage about a vertical axis to position the puck in a desired rotational position, determining whether a receptacle is seated in the puck using a first sensor, and if it is determined that a receptacle is not seated in the puck, calibrating a sensing system. The sensing system may be configured to determine whether a receptacle is seated in the puck. The method may further include, after calibrating the sensing system, seating a receptacle in the puck, after seating the receptacle in the puck, using the sensing system to determine whether the receptacle is properly seated in the puck, and after determining that the receptacle is properly seated in the puck, moving the carriage from the first location to the second location.

Various embodiments of the disclosed system may, additionally or alternatively, include one or more of the following features: determining whether the receptacle is properly seated in the puck may include determining (a) whether a longitudinal axis of the receptacle seated in the puck is inclined with respect to the vertical axis, and/or (b) whether the receptacle seated in the puck is inserted to a desired depth; the puck may include a first passageway that extends transverse to and is offset from the vertical axis of the puck, and the carriage may include a second passageway that extends transverse to and is offset from the vertical axis of the puck, and calibrating the sensor assembly may include rotating the puck to align the first and second passageways; the sensing system may include a signal emitter and a signal detector, and wherein when the first and second passageways are aligned, the signal detector may be configured to receive a signal from the signal emitter through the aligned first and second passageways; the signal emitter may be an optical emitter, and the signal detector may be an optical detector, and the method may further include performing luminance calibration of an optical beam from the optical emitter after aligning the first and second passageways; the first sensor may be a label reader of the instrument, and determining whether a receptacle is seated in the puck may include using the label reader to detect a label on the carriage, the label may be positioned at a location that is not in a line of sight of the label reader if a receptacle is seated in the puck; rotating the puck to position the puck in a desired rotational position may include stopping rotation of puck when a Hall effect sensor indicates that the puck is at the desired rotational position; moving the carriage from the first location to the second location may include positioning the carriage at the second location such that a first shelf attached to the carriage is positioned below a second shelf positioned at the second location; positioning the carriage at the second location may include positioning the carriage at the second location such that the first shelf is vertically spaced apart from the second shelf by a distance of from about 1 mm to about 6 mm; positioning the carriage at the second location may include positioning the carriage such that the receptacle seated in the puck is positioned below and aligned with a first opening defined by the second shelf; directing a tip associated with a fluid extraction device of the instrument through the first opening and into the receptacle to contact a fluid contained in the receptacle; drawing at least a portion of the fluid into the tip; after drawing at least a portion of the fluid into the tip, removing the tip from the receptacle to a position above the first opening; and the receptacle may include a pierceable cap that covers an opening of the receptacle, and (i) directing the tip into the receptacle may include piercing the cap with the tip, and (ii) removing the tip from the receptacle may include moving the tip through the pierced cap.

Various embodiments of the disclosed system may, additionally or alternatively, include one or more of the following features: after removing the tip from the receptacle, laterally moving the tip to a position above the second shelf; after laterally moving the tip to the position above the second shelf, lowering the tip to a distance of from about 1 mm to about 5 mm above a top surface of the shelf; after laterally moving the tip to a position above the second shelf, moving the tip along a predefined above the top surface of the second shelf; moving the tip along the predefined path may include moving the tip around a projection extending upward from the top surface of the second shelf; after moving the tip along the predefined path, removing the tip from above the top surface of the second shelf through a second opening formed in a sidewall of the second shelf; a portion of the fluid drawn from the receptacle may be suspended from the tip prior to moving along the predefined path, and at least a portion of the fluid suspended from the tip may be deposited on the top surface of the second shelf while moving the tip along the predefined path; at least a portion of the fluid suspended from the tip prior to moving the tip along the predefined path may be suspended from the second shelf directly beneath the first opening after moving the tip along the predefined path; moving the carriage from the second location to the first location after moving the tip along the predefined path; moving the carriage from the second location to the first location may include cleaving at least a portion of the fluid suspended from the second shelf beneath the first opening and depositing the cleaved fluid onto a top surface of the first shelf as the carriage moves from the second location to the first location; decoupling the second shelf from the instrument; removing at least a portion of the fluid deposited on the top surface of the second shelf after decoupling the second shelf from the instrument; coupling the second shelf to the instrument after removing at least a portion of the fluid deposited on the top surface of the second shelf; and removing at least a portion of the fluid deposited on the top surface of the first shelf after moving the carriage to the first location.

In some embodiments, a method for providing a fluid to an instrument located adjacent a conveyor for transporting receptacles between a plurality of modules is disclosed. The method may include the steps of (a) supporting a sample receptacle in an upright orientation on a first carrier, (b) transporting the first carrier on a conveyor extending adjacent to each of a plurality of modules, at least one of the modules being an analytical instrument, (c) stopping the first carrier at a position adjacent the analytical instrument, (d) after step (c), and while the first carrier remains on the conveyor, removing the sample receptacle from the first carrier and transporting the sample receptacle to a pick-up position of the analytical instrument, (e) transporting the sample receptacle from the pick-up position to a pipetting station located within the analytical instrument, (f) at the pipetting station, aspirating a fluid contained within the sample receptacle and transferring the aspirated fluid to a reaction receptacle supported by the analytical instrument, (g) after aspirating the fluid from the sample receptacle, transporting the sample receptacle from the pipetting station to the pick-up position, (h) removing the sample receptacle from the pick-up position and transporting the sample receptacle to a second carrier located on the conveyor adjacent the analytical instrument, the second carrier supporting the sample receptacle in an upright orientation, (i) in the analytical instrument, performing an assay with the aspirated fluid, thereby determining the presence or absence of an analyte in the aspirated fluid, and (j) transporting the second carrier supporting the sample receptacle on the conveyor to one or more of the plurality of modules other than the analytical instrument.

Various embodiments of the disclosed method may, additionally or alternatively, include one of more of the following aspects: the first carrier may be a puck having a cylindrically shaped base and a pocket formed in a top surface of the base for seating the sample receptacle; the puck may have a plurality of upwardly extending fingers for supporting the sample receptacle in the upright orientation; the conveyor may comprise a stationary track for supporting the first carrier during step (b); the first carrier may be propelled on the track by a magnetic attraction between the first carrier and the conveyor; the analytical instrument may be an instrument for performing nucleic acid-based amplification reactions; step (c) may be performed with a stop element operationally associated with the conveyor, and wherein the stop element may be actuated from an open position allowing passage of the first carrier on the conveyor to a closed position during step (c), the stop element immobilizing the first carrier in the closed position; the sample receptacle may be removed from the first carrier and transported to the pick-up position with a gripper apparatus; the method may also include the step of determining whether the height and orientation of the sample receptacle is acceptable; a receptacle holder supported by a carriage may receive the sample receptacle at the pick-up position in step (d); the pick-position may be located outside of a housing of the analytical instrument; the carriage may transport the sample receptacle from the pick-up position and to the pipetting station in step (d); the method may further comprise the step of securing the sample receptacle in the carriage as the sample receptacle is transported from the pick-up position to the pipetting station, thereby impeding vertical movement of the sample receptacle; the first carrier and the second carrier may be the same carrier; the assay may comprise exposing the sample to reagents and conditions for performing a nucleic acid-based amplification reaction.

DESCRIPTION OF THE DRAWINGS

The accompanying drawings, which are incorporated herein and form part of the specification, illustrate various, non-limiting embodiments of the present disclosure. Where appropriate, reference numerals illustrating like structures, components, materials and/or elements in different drawings are labeled similarly. It should be understood that various combinations of the structures, components, and/or elements, other than those specifically shown in these drawings, are contemplated and are within the scope of the present disclosure.

For simplicity and clarity of illustration, the drawings depict the general structure and/or manner of construction of the described embodiments, as well as associated methods of manufacture. Well-known features (e.g., fasteners, electrical connections, control systems, etc.) are not shown in these drawings (and are not described in the corresponding description for brevity) to avoid obscuring other features, since these features are well known to those of ordinary skill in the art. The features in the drawings are not necessarily drawn to scale. The dimensions of some features may be exaggerated relative to other features to improve understanding of the exemplary embodiments. Cross-sectional views are simplifications provided to help illustrate the relative positioning of various features. One skilled in the art would appreciate that the cross-sectional views are not drawn to scale and should not be viewed as representing proportional relationships between different features. It should be noted that, even if it is not specifically mentioned, aspects and features described with reference to one embodiment may also be applicable to, and may be used with, other embodiments.

FIG. 1C illustrates a robotic arm of a pick-and-place device transferring a receptacle from the conveyor to the shuttle of FIG. 1A, in an exemplary embodiment.

FIGS. 3A-3E illustrate different views of an exemplary shuttle of FIG. 1A.

FIGS. 5A-5K illustrate different views of an exemplary puck of the carriage of FIGS. 4A-4E.

FIGS. 6A-6J illustrate optical sensors being used to detect proper seating of a receptacle in the carriage of FIGS. 4A-4E, in an exemplary embodiment.

FIGS. 7A-7C illustrate an initialization procedure for the carriage of FIGS. 4A-4E, in an exemplary embodiment.

DETAILED DESCRIPTION

Figure 1A:
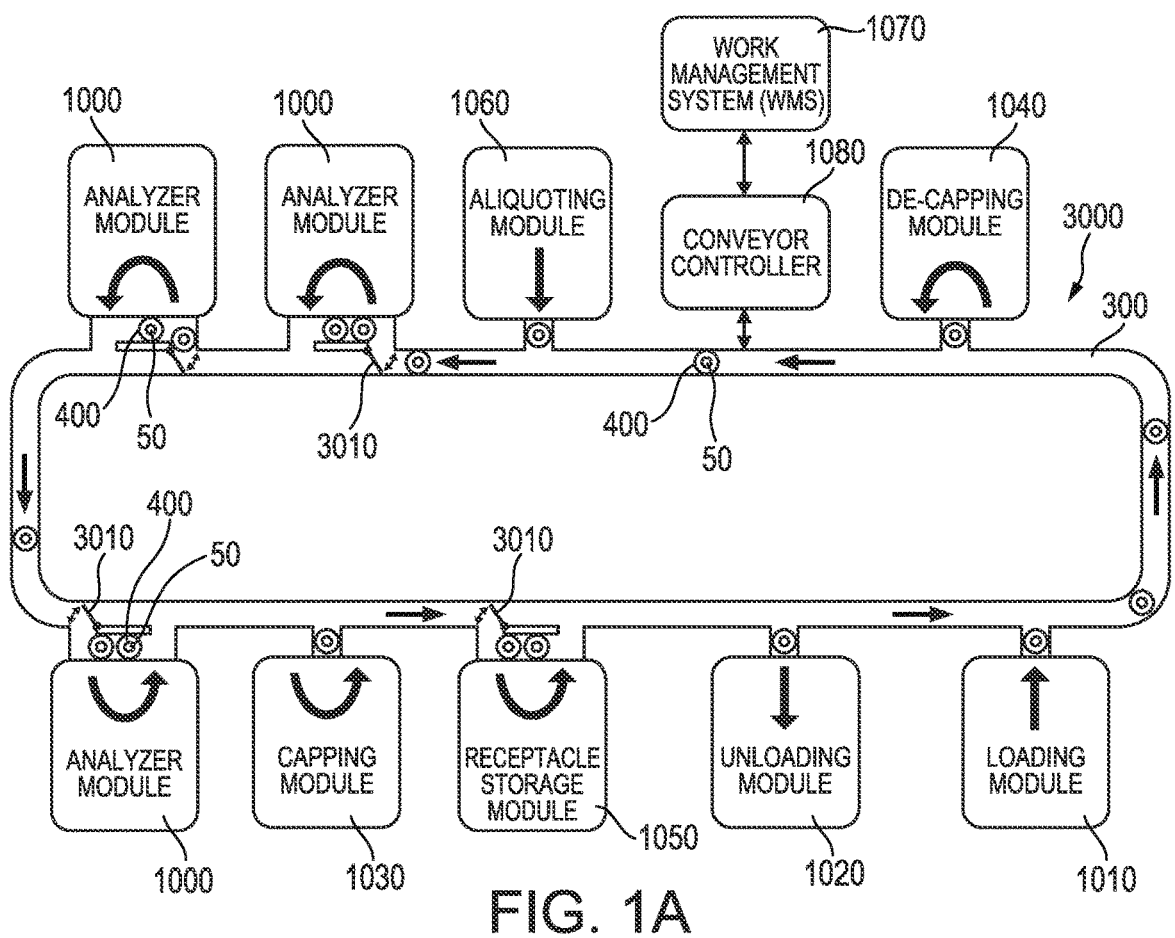
FIG. 1A is a schematic illustration of an exemplary automated laboratory that includes a conveyor and shuttles.

Unless defined otherwise, all terms of art, notations and other scientific terms or terminology used herein have the same meaning as is commonly understood by one of ordinary skill in the art to which this disclosure belongs. All patents, applications, published applications and other publications referred to herein are incorporated by reference in their entirety. If a definition set forth in this disclosure is contrary to, or otherwise inconsistent with, a definition in these references, the definition set forth in this disclosure prevails over the definitions that are incorporated herein by reference. None of the references described or referenced herein is admitted to be prior art to the current disclosure.

References in the specification to "one embodiment," "an embodiment," a "further embodiment," "an example embodiment," "some aspects," "a further aspect," "aspects," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic is also a description in connection with other embodiments whether or not explicitly described. As used herein, "a" or "an" means "at least one" or "one or more."

As used herein, "sample" refers to any substance suspected of containing at least one analyte of interest. The analyte of interest may be, for example, a nucleic acid, a protein, a prion, a chemical, or the like. The substance may be derived from any source, including an animal, an industrial process, the environment, a water source, a food product, or a solid surface (e.g., surface in a medical facility). Substances obtained from animals may include, for example, blood or blood products, urine, mucous, sputum, saliva, semen, tears, pus, stool, nasopharyngeal or genitourinary specimen obtained with a swab or other collective device, and other bodily fluids or materials. The term "sample" will be understood to mean a specimen in its native form or to any stage of processing.

As used herein, a "receptacle" refers to any type of fluid container, including, for example, a tube, vial, cuvette, cartridge, microtiter plate, etc., that is configured to contain a sample or another fluid (collectively referred to herein as fluid). Non-limiting examples of exemplary receptacles include, for example, Aptima® urine specimen transport tube, Aptima® specimen transfer tube, BD Vacutainer®, etc.

As used herein, the term "instrument" refers to any apparatus that may be used with the disclosed shuttle. As used herein, an "instrument" includes, among others, analyzers capable of analyzing a sample. For example, an instrument may be an analyzer capable of performing a nucleic acid-based detection assay, a sequencing assay, an immunoassay, or chemistry assay on a sample. Non-limiting examples of such "instruments" include automated analyzers such as, for example, the Tigris®, Panther®, and Panther Fusion® systems sold by Hologic, Inc., Marlborough, Mass. As used herein, an "instrument" also includes an apparatus that is used to transfer sample material from one receptacle to another receptacle without processing or analyzing the sample. Non-limiting examples of such "instruments" include the Tomcat® instrument sold by Hologic, Inc., Marlborough, Mass.

As used herein, the term "robotic arm" refers to an electromechanical device that translates a payload (such as a receptacle) in the X, Y, and/or Z directions. In an embodiment, a robotic arm includes a receptacle gripper (such as, for example, a pick-and-place claw) that can be used to pick and move a receptacle from one location to another.

As used herein, the term "conveyor" refers to a mechanical apparatus for transporting articles (e.g., receptacles) from one location to another along a defined path. Non-limiting examples of exemplary conveyors include robots, belts (such as, for example, a moving belt, a shuttle/carriage moving on a track, rail, belt, etc.), magnetic devices, gear systems, cable systems, vacuum systems, automated cars with wheels, etc.

As used herein, "assay" refers to a procedure for detecting and/or quantifying an analyte in a sample. A sample comprising or suspected of comprising the analyte is contacted with one or more reagents and subjected to conditions permissive for generating a detectable signal informative of whether the analyte is present or the amount (e.g., mass or concentration) of analyte in the sample.

As used herein, the term "analytical instrument" refers to an automated instrument that is capable of performing one or more steps of an assay, including the step of determining the presence or absence of one or more analytes suspected of being present in a fluid sample.

With reference to nucleic acids, the term "extraction" is used herein to refer to the recovery of a nucleic acid molecule (e.g., DNA or RNA of any form) from a sample comprising non-nucleic acid components, such as the native environment of the nucleic acid molecule, a partially purified sample, or a crude sample (i.e., a sample that is in substantially the same form as it was upon being obtained from its source). Extraction can result in substantially purified nucleic acid molecules or nucleic acid molecules that are in a more pure form than in the pre-extraction sample and can be used to obtain such molecules for use in analytical procedures from samples comprising biological material, such as cells (including cells isolated directly from a source or cultured), blood, urine, mucus, semen, saliva, or tissue (e.g., a biopsy). Many extraction methods are available. In various embodiments, extraction may comprise one or more of cell lysis, removal of insoluble material such as by centrifugation or filtration, chromatography, precipitation of nucleic acids, or capture of nucleic acids with capture probes.

As used herein, "analyte" refers to a molecule present or suspected of being present in a sample and which is targeted for detection in an assay. Exemplary types of analytes include biological macromolecules such as nucleic acids, polypeptides, and prions.

As used herein, "nucleic acid" and "polynucleotide" refer to a multimeric compound comprising nucleosides or nucleoside analogs which have nitrogenous heterocyclic bases or base analogs linked together to form a polynucleotide, including conventional RNA, DNA, mixed RNA-DNA, and polymers that are analogs thereof. A nucleic acid "backbone" can be made up of a variety of linkages, including one or more of sugar-phosphodiester linkages, peptide-nucleic acid bonds ("peptide nucleic acids" or PNA; International Publication No. WO 95/32305), phosphorothioate linkages, methylphosphonate linkages, or combinations thereof. Sugar moieties of a nucleic acid can be ribose, deoxyribose, or similar compounds with substitutions, e.g., 2' methoxy or 2' halide substitutions. Nitrogenous bases can be conventional bases (A, G, C, T, U), analogs thereof (e.g., inosine or others; see The Biochemistry of the Nucleic Acids 5-36, Adams et al., ed., 11th ed., 1992), derivatives of purines or pyrimidines (e.g., N4-methyl guanine, N6-methyladenine, deaza- or aza-purines, deaza- or aza-pyrimidines, pyrimidine bases with substituent groups at the 5 or 6 position (e.g., 5-methylcytosine), purine bases with a substituent at the 2, 6, or 8 positions, 2-amino-6-methylaminopurine, O6-methylguanine, 4-thio-pyrimidines, 4-amino-pyrimidines, 4-dimethylhydrazine-pyrimidines, and O4-alkyl-pyrimidines; U.S. Pat. No. 5,378,825 and International Publication No. WO 93/13121). Nucleic acids can include one or more "abasic" residues where the backbone includes no nitrogenous base for position(s) of the polymer (U.S. Pat. No. 5,585,481). A nucleic acid can comprise only conventional RNA or DNA sugars, bases and linkages, or can include both conventional components and substitutions (e.g., conventional bases with 2' methoxy linkages, or polymers containing both conventional bases and one or more base analogs). Nucleic acid includes "locked nucleic acid" (LNA), an analogue containing one or more LNA nucleotide monomers with a bicyclic furanose unit locked in an RNA mimicking sugar conformation, which enhance hybridization affinity toward complementary RNA and DNA sequences (Vester and Wengel, 2004, Biochemistry 43(42): 13233-41). Embodiments of oligomers that can affect stability of a hybridization complex include PNA oligomers, oligomers that include 2'-methoxy or 2'-fluoro substituted RNA, or oligomers that affect the overall charge, charge density, or steric associations of a hybridization complex, including oligomers that contain charged linkages (e.g., phosphorothioates) or neutral groups (e.g., methylphosphonates). Methylated cytosines such as 5-methylcytosines can be used in conjunction with any of the foregoing backbones/ sugars/linkages including RNA or DNA backbones (or mixtures thereof) unless otherwise indicated. RNA and DNA equivalents have different sugar moieties (i.e., ribose versus deoxyribose) and can differ by the presence of uracil in RNA and thymine in DNA. The differences between RNA and DNA equivalents do not contribute to differences in homology because the equivalents have the same degree of complementarity to a particular sequence. It is understood that when referring to ranges for the length of an oligonucleotide, amplicon, or other nucleic acid, that the range is inclusive of all whole numbers (e.g., 19-25 contiguous nucleotides in length includes 19, 20, 21, 22, 23, 24, and 25).

As used herein, "nucleic acid amplification" or simply "amplification" refers to any in vitro procedure that produces multiple copies of a target nucleic acid sequence, or its complementary sequence, or fragments thereof (i.e., an amplified sequence containing less than the complete target nucleic acid) Amplification methods include, for example, replicase-mediated amplification, polymerase chain reaction (PCR), ligase chain reaction (LCR), strand-displacement amplification (SDA), helicase-dependent amplification (HDA), transcription-mediated amplification (TMA), and nucleic acid sequence-based amplification (NASBA). TMA and NASBA are both forms of transcription-based amplification. Replicase-mediated amplification uses self-replicating RNA molecules, and a replicase such as QB-replicase (see, e.g., U.S. Pat. No. 4,786,600). PCR uses a DNA polymerase, pairs of primers, and thermal cycling to synthesize multiple copies of two complementary strands of dsDNA or from a cDNA (see, e.g., U.S. Pat. Nos. 4,683,195, 4,683,202, and 4,800,159). LCR uses four or more different oligonucleotides to amplify a target and its complementary strand by using multiple cycles of hybridization, ligation, and denaturation (see, e.g., U.S. Pat. Nos. 5,427,930 and 5,516,663). SDA uses a primer that contains a recognition site for a restriction endonuclease and an endonuclease that nicks one strand of a hemimodified DNA duplex that includes the target sequence, whereby amplification occurs in a series of primer extension and strand displacement steps (see, e.g., U.S. Pat. Nos. 5,422,252, 5,547,861, and 5,648, 211). HDA uses a helicase to separate the two strands of a DNA duplex generating single-stranded templates, followed by hybridization of sequence-specific primers hybridize to the templates and extension by DNA polymerase to amplify the target sequence (see, e.g., U.S. Pat. No. 7,282,328). Transcription-based amplification uses a DNA polymerase, an RNA polymerase, deoxyribonucleoside triphosphates, ribonucleoside triphosphates, a promoter-containing oligonucleotide, and optionally can include other oligonucleotides, to ultimately produce multiple RNA transcripts from a nucleic acid template. Examples of transcription-based amplification are described in U.S. Pat. Nos. 4,868,105, 5,124,990, 5,130,238, 5,399,491, 5,409,818, and 5,554,516; and in International Publication Nos. WO 88/01302, WO 88/10315 and WO 95/03430. Amplification may be either linear or exponential.

As used herein, "oligomer" or "oligonucleotide" refers to a nucleic acid of generally less than 1,000 nucleotides (nt), including those in a size range having a lower limit of about 2 to 5 nt and an upper limit of about 500 to 900 nt. Some particular embodiments are oligomers in a size range with a lower limit of about 5 to 15, 16, 17, 18, 19, or 20 nt and an upper limit of about 50 to 600 nt, and other particular embodiments are in a size range with a lower limit of about 10 to 20 nt and an upper limit of about 22 to 100 nt. Oligomers can be purified from naturally occurring sources, but can be synthesized by using any well-known enzymatic or chemical method. Oligomers can be referred to by a functional name (e.g., capture probe, primer or promoter primer) but those skilled in the art will understand that such terms refer to oligomers. Oligomers can form secondary and tertiary structures by self-hybridizing or by hybridizing to other polynucleotides. Such structures can include, but are not limited to, duplexes, hairpins, cruciforms, bends, and triplexes. Oligomers may be generated in any manner, including chemical synthesis, DNA replication, reverse transcription, PCR, or a combination thereof. In some embodiments, oligomers that form invasive cleavage structures are generated in a reaction (e.g., by extension of a primer in an enzymatic extension reaction).

As used herein, "amplicon" or "amplification product" refers to a nucleic acid molecule generated in a nucleic acid amplification reaction and which is derived from a target nucleic acid. An amplicon or amplification product contains a target nucleic acid sequence that can be of the same or opposite sense as the target nucleic acid. In some embodiments, an amplicon has a length of about 100-2000 nucleotides, about 100-1500 nucleotides, about 100-1000 nucleotides, about 100-800 nucleotides, about 100-700 nucleotides, about 100-600 nucleotides, or about 100-500 nucleotides.

As used herein, "primer" refers to an oligomer that hybridizes to a template nucleic acid and has a 3' end that is extended by polymerization. A primer can be optionally modified, e.g., by including a 5' region that is non-complementary to the target sequence. Such modification can include functional additions, such as tags, promoters, or other sequences that may be used or useful for manipulating or amplifying the primer or target oligonucleotide. Examples of primers incorporating tags, or tags and promoter sequences, are described in U.S. Pat. No. 9,284,549. A primer modified with a 5' promoter sequence can be referred to as a "promoter-primer." A person of ordinary skill in the art of molecular biology or biochemistry will understand that an oligomer that can function as a primer can be modified to include a 5' promoter sequence and then function as a promoter-primer, and, similarly, any promoter-primer can serve as a primer with or without its 5' promoter sequence.

As used herein, "detection oligomer" or "detection probe" refers to an oligomer that interacts with a target nucleic acid to form a detectable complex. A probe's target sequence generally refers to the specific sequence within a larger sequence (e.g., gene, amplicon, locus, etc.) to which the probe specifically hybridizes. A detection oligomer can include target-specific sequences and a non-target-complementary sequence. Such non-target-complementary sequences can include sequences which will confer a desired secondary or tertiary structure, such as a flap or hairpin structure, which can be used to facilitate detection and/or amplification (e.g., U.S. Pat. Nos. 5,118,801, 5,312,728, 6,835,542, 6,849,412, 5,846,717, 5,985,557, 5,994,069, 6,001,567, 6,913,881, 6,090,543, and 7,482,127; International Publication Nos. WO 97/27214 and WO 98/42873; Lyamichev et al., Nat. Biotech., 17:292 (1999); and Hall et al., PNAS, USA, 97:8272 (2000)). Probes of a defined sequence can be produced by techniques known to those of ordinary skill in the art, such as by chemical synthesis, and by in vitro or in vivo expression from recombinant nucleic acid molecules.

As used herein, "label" or "detectable label" refers to a moiety or compound that is detected or leads to a detectable signal. The label may be joined directly or indirectly to a probe or it may be, for example, an intercalating dye (e.g., SYBR® Green). Direct joining can use covalent bonds or non-covalent interactions (e.g., hydrogen bonding, hydrophobic or ionic interactions, and chelate or coordination complex formation), whereas indirect joining can use a bridging moiety or linker (e.g., via an antibody or additional oligonucleotide(s). Any detectable moiety can be used, e.g., radionuclide, ligand such as biotin or avidin, enzyme, enzyme substrate, reactive group, chromophore such as a dye or particle (e.g., latex or metal bead) that imparts a detectable color, luminescent compound (e.g. bioluminescent, phosphorescent, or chemiluminescent compound), and fluorescent compound (i.e., fluorophore). Embodiments of fluorophores include those that absorb light (e.g., have a peak absorption wavelength) in the range of 495 to 690 nm and emit light (e.g., have a peak emission wavelength) in the range of 520 to 710 nm, which include those known as FAM®, TET®, HEX®, CAL FLUOR® (Orange or Red), CY®, and QUASAR® compounds. Fluorophores can be used in combination with a quencher molecule that absorbs light when in close proximity to the fluorophore to diminish background fluorescence. Such quenchers are well known in the art and include, e.g., BLACK HOLE QUENCHER® (or BHQ®), Blackberry Quencher® (or BBQ-650®), Eclipse®, or TAMRA™ compounds. Particular embodiments include a "homogeneous detectable label" that is detectable in a homogeneous system in which bound labeled probe in a mixture exhibits a detectable change compared to unbound labeled probe, which allows the label to be detected without physically removing hybridized from unhybridized labeled probe (e.g., U.S. Pat. Nos. 5,283,174, 5,656,207, and 5,658,737). Exemplary homogeneous detectable labels include chemiluminescent compounds, including acridinium ester ("AE") compounds, such as standard AE or AE derivatives which are well known (U.S. Pat. Nos. 5,656,207, 5,658,737, and 5,639,604). Methods of synthesizing labels, attaching labels to nucleic acid, and detecting signals from labels are known (e.g., Sambrook et al., Molecular Cloning, A Laboratory Manual, 2nd ed. (Cold Spring Harbor Laboratory Press, Cold Spring Harbor, NY, 1989) at Chapt. 10, and U.S. Pat. Nos. 5,658,737, 5,656,207, 5,547,842, 5,283,174, 5,585,481, 5,639,604, and 4,581,333, and European Patent No. 0 747 706). Other detectably labeled probes include FRET cassettes, TaqMan® probes, and probes that undergo a conformational change in the presence of a targeted nucleic acid, such as molecular torches and molecular beacons. FRET cassettes are described in U.S. Patent Application Publication No. 2005/0186588 and U.S. Pat. No. 9,096,893. TaqMan® probes include a donor and acceptor label wherein fluorescence is detected upon enzymatically degrading the probe during amplification in order to release the fluorophore from the presence of the quencher. Chemistries for performing TaqMan assays are described in PCT Application No. PCT/US2018/024021, filed Mar. 23, 2018, and U.S. Pat. No. 5,723,591. Molecular torches and beacons exist in open and closed configurations wherein the closed configuration quenches the fluorophore and the open position separates the fluorophore from the quencher to allow a change in detectable fluorescent signal. Hybridization to target opens the otherwise closed probes. Molecular torches are described in U.S. Pat. No. 6,361,945; and molecular beacons are described in U.S. Pat. No. 6,150,097.

As used herein, "target capture" or "a target capture procedure" refers to a procedure for immobilizing a target analyte on a solid support and purifying the analyte by removing potential inhibitors of an amplification reaction (e.g., heparin, proteins, and heme).

"Capture probe," "target capture probe," "capture oligonucleotide," "capture oligomer," "target capture oligomer," and "capture probe oligomer" are used interchangeably herein to refer to a nucleic acid oligomer that hybridizes to a target sequence in a target nucleic acid by standard base pairing and joins to a binding partner on an immobilized probe to capture the target nucleic acid to a support. In one embodiment, "target capture" refers to a process in which a target nucleic acid is purified or isolated by hybridization to a capture probe. In another embodiment, "target capture" refers to direct immobilization of a target nucleic acid on a solid support. One example of a capture probe includes two binding regions: a sequence-binding region (e.g., target-specific portion) and an immobilized probe-binding region, usually on the same oligomer, although the two regions may be present on two different oligomers joined together by one or more linkers. Another embodiment of a capture probe uses a target-sequence binding region that includes random or non-random poly-GU, poly-GT, or poly U sequences to bind non-specifically to a target nucleic acid and link it to an immobilized probe on a support.

As used herein, "molecular assay" refers to a procedure for specifically detecting and/or quantifying a target molecule, such as a target nucleic acid. A sample comprising or suspected of comprising the target molecule is contacted with one or more reagents, including at least one reagent specific for the target molecule, and subjected to conditions permissive for generating a detectable signal informative of whether the target molecule is present. For example, where the molecular assay is PCR, the reagents include primers specific for the target and the generation of a detectable signal can be accomplished at least in part by providing a labeled probe that hybridizes to the amplicon produced by the primers in the presence of the target. Alternatively, the reagents can include an intercalating dye for detecting the formation of double-stranded nucleic acids.

As used herein, "reagent" refers to any substance or combination thereof that participates in a molecular assay, other than sample material and products of the assay. Exemplary reagents include nucleotides, enzymes, amplification oligomers, probes, and salts.

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, inside, outside, inner, outer, proximal, distal, in front of, behind, next to, adjacent, between, horizontal, vertical, diagonal, longitudinal, transverse, etc., are used for convenience in referring to such component, apparatus, location, feature, or a portion thereof in the drawings and are not intended to be limiting. Further, relative terms such as, for example, "about," "substantially," "approximately," etc., are used to indicate a possible variation of ±10% in a stated numeric value or range.

FIG. 1A is a schematic illustration of an exemplary automated laboratory with a conveyor system 3000 configured to transport receptacles containing specimens or samples (e.g., fluids) to different instruments in the laboratory. Conveyor system 3000 includes a conveyor 300 that extends between (i.e., extends adjacent to) multiple instruments 1000, 1010, 1020, etc. positioned in the laboratory. In some embodiments, as illustrated in FIG. 1A, these multiple instruments may include analyzer modules or analytical instruments 1000, a loading module 1010, an unloading module 1020, a capping module 1030, a de-capping module 1040, a receptacle storage module 1050, and an aliquoting module 1060. It should be noted that the specific instruments and the layout of conveyor 300 illustrated in FIG. 1A are only exemplary. In general, any number and type of instruments may be arranged (e.g., adjacent to conveyor 300) in the laboratory, and conveyor 300 may be arranged in any configuration adjacent to some or all of these instruments. Conveyor 300 is configured to transport receptacles 50 containing fluids (e.g., specimens, samples, etc.) to the multiple instruments 1000-1060 in the laboratory.

The loading module 1010 serves as an input through which trays of receptacles 50 (e.g., 50 to 100 receptacles per each tray) containing fluids can be manually loaded by an operator through a loading bay of loading module 1010. Once a tray of receptacles 50 has been provided to a loading bay of loading module 1010, the receptacles 50 may be automatically transferred from loading module 1010 onto the automated conveyor 300 to be subsequently acted upon by the other instruments (e.g., some or all of instruments 1000, 1020-1060) in the laboratory in accordance with the workflows for the receptacles. The unloading module 1020 serves to receive capped receptacles 50 having contents that were extracted and processed by one or more of the analytical instruments 1000 (e.g., analyzer modules). The capped receptacles 50 can be transferred from conveyor 300 of the automated conveyor system 3000 to racks contained in a bay located within a housing of unloading module 1020. After sufficiently filling the racks with capped receptacles 50, an operator can manually remove the racks from the bay of unloading module 1020. The de-capping module 1040 is configured for removing caps from closed, specimen-containing receptacles 50 prior to processing the specimens in one or more of the analytical instruments 1000. The capping module 1030 is configured for coupling (e.g., inserting or attaching) caps 56 (see FIG. 5C) (e.g., replacement caps or stoppers (e.g., plugs or septums)) to open-ended receptacles 50 after extracting specimen from the receptacles in one or more of the analytical instruments 1000 and, in many instances, prior to transferring the receptacles 50 to the receptacle storage module 1050 or the unloading module 1020. Exemplary capping and de-capping modules 1030, 1040 are described in U.S. Pat. Nos. 6,321,619 and 7,152, 504. The aliquoting module 1060 transfers one or more aliquots of the fluid contained in a parent receptacle 50 to a child receptacle 50 (possibly along with other child receptacles). An exemplary aliquoting module 1060 is the Tomcat® instrument sold by Hologic, Inc., Marlborough, Mass. An exemplary aliquoting module 1060 is described in U.S. Pat. No. 9,335,336. Each analyzer module or analytical instrument 1000 is configured for processing specimens contained in selected receptacles 50, e.g., by performing analytical tests on the specimens. Such tests may include molecular tests (e.g., nucleic acid-based assays), sequencing assays, immunoassays, chemistry analyses, etc. Exemplary analytical instruments 1000 include automated analyzers such as, e.g., the Tigris®, Panther®, and Panther Fusion® systems sold by Hologic, Inc., Marlborough, Mass. The receptacle storage module 1050 is configured for storing receptacles 50. In some cases, receptacle storage module 1050 may be configured for storing completed receptacles 50 (i.e., receptacles containing fluids or specimens for which the workflow has been completed) for subsequent manual removal from the receptacle storage module 1050 by an operator. In other cases, receptacle storage module 1050 may be configured for storing non-completed receptacles 50 (i.e., receptacles containing specimens for which the workflow has not been completed) in a controlled environment for subsequent processing by the other modules.

Figure 1B:
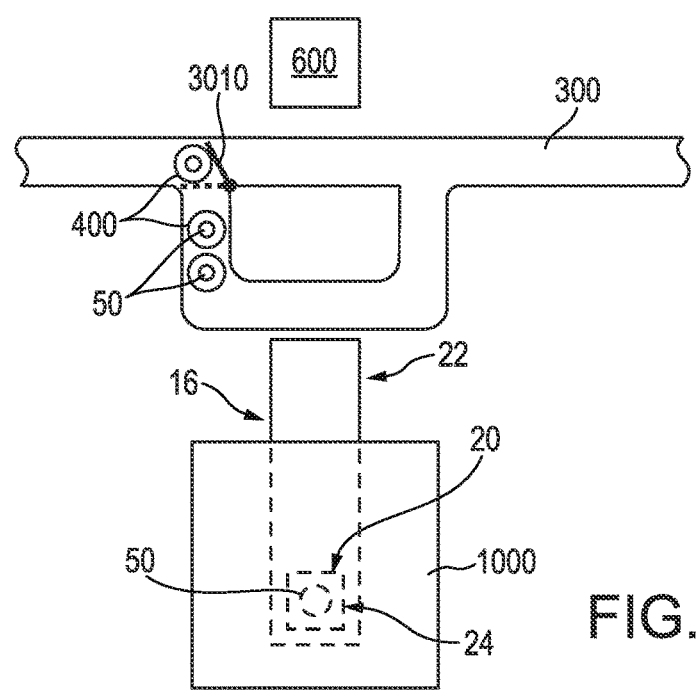
FIG. 1B is an illustration of a portion of FIG. 1A in more detail.

With reference to FIG. 1A, conveyor system 3000 may also include a work management system (WMS) software module 1070 configured for coordinating workflow and high-level receptacle traffic in conveyor 300. WMS software module 1070 can be conceptualized as a minimum cloud database that maintains the status of all receptacles 50 and instruments 1000-1060 in the automated specimen processing system, and controls assay specific workflows for the receptacles. In particular, the WMS software module 1070 identifies assays to be run for the specimen in any particular receptacle 50 based on encoded information read by a barcode reader (not shown) of the loading module 1010, and generates an assay specific work flow, including pre-analytical and post-analytical steps, such as, e.g., de-capping, aliquoting, capping, centrifuging, storage, repeat testing, reflex testing, additional testing, etc. Conveyor system 3000 may also include a conveyor controller 1080 configured for controlling the low-level functions of the automated conveyor system 3000, such as transporting the receptacle carriers, along with the supporting specimen-containing receptacles (i.e., the occupied receptacle carriers), between the various instruments of laboratory. Thus, the conveyor controller 1080 controls which instruments 1000-1060 the occupied receptacle carriers will be diverted to and which instruments the occupied receptacle carriers will bypass. Conveyor controller 1080 may direct a receptacle carrier towards an instrument 1000-1060 by controlling the position of a gate 3010 on conveyor 300. With reference to FIG. 1B, when gate 3010 is positioned in a first position (the position shown in FIG. 1B), carriers 400 moving on conveyor 300 will be diverted towards analytical instrument 1000, and when gate 1010 is positioned in a second position (the position shown using dashed lines in FIG. 1B), the carriers 400 moving on conveyor 300 will bypass analytical instrument 1000. Conveyor controller 1080 may also be configured for controlling low-level error handling and basic display of information. The conveyor controller 1080 is also configured for managing communication between the various instruments of the automated specimen processing system and the WMS software module 1070.

Figure 2A:
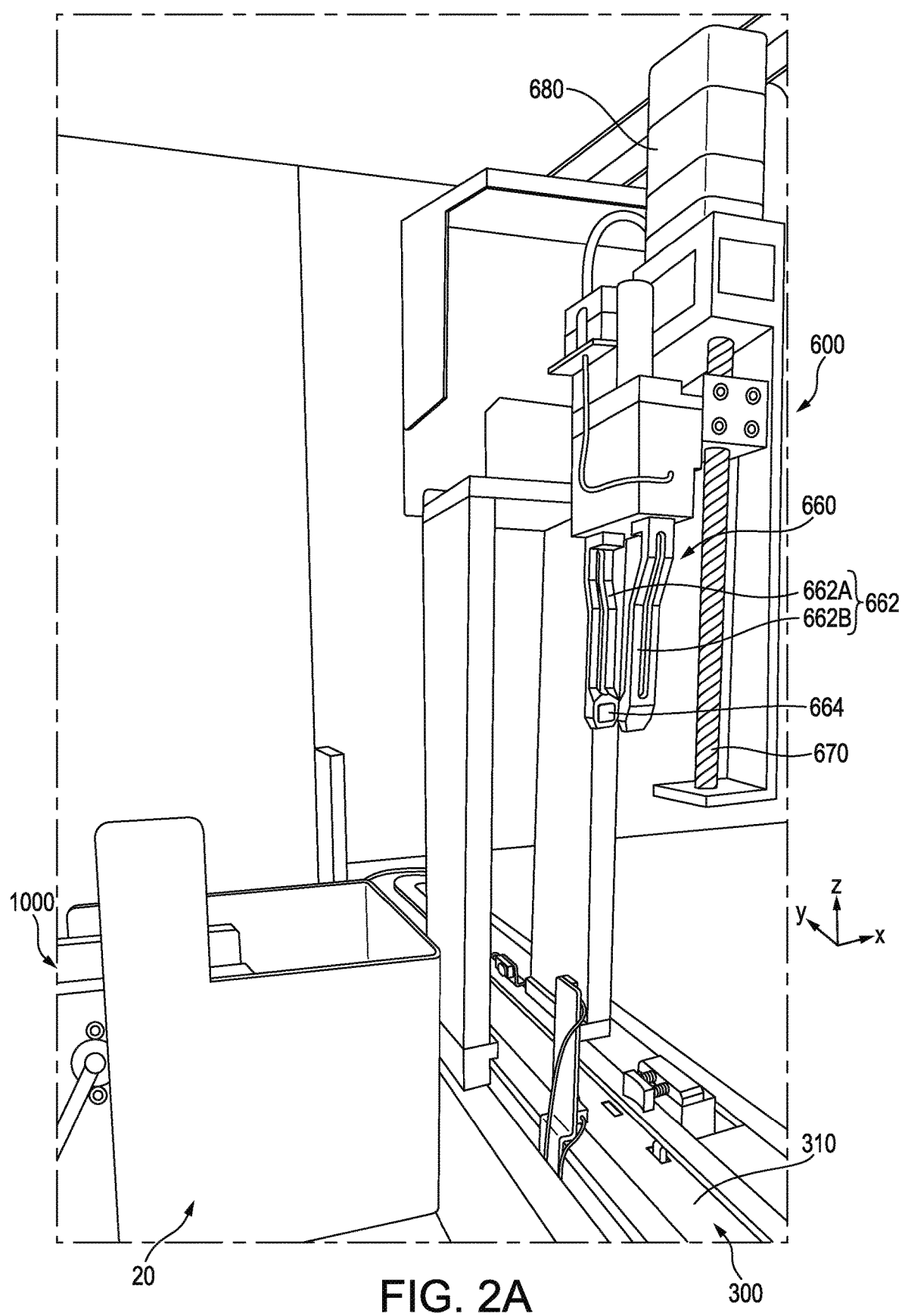
FIGS. 2A-2J illustrate different views of an exemplary conveyor of FIG. 1A.
Figure 2B:
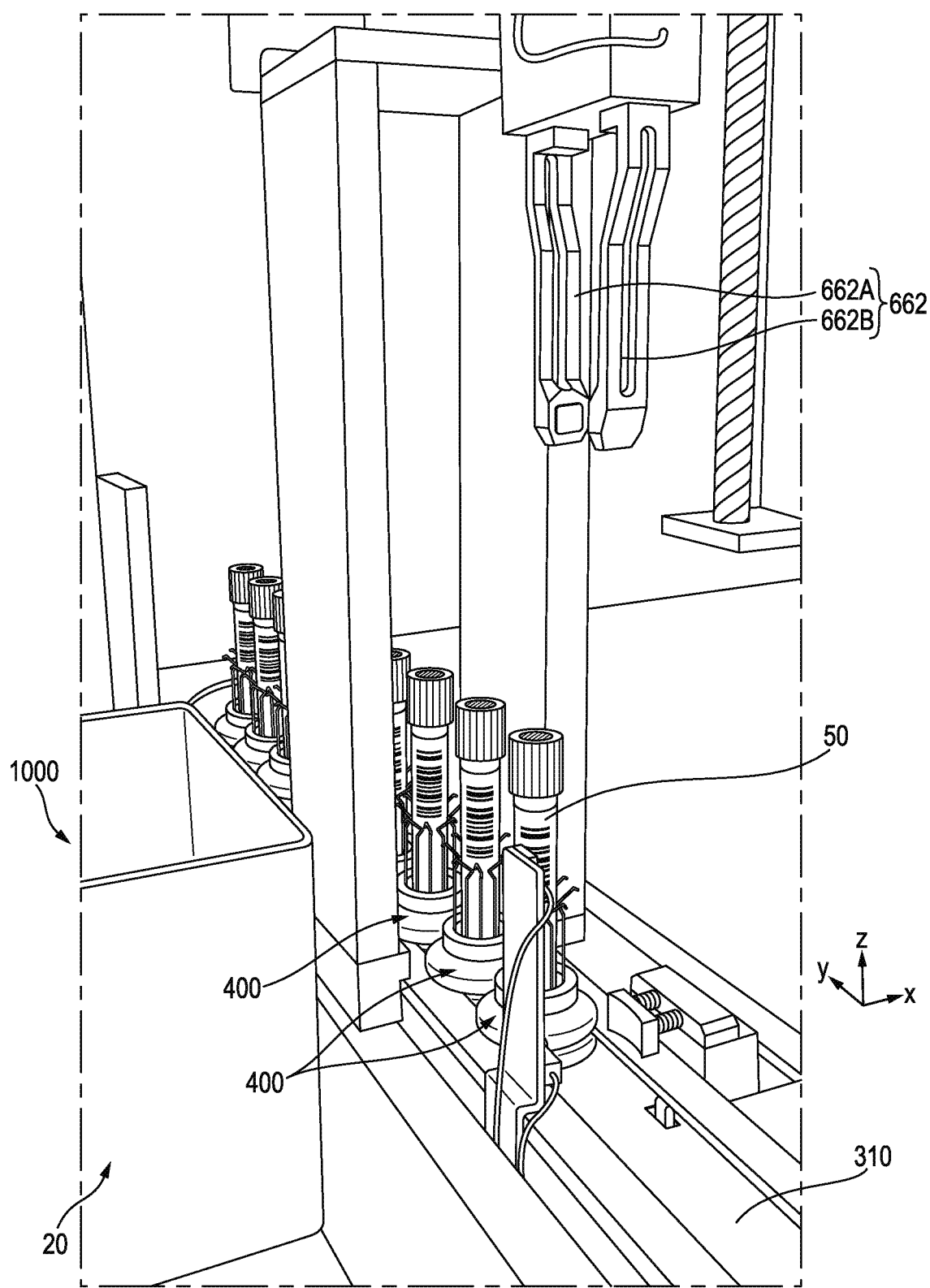

In some embodiments, a receptacle 50 may be transported on conveyor 300 between the different instruments 1000-1060 supported in a carrier 400 (see, for example, FIG. 2B). In some embodiments, each carrier 400 may support a single receptacle 50. It is also contemplated that, in some embodiments, a single carrier may support multiple receptacles 50. In general, carrier 400 may have any configuration. In some embodiments, carrier 400 may have a configuration/structure generally similar to puck 100 (e.g., see FIG. 5A) discussed later. Exemplary carriers that may be used on conveyor 300 are described in U.S. Pat. Nos. 7,485,264, 8,147,778, and 10,041,965, and U.S. Patent Application Nos. 2006/0222573, 2017/0153262, 2017/0248623, and 2018/0052183.

With reference to FIG. 1B, some or all of the multiple instruments 1000-1060 (e.g., analytical instrument 1000) may include a shuttle 16 configured to transport a receptacle 50 from a location proximate conveyor 300 to a location within instrument 1000. Shuttle 16 includes a carriage 20 that travels between a first location (e.g., a receptacle pick-up location or a first end 22) positioned proximate conveyor 300 to a second location (e.g., a pipetting location or a second end 24) located within instrument 1000 along a path. It should be noted that first end 22 may be a location within instrument 1000 or a location outside instrument

1000. A pick-and-place device 600 may be configured to transfer receptacles 50 between carriage 20 of instrument 1000 and carrier 400 on conveyor 300. With reference to FIGS. 1B and 1C, pick-and-place device 600 may have a robotic arm 660 with fingers or grasping members 662 configured to grasp and transfer a receptacle 50 from conveyor 300 to carriage 20 of shuttle 16 (and vice versa). Carriage 20 is configured to receive receptacle 50 from robotic arm 660 and transport receptacle 50 from first end 22 to second end 24. When carriage 20 is positioned at second end 24 (see FIGS. 3G and 10A), a suitable fluid or sample extraction device (such as, for example, automated pipettor 150) of instrument 1000, removes at least an aliquot of the fluid from receptacle 50. After a sufficient amount of the fluid is removed from receptacle 50, carriage 20 transports receptacle 50 back to first end 22. Grasping members 662 of robotic arm 660 may then pick receptacle 50 from carriage 20 and transfer receptacle 50 to a carrier (the same or a different carrier) positioned on conveyor 300. Conveyor 300 may then transport the carrier with the transferred receptacle to another instrument or module 1000-1060 (e.g., receptacle storage module 1050 for temporarily holding receptacles 50 in a refrigerated state).

It should be noted that although an exemplary embodiment where a robotic arm 660 having a two-fingered grasper with two grasping members 662A and 662B is illustrated in FIG. 1C, this is not a requirement. In general, robotic arm 660 may include any number of grasping members of any suitable configuration. Additionally, although receptacle 50 is described as being physically transferred from conveyor 300 to shuttle 16, this is not a requirement. In general, any type of pick-and-place device 600 having any suitable configuration of robotic arm 600 may be used to transfer receptacle 50 between conveyor 300 and shuttle 16. In some embodiments, instead of physically transferring a receptacle 50 from conveyor 300 to shuttle 16, fluid from a receptacle 50 supported by conveyor 300 (e.g., in a carrier 400) may be transferred into a new receptacle supported by shuttle 16 (e.g., extracted from one receptacle and deposited into another receptacle by a sample or fluid extraction device). It should be noted that conveyor 300 described with reference to FIGS. 1A-1C (and below with reference to FIGS. 2A-2J) is only exemplary. In general, any suitable transport system configured to transport fluid containing receptacles between instruments in a laboratory may be used as conveyor 300. Exemplary conveyor system 3000 and conveyors 300 that may be used include commercially available systems from FlexLink, Inpeco (Flexlab, FlexLab-HT, etc.), Integrated Drive Systems (e.g., IDS-CLAS-X1), Thermo Fisher Scientific, Hitachi, MagneMotion, GLP, etc.

Figure 2D:
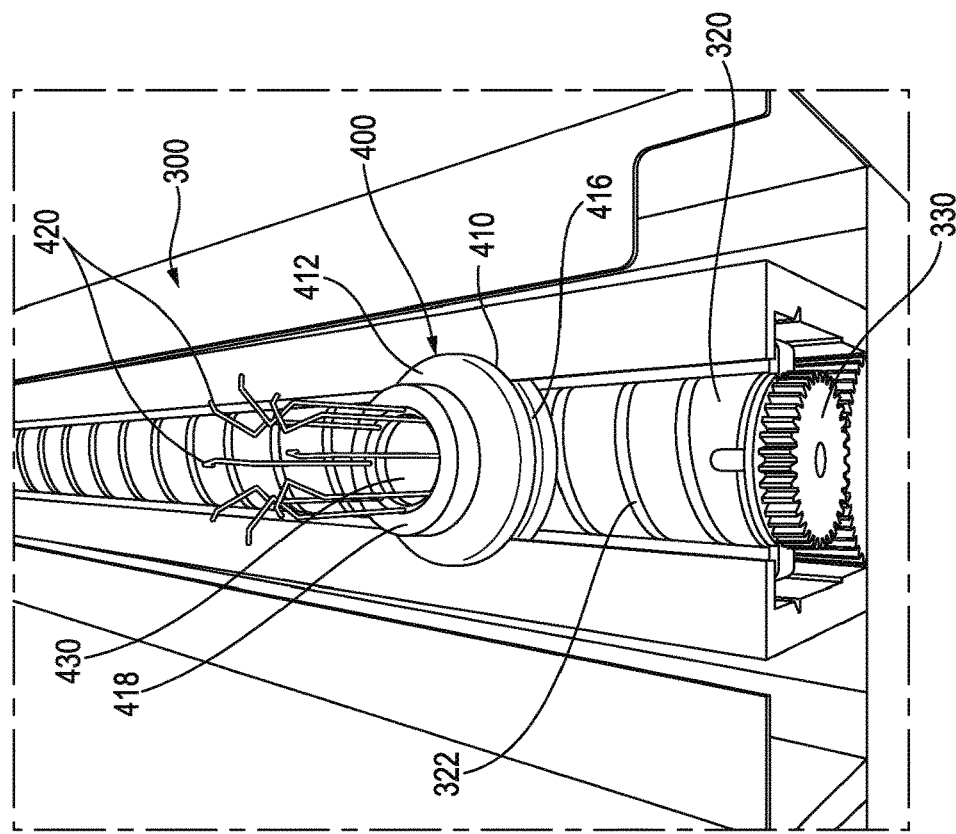
Figure 2C:
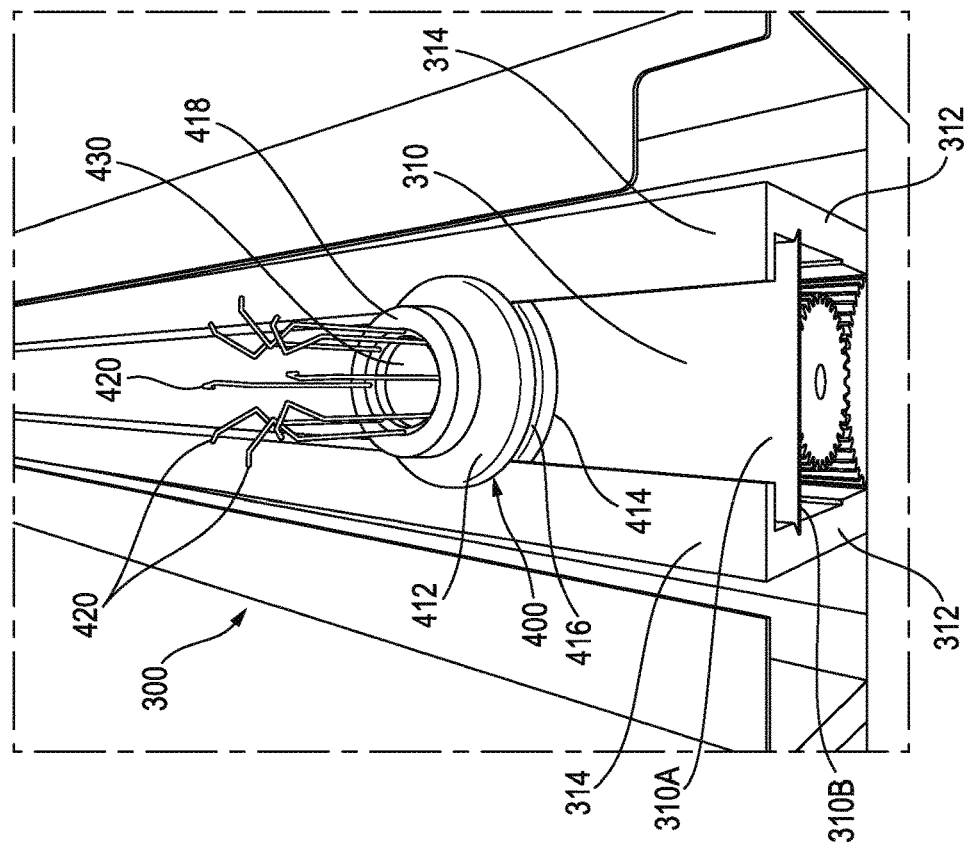

FIGS. 2A-2J illustrate different views of an exemplary conveyor 300 extending adjacent to an instrument 1000 in an exemplary embodiment. With reference to FIG. 2A, conveyor 300 extends by instrument 1000 such that, when carriage 20 of instrument 1000 is positioned at its first end 22, carriage 20 is located proximate conveyor 300. As explained previously, when carriage 20 is positioned at first end 22, robotic arm 660 of pick-and-place device 600 can transfer a receptacle 50 from conveyor 300 to carriage 20. FIG. 2B illustrates multiple disc or puck-like carriers 400 approaching instrument 1000 on conveyor 300. With reference to FIGS. 2A and 2B, conveyor 300 includes a track 310 that conveys (e.g., propels, moves, supports (as in the case of a self-propelled carrier), etc.) the multiple carriers 400 to and/or between different instruments 1000 in the laboratory. Carriers 400 transported on track 310 include carriers supporting receptacles 50 (e.g., carriers 400 with receptacles 50 containing fluids or samples, receptacles from which a portion of their samples have been removed for processing, and empty receptacles 50) and carriers 400 that do not support receptacles 50 (e.g., carriers 400 from which receptacles 50 have been transferred to an instrument 1000). In general, conveyor 300 may propel or move the carriers 400 between modules along track 310 in any manner. In some embodiments, magnetic force may be used to move carriers 400 on track 310. FIGS. 2C and 2D illustrate an exemplary embodiment of conveyor 300 that uses magnetic force to move carriers 400 thereon. FIG. 2C illustrates a portion of conveyor 300 including track 310, and FIG. 2D illustrates the conveyor of FIG. 2C with track 310 removed to show components positioned below track 310. As best seen in FIG. 2C, track 310 may be a substantially flat piece or strip of material supported, for example, by grooves formed on rails 312 positioned on either side of track 310. Track 310 may be formed (in whole or in part) of any rigid material, such as, for example, metal (e.g., steel, aluminum, etc.), plastics (polyethylene, polypropylene, polyacetal, etc.), ceramics, rigid organic materials (e.g., wood, etc.), etc.

As best seen in FIGS. 2C and 2D, carrier 400 may include a substantially cylindrical base 410 having a top surface 412 and a bottom surface 414. Bottom surface 414 of base 410 may be supported on track 310 of conveyor 300. Base 410 may also include a circumferential groove 416 positioned between its top and bottom surfaces 412, 414. Inwardly extending flanges 314 positioned on a top section of rails 312 may project into the circumferential groove 416 of base 410 to retain carrier 400 on conveyor 300 and, in some embodiments, prevent its accidental removal therefrom (e.g., when receptacle 50 is removed from carrier 400 by gripper 750 of pick-and-place device 600). In some embodiments, bottom surface 414 of base 410 may rest on the top surface of track 310 when flanges 314 of rails 312 are positioned in groove 416 of base 410. In some embodiments, bottom surface 414 of base 410 may not rest on, but may be positioned close to, the top surface of track 310 when flanges 314 are positioned in groove 416. In the current disclosure, reference to base 410 being supported on track 310 (or carrier 400 supported on track 310) is intended to refer to both an embodiment where bottom surface 414 of base 410 rests on (i.e., physically contacts) track 310 and an embodiment where bottom surface 414 of base 410 is suspended over and positioned in close proximity to the top surface of track 310.

Top surface 412 of base 410 includes a cavity or a pocket 430 configured to receive and support the base of a receptacle 50 therein. An annular flange 418 is attached to top surface 412 such that an inner opening of flange 418 aligns with pocket 430 of base 410. A plurality of fingers 420 extend upward from flange 418. The plurality of fingers 420 may be arranged, for example, in a circle around the inner opening of flange 418. When the base of receptacle 50 is supported in pocket 430 of base 410, the plurality of fingers 420 support receptacle 50 in an upright orientation on carrier 400 (see FIGS. 2B, 2H). The plurality of fingers 420 are arranged to receive receptacle 50 in the space formed between them. When a receptacle 50 is inserted between fingers 420, the fingers deflect radially outward to allow receptacle 50 to slide between fingers 420 and fit into pocket 430 of base 410. The elastic restoring force of fingers 420 apply a radially inward force against the cylindrical wall of receptacle 50 and maintains receptacle 50 in an upright position between the plurality of fingers 420 (see FIGS. 2B, 2H). Fingers 420 may be made of any suitable material having elastic properties. It is also contemplated that, in some embodiments, fingers 420 of carrier 400 may be spring-loaded fingers similar to the fingers 102 of puck 100 that will be described later.

A magnet (not shown) may be attached to, or embedded in, base 410 of carrier 400. In some embodiments, the magnet may be attached to base 410 proximate its bottom surface 414. Exemplary carriers that may be used on conveyor 300 are described in U.S. Provisional Application No. 62/891,728.

Referring again to FIGS. 2C and 2D, conveyor 300 includes a cylindrical member 320 positioned below track 310 between rails 312. As best seen in FIG. 2D, cylindrical member 320 extends in the direction of travel of carrier 400 on conveyor 300. During operation, a motor (not shown) rotates cylindrical member 320 via a gear 330 coupled to cylindrical member 320. The cylindrical outer surface of cylindrical member 320 includes a ferromagnetic member 322 arranged helically around cylindrical member 320. Ferromagnetic member 322 may be formed of any ferromagnetic material and may be attached to cylindrical member 320 in any manner. In some embodiments a ferromagnetic material (e.g., iron) may be attached to a helical groove formed on the cylindrical outer surface of cylindrical member 320 to form ferromagnetic member 322. In some embodiments, a strip of a ferromagnetic material may be attached to the cylindrical outer surface of cylindrical member 320 in a helical pattern to form ferromagnetic member 322. When carrier 400 is supported on a top surface 310A of track 410 (see FIG. 2C), the magnet in base 410 of carrier 400 attracts the portion of ferromagnetic member 322 (on the cylindrical outer surface of cylindrical member 320) that faces a bottom surface 310B of track 310. When cylindrical member 320 rotates, the portion of ferromagnetic member 322 that faces the bottom surface of track 310 appears to move in a linear direction along the length of track 310, and the attractive force between the ferromagnetic member 322 and the magnet embedded in carrier 400 propels or moves the carrier along track 310. Exemplary conveyors that may be used to propel carriers using magnetic attraction and carriers that may be used with such conveyors are described in U.S. Pat. Nos. 9,766,258 and 9,776,811.

Figure 2E:
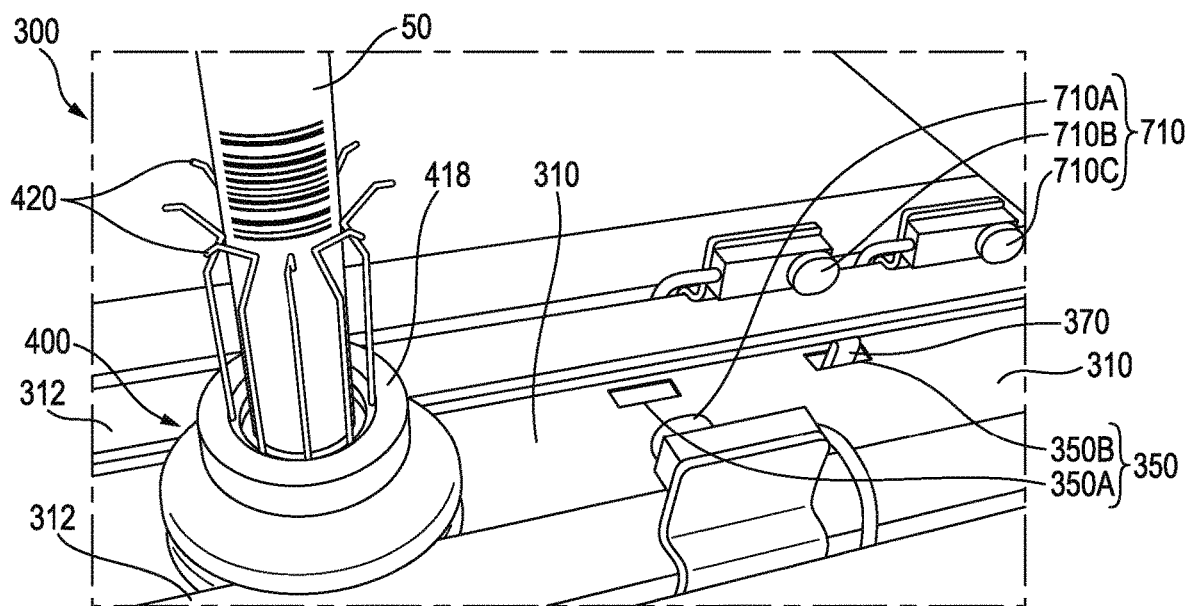
Figure 2F:
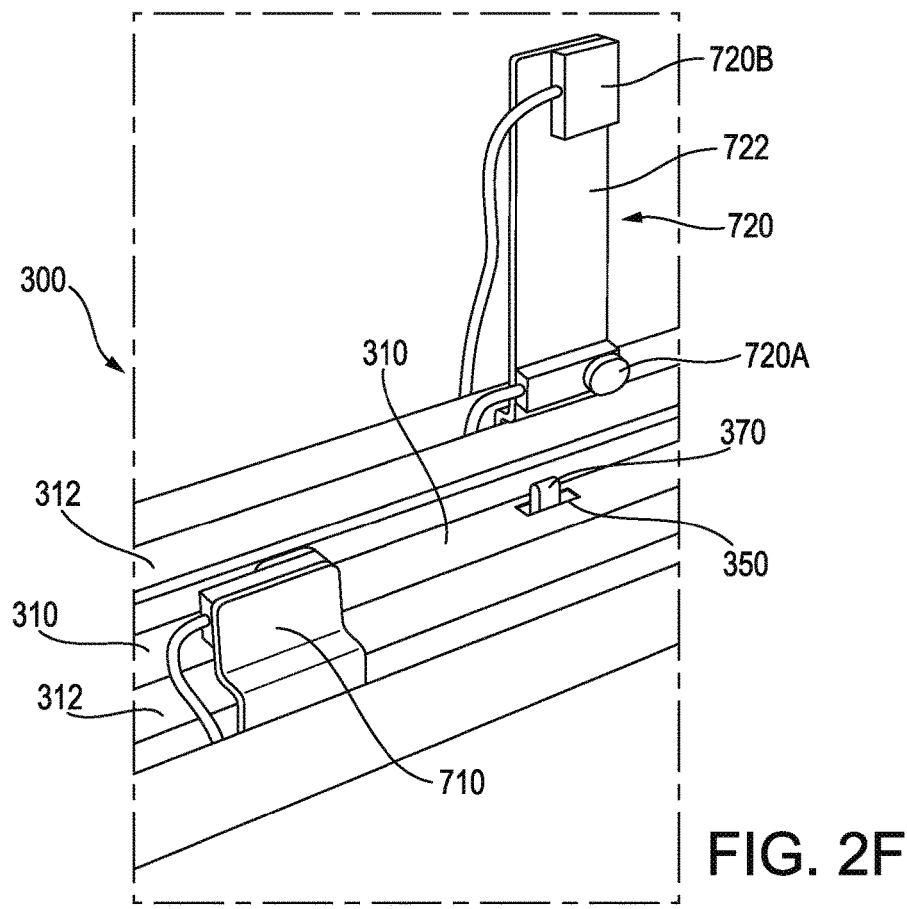

Conveyor 300 includes sensors configured to detect, among other things, a carrier 400 on track 310. FIGS. 2E and 2F illustrate portions of conveyor 300 with exemplary sensors. These sensors may include, among others, one or more first sensors 710 (see first sensors 710A, 710B, 710C in FIG. 2E) and one or more second sensors 720 (see FIG. 2F). Sensors 710 and 720 may include any type of sensor configured to detect a carrier 400 on track 310. Although not a requirement, in some embodiments, one or both of first and second sensors 710, 720 may be optical sensors. For example, with reference to FIG. 2E, when a carrier 400 is positioned proximate to (e.g., at region of track 310 in front of) sensor 710A, signal from this sensor may indicate (e.g., to conveyor controller 1080 (see FIG. 1A) that controls the operation of conveyor 300) the presence of carrier 400 at that location of track 310. When carrier 400 moves on track 310 and is positioned proximate sensor 710B, signals from sensor 710B may indicate that carrier 400 is now proximate sensor 710B. Thus, based on signals from sensors 710A, 710B, and 710C, conveyor controller 1080 may identify the location of carriers 400 on conveyor 300. In addition to detecting the presence of a carrier 400, sensors positioned at some locations of conveyor 300 may also detect whether a receptacle 50 is supported on carrier 400. For example, second sensor 720 (of FIG. 2F) may include both a carrier sensor 720A and a receptacle sensor 720B. When a carrier 400 is positioned proximate sensor 720, a signal from carrier sensor 720A may indicate the presence of the carrier, and a signal from (or the lack of a signal from) receptacle sensor 720B may indicate whether a receptacle 50 is supported on carrier 400. Carrier sensor 720A and receptacle sensor 720B may include any type of sensor. In some embodiments, one or both of these sensors may be optical sensors, for example, substantially similar to first sensor 710. In some embodiments, second sensor 720 may comprise a vertical post 722 with carrier sensor 720A and receptacle sensor 720B arranged at different heights thereon. Although not a requirement, in some embodiments, as illustrated in FIGS. 2E and 2F, first and second sensors 710, 720 may be attached to rails 312 positioned alongside track 310.

Figure 2G:
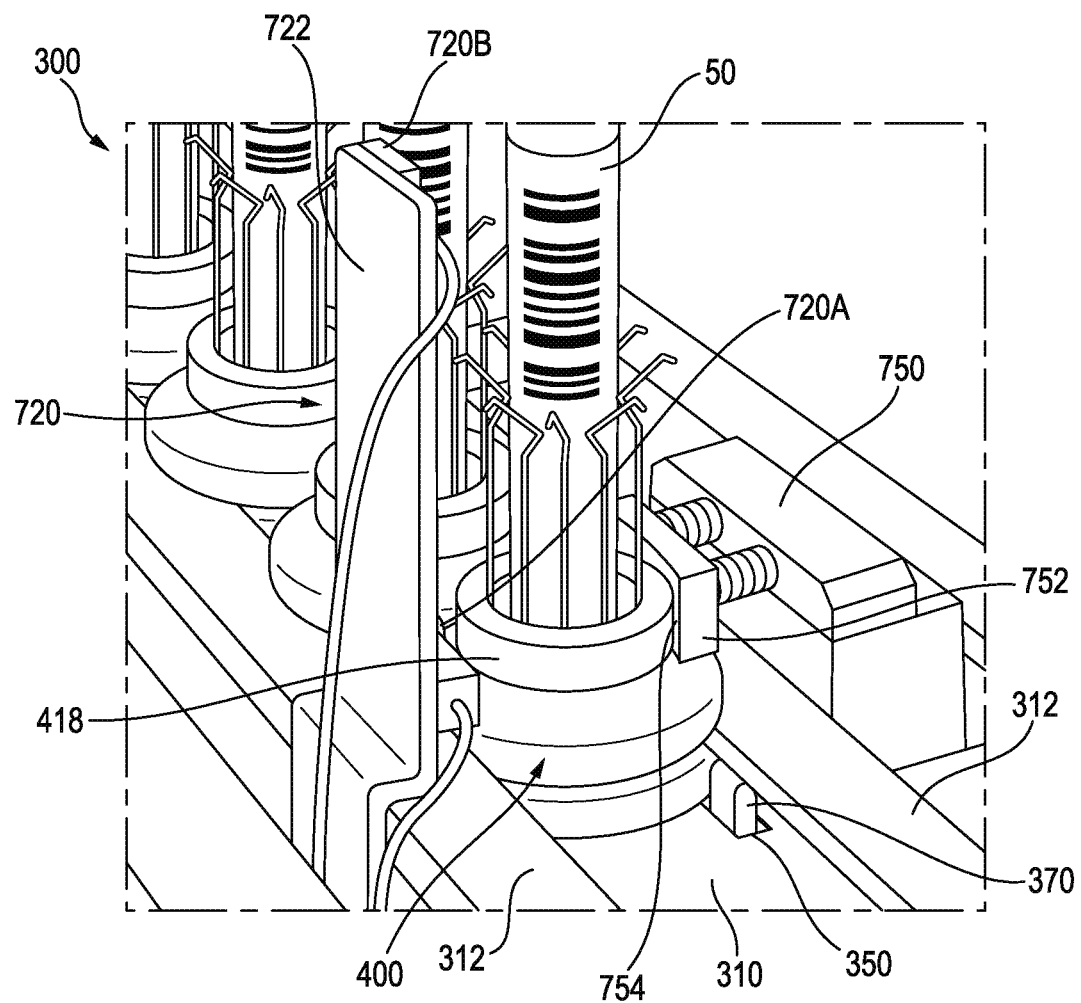

As best seen in FIG. 2E, track 310 may include a plurality of through-holes or cavities 350 (e.g., first cavity 350A, second cavity 350B, etc.). Stop elements 370 may be configured to selectively extend through respective cavities 350. In some embodiments, conveyor controller 1080 may selectively activate a stop element 370 to extend through a selected cavity (e.g., second cavity 350B) on track 310. When activated, a stop element 370 protrudes out of second cavity 350B such that a carrier 400 moving on track 310 is stopped, or blocked from further movement, by stop element 370. And, when not activated, stop element 370 is positioned below the cavity on track 310 (see cavity 350A). In some embodiments, as illustrated in FIGS. 2E and 2F, a sensor (e.g., first sensor 710B of FIG. 2E and second sensor 720 of FIG. 2F) may be positioned proximate a cavity 350 such that, a carrier 400 stopped by a stop element 370 extending through the cavity is aligned with (e.g., positioned in a zone of detection of) the sensor. In some embodiments, when the sensor is an optical sensor, the blocked carrier 400 may be positioned in a line-of-sight of the optical detectors of the optical sensor. With specific reference to FIG. 2E, it should be noted that, because of the cylindrical shape of base 410 of carrier 400, cavity 350B may not be positioned directly in front of sensor 710B. Instead, the horizontal spacing between sensor 710B and cavity 350B may be such that, when carrier 400 is stopped by a stop element 370 extending through cavity 350B, carrier 400 (e.g., annular flange 418 of carrier 400) is aligned with sensor 710B. Similarly, with reference to FIGS. 2F and 2G, when carrier 400 is stopped proximate second sensor 720 by stop element 370 extending through cavity 350, carrier sensor 720A of second sensor 720 may be aligned with carrier 400 (e.g., annular flange 418 of carrier 400), and receptacle sensor 720B may be aligned with receptacle 50, if any, supported by carrier 400. In some embodiments, as illustrated in FIG. 2G, when a carrier 400 is stopped by stop element 370, the carriers moving on track 310 behind the stopped carrier 400 will collect behind and press against stopped carrier 400. In some embodiments, with reference to FIG. 2E, when a carrier 400 is stopped by a stop element 370 of cavity 350B, the stop element of cavity 350A may be activated to project out of cavity 350A and block the carriers behind the stopped carrier 400.

As illustrated in FIG. 2G, in some embodiments, conveyor 300 may include a gripper 750 positioned proximate a stop element 370. Gripper 750 may include a grip head 752 that may be actuated by, for example, conveyor controller 1080. For example, when a carrier 400 is stopped by stop element 370, conveyor controller 1080 may activate gripper 750 to extend grip head 752 towards and apply a retention force on the stopped carrier 400 to restrain or immobilize the carrier 400. In some embodiments, in its extended state, grip head 752 may press against and apply a retention force on annular flange 418 of carrier 400. This retention force may immobilize the stopped carrier and aid in preventing vibrations. in the carrier 400 that can translate to the receptacle 50 supported thereby, especially when carriers 400 collect behind and, in some cases, press against the stopped carrier 400. In some embodiments, the retention force applied by grip head 752 may also assist in retaining carrier 400 on track 310 when receptacle 50 is removed from carrier 400 by robotic arm 660 of pick-and-place device 600 (see FIG. 1B). In some embodiments, grip head 752 may be made of an elastomeric or another relatively compliant material. In some embodiments, a front surface 754 of grip head 752 may be a curved surface (e.g., a concavely curved surface) to conform with the curved side surface of annular flange 418 that it presses against. Gripper 750 may be actuated by any suitable method (e.g., pneumatically, hydraulically, electrically, magnetically, electro-magnetically, etc.).

In some embodiments, as illustrated in FIG. 2G, gripper 750 may be positioned on a side of track 310 opposite to a sensor (e.g., second sensor 720 in FIG. 2G). Although not a requirement, in some embodiments, second sensor 720 may be attached to a rail 312 on one side of track 310 and gripper 750 may be attached to rail 312 on the other side of track 310. In some embodiments, stop element 370 (or cavity 350 from which stop element 370 extends), gripper 750, and second sensor 720 may be positioned relative to each other such that, when carrier 400 is blocked by stop element 370, grip head 752 contacts annular flange 418 (when actuated), and second sensor 720 is aligned with carrier 400 (e.g., carrier sensor 720A is aligned with annular flange 418 of carrier 400 and receptacle sensor 720B is aligned with receptacle 50 supported by carrier 400).

Figure 2H:
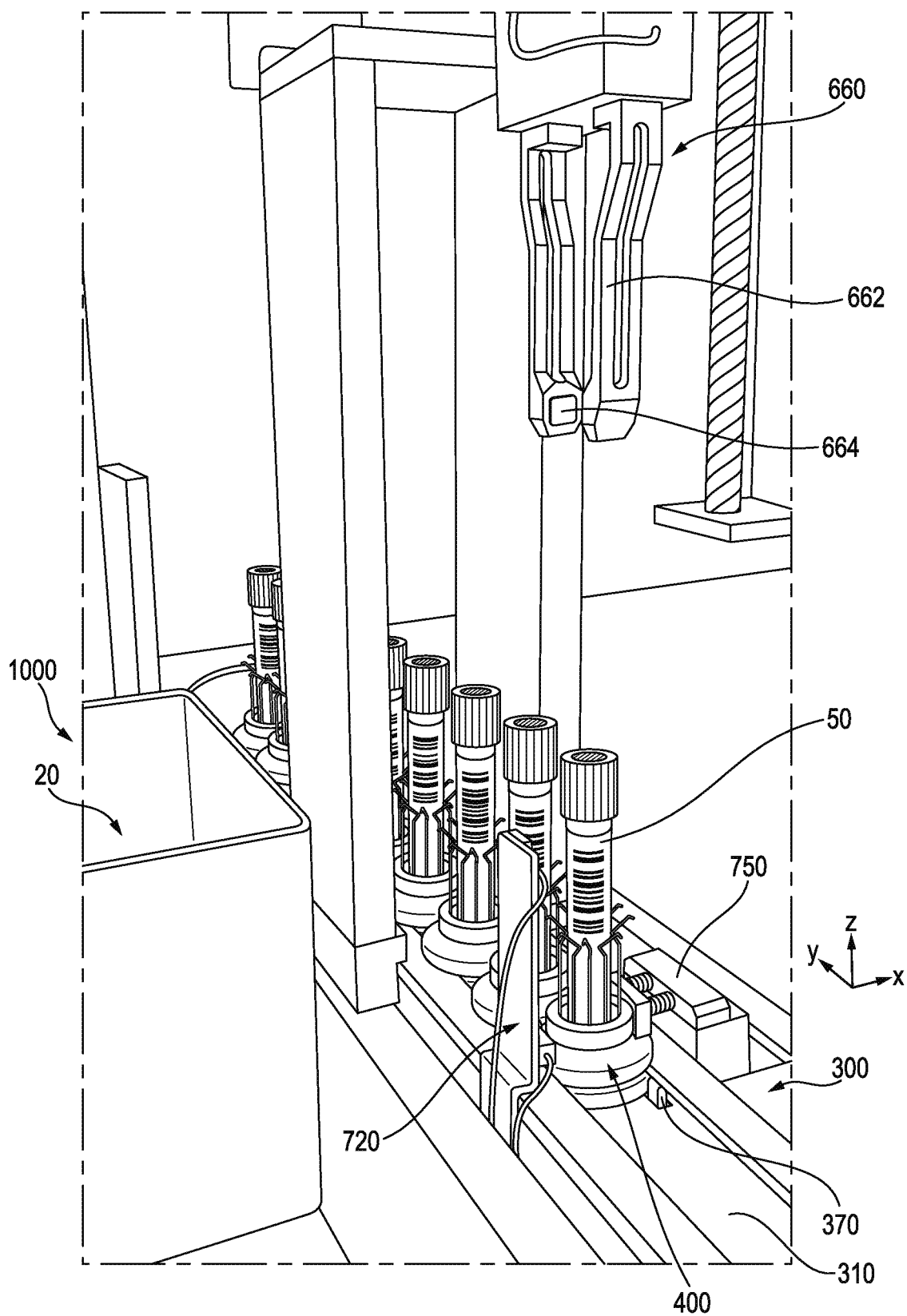

With reference to FIGS. 2G and 2H, in some embodiments, stop element 370, second sensor 720, and gripper 750 (see FIG. 2G) may be positioned on a section of conveyor 300 located proximate to instrument 1000. In some such embodiments, when a carrier 400 moving on track 310 is stopped by stop element 370, immobilized by gripper 750, and second sensor 720 detects that receptacle 50 is supported in carrier 400, control unit 800 may direct robotic arm 660 of pick-and-place device 600 (see FIG. 2A) to move to a position above receptacle 50 (see FIG. 2H). With reference to FIG. 2A, pick-and-place device 600 may be configured to move robotic arm 660 up and down (e.g., vertically in the Z direction) on a lead screw 670, and side-to-side (e.g., horizontally in the X and/or Y directions) on a gantry (not shown). Grasping members 662A, 662B of robotic arm 660 are also configured to move towards each other (e.g., to close the grasping members) to grasp a receptacle 50 between them, and to move away from each other (e.g., to open the grasping members) to release receptacle 50. As is known in the art, in some embodiments, robotic arm 660 may be configured to monitor and/or control the amount of pressure applied by grasping-member 662A, 662B on receptacle 50. In some embodiments, as best seen in FIGS. 2A and 2H, the surfaces of grasping members 662 that are configured to contact receptacle 50 may include a contact member 664 to reduce the likelihood of damage to receptacle 50. In some embodiments, contact member 664 may include an elastomeric or other compliant material attached to grasping members 662. An electric motor 680 may assist in the operations of robotic arm 660. Since pick-and-place devices for grasping and moving receptacles, and their method of operation, are well known in the art, they are not described in detail herein.

Figure 2I:
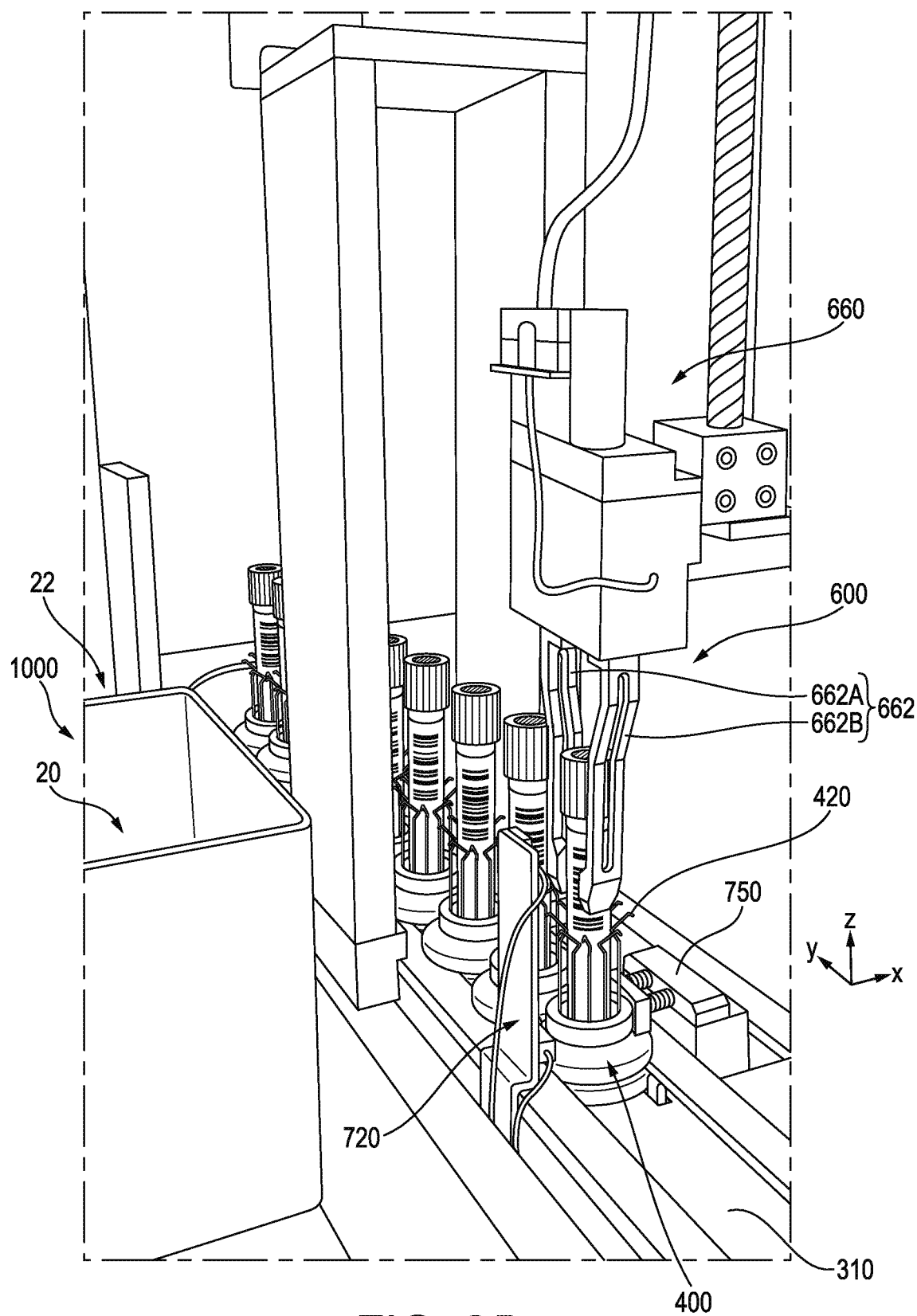
Figure 2J:
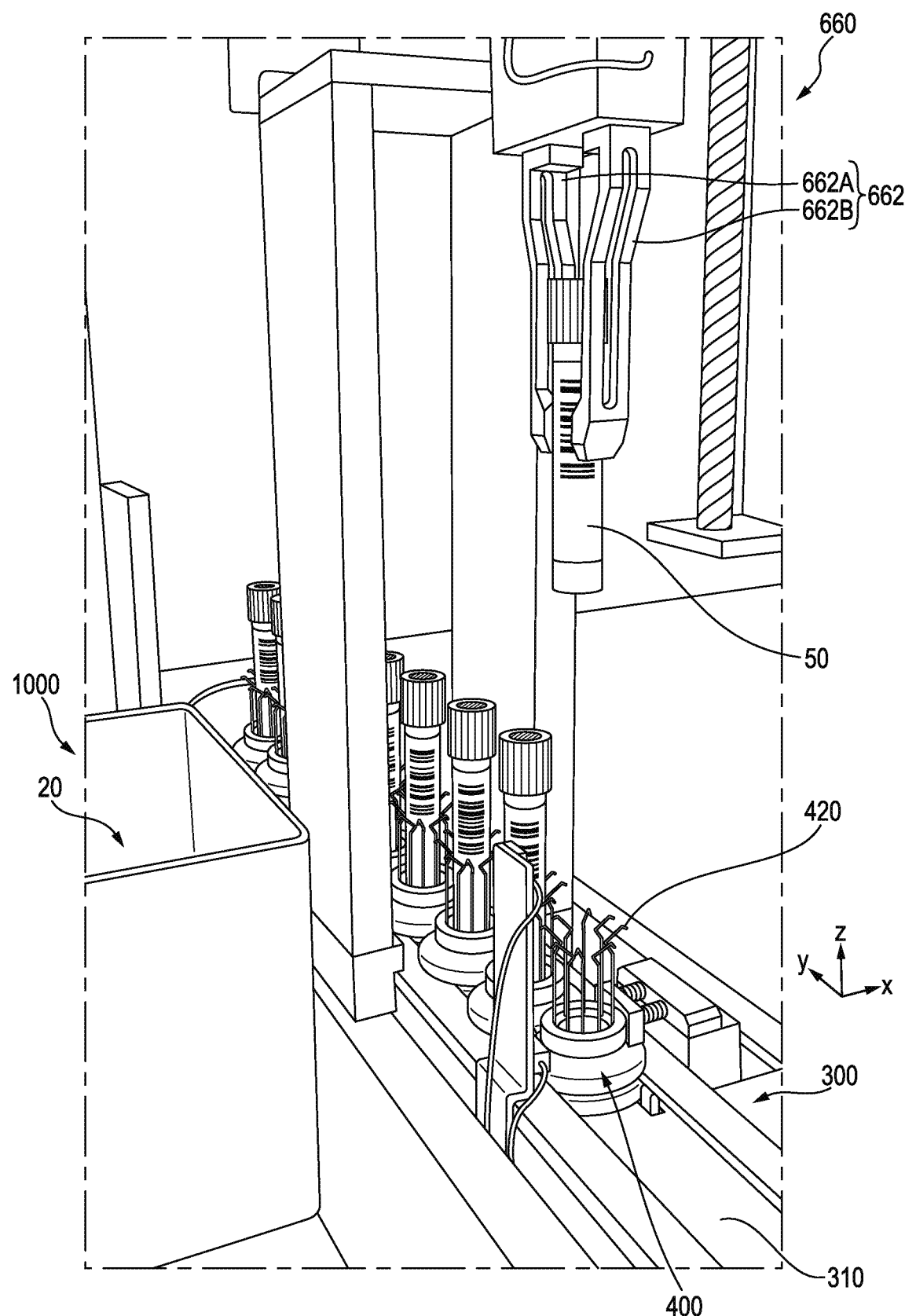

Referring to FIGS. 2H-2J, with robotic arm 660 positioned above the restrained or immobilized carrier 400 on track 310 (see FIG. 2H), electric motor 680 may operate to move robotic arm 660 downwards towards carrier 400 (e.g., in the −Z direction) and grasp receptacle 50 supported on carrier 400 with grasping members 662. See FIG. 2I. With receptacle 50 securely grasped by grasping members 662, robotic arm 660 may move upwards (e.g., in the +Z direction) to lift receptacle 50 from between fingers 420 of carrier 400. See FIG. 2J. Robotic arm 660 may then move horizontally in the X and/or Y direction towards carriage 20 of instrument 1000 positioned at first end 22 of shuttle 16. Robotic arm 660 may then move downwards towards carriage 20 to deposit receptacle 50 between the spring-loaded fingers 102 of puck 100 that is positioned on carriage 20 (as will be described in more detail below, for example, with reference to FIGS. 5A-5D). Pick-and-place device 600 may also operate in a similar manner to transfer a receptacle 50 from carriage 20 of instrument 1000 back to a carrier 400 (the same or a different carrier) on conveyor 300. For example, when carriage 20 with a receptacle 50 (e.g., a receptacle from which fluid or sample has been extracted by instrument 1000 for testing) is positioned at first end 22 of shuttle 16, robotic arm 660 of pick-and-place device 600 may descend to grasp and pick up receptacle 50 from carriage 20 using its gasping-members 662. With receptacle 50 secured between grasping members 662, robotic arm 660 may move in the vertical (e.g., Z) and horizontal (e.g., X and/or Y) directions to transfer receptacle 50 to a carrier 400 positioned on conveyor 300. In some embodiments, carrier 400 to which receptacle 50 is transferred to may also be secured by grip head 752 of gripper 750 as explained previously. Conveyor 300 may then transport carrier 400 with receptacle 50 to another instrument 1000 or module (e.g., a storage module, output module, capping module, etc.) in the laboratory (see FIG. 1A).

Figure 3B:
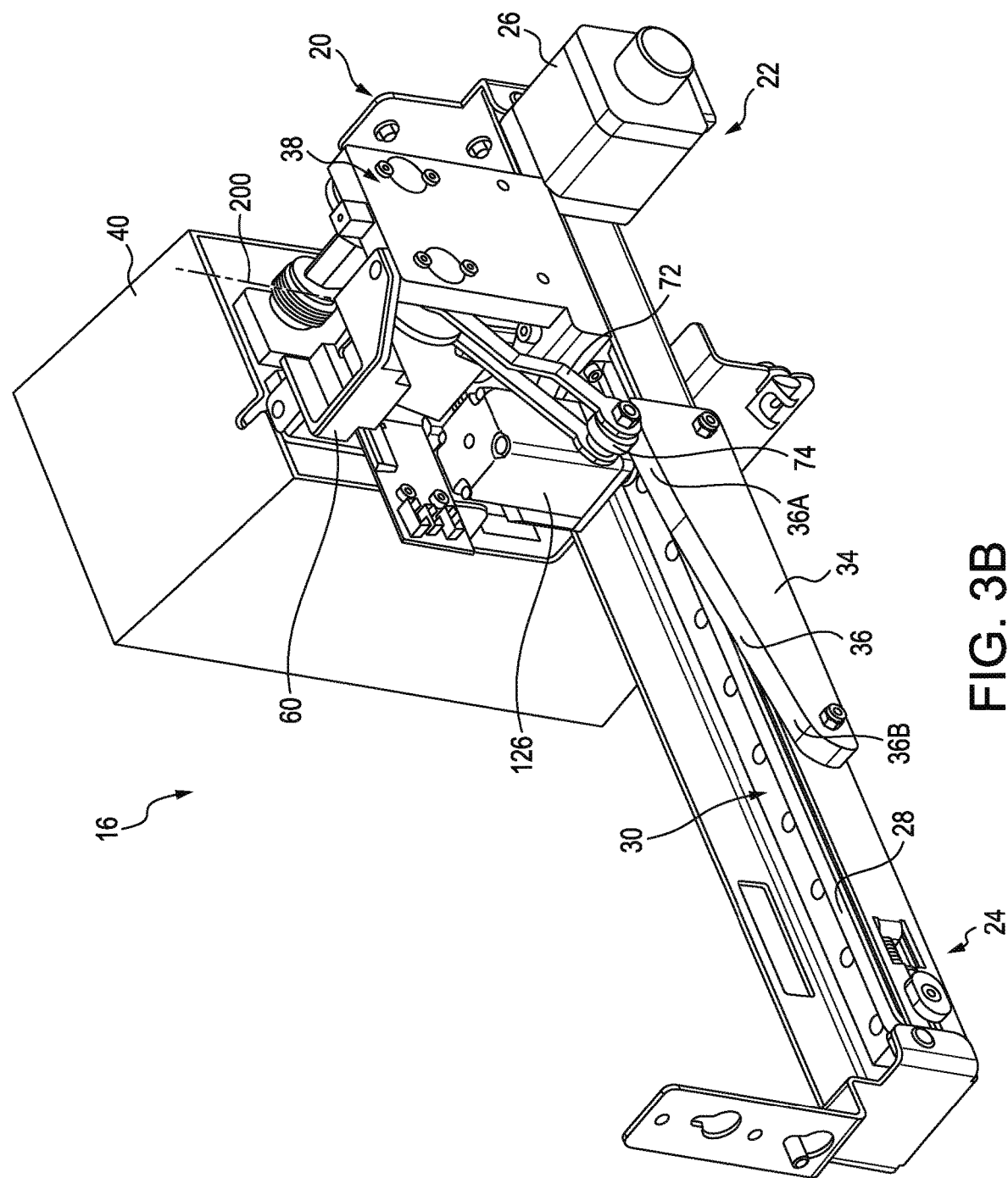
Figure 3C:
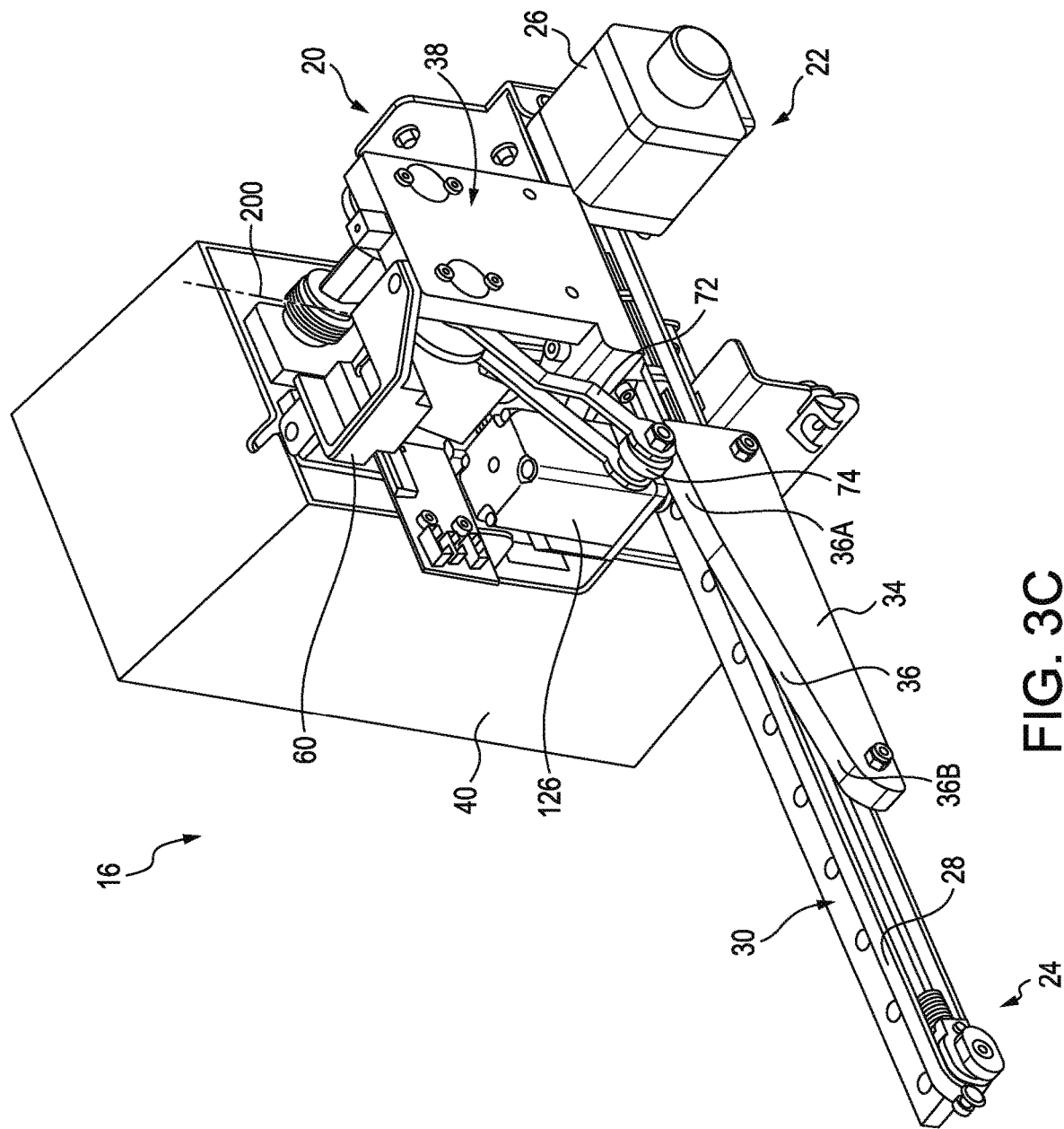
Figure 3D:
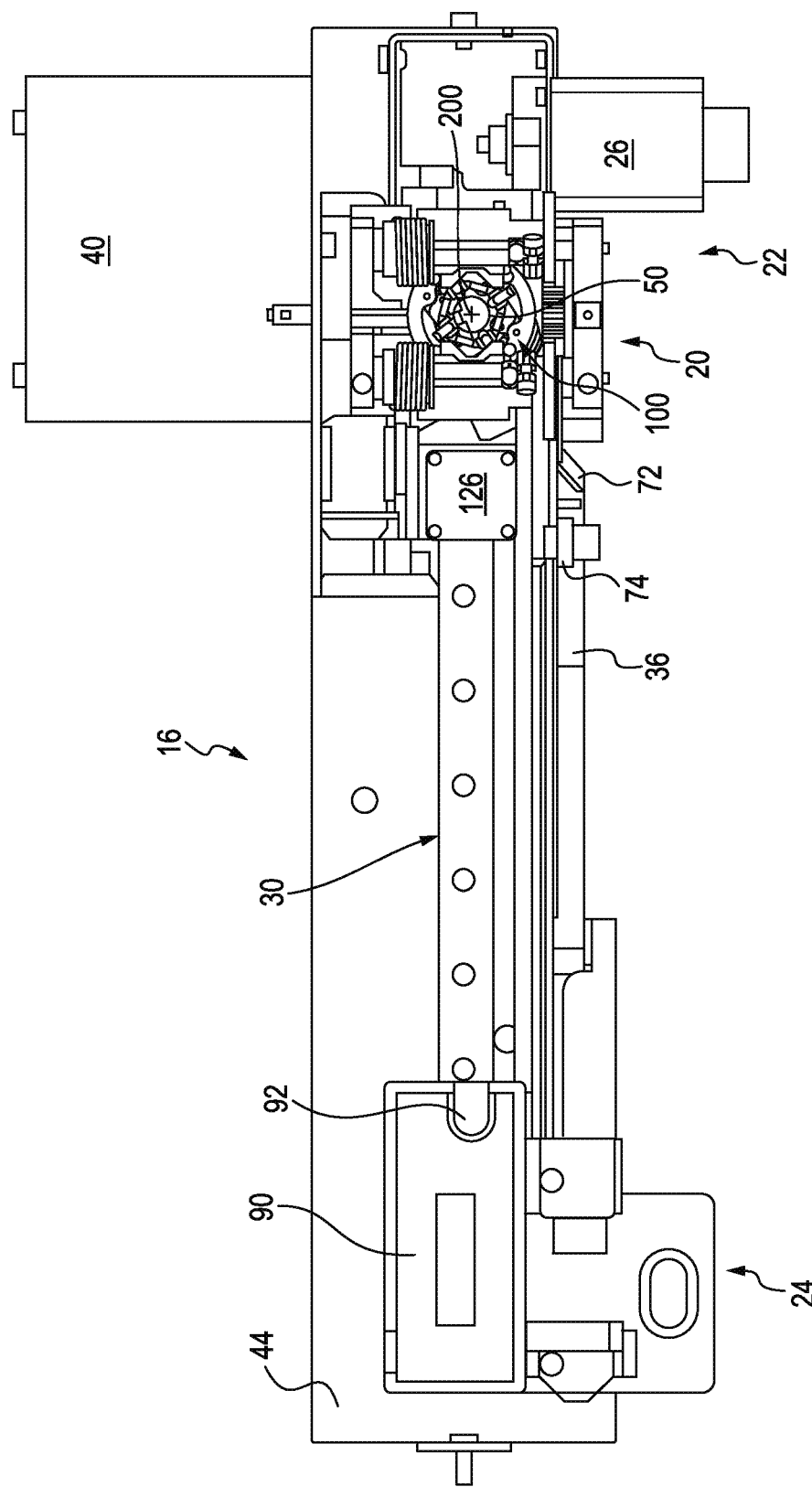
Figure 3E:
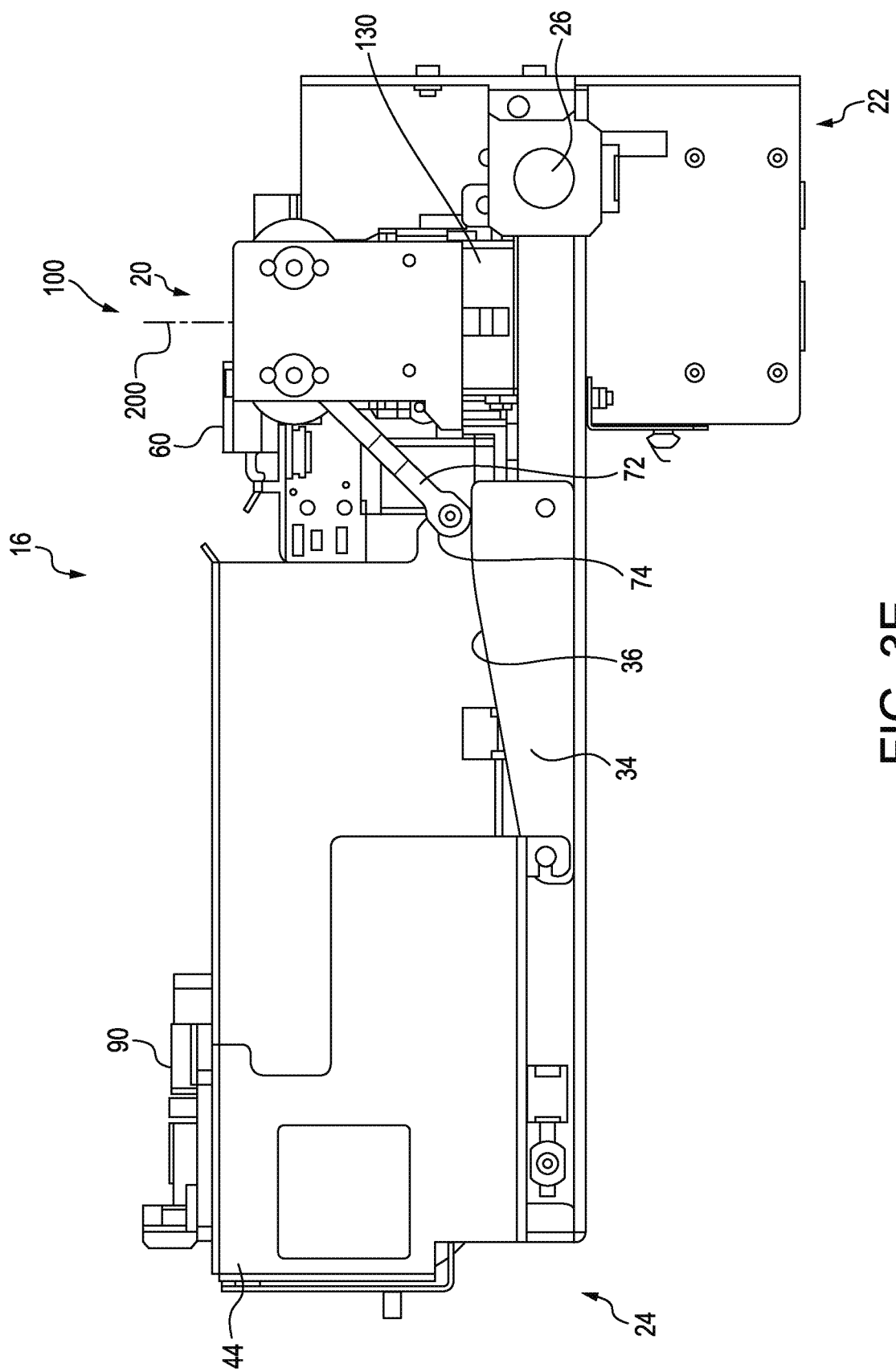

FIGS. 3A-3E illustrate different views of an exemplary shuttle 16 associated with an instrument 1000. FIGS. 3A-3C illustrate perspective views from different viewpoints, FIG. 3D illustrates a top view, and FIG. 3E illustrates a side view of shuttle 16. It should be noted that some components of shuttle 16 are removed in some of these figures to show features that are hidden by these components. It should also be noted that some of the components in these figures are represented larger or smaller to highlight different aspects. In the description below, reference will be made to FIGS. 3A-3E. As explained previously, shuttle 16 includes carriage 20 that supports receptacle 50 and travels between first and second ends 22, 24 of shuttle 16. In some embodiments, carriage 20 may travel (e.g., slide) between first and second ends 22, 24 on a rail 30. A belt 28 (best seen in FIG. 3B) driven by an electric motor 26 may be coupled to carriage 20 to move carriage 20 between first and second ends 22, 24. Rotation of motor 26 in one direction moves carriage 20 from first end 22 to second end 24, rotation of motor 26 in the opposite direction moves carriage 20 from second end 24 to first end 22. Second end 24 includes a primary mucoid shelf 90 coupled to a housing 44 of shuttle 16. A secondary mucoid shelf 60 is coupled to carriage 20. When carriage 20 is positioned at second end 24, secondary mucoid shelf 60 is positioned below primary mucoid shelf 90 (see, e.g., FIGS. 4G and 11A). The primary and secondary mucoid shelves 90, 60 will be described in more detail later.

Figure 4A:
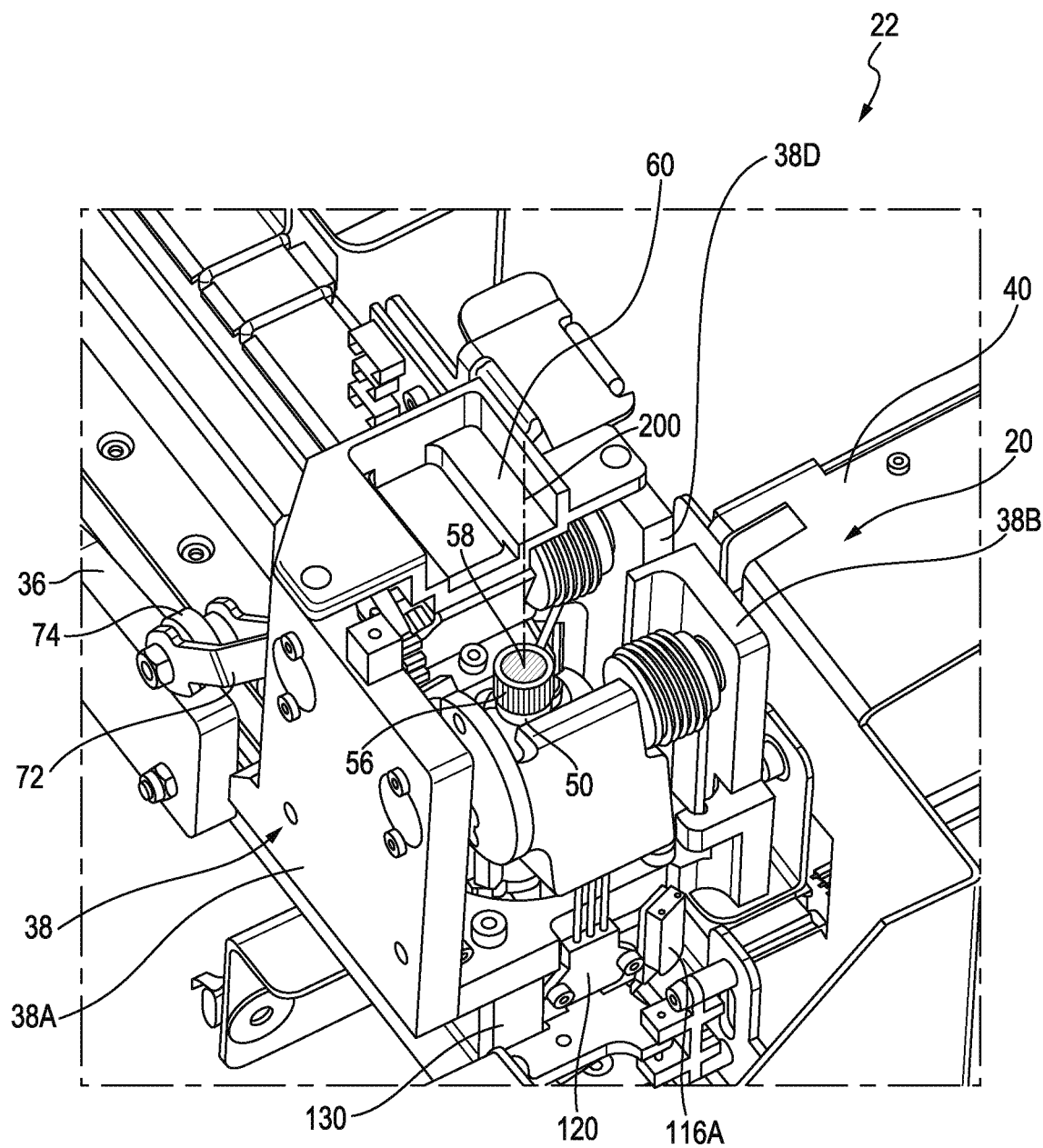
FIGS. 4A-4G illustrate different views of an exemplary carriage of the shuttle of FIGS. 3A-3E.
Figure 4B:
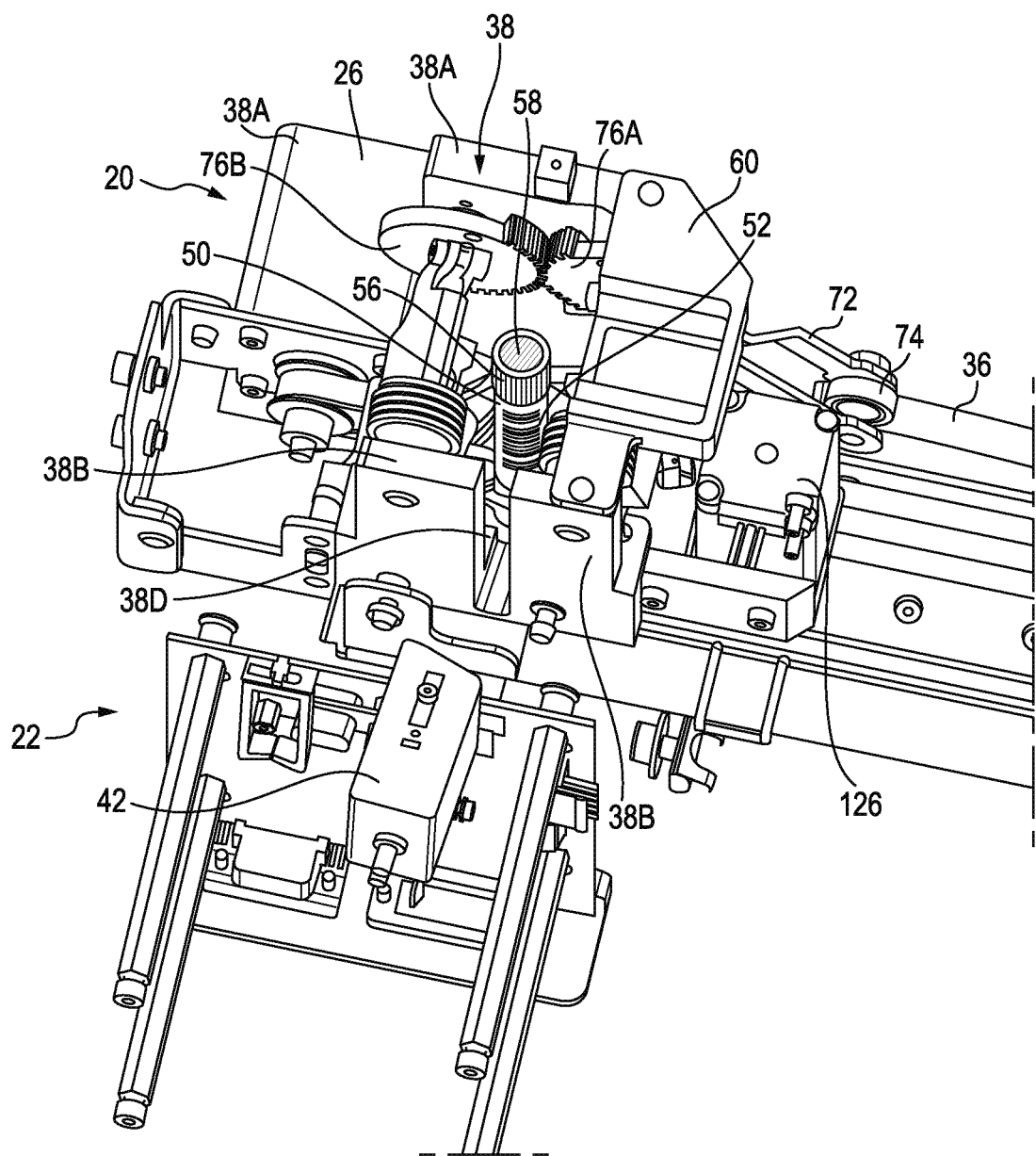
Figure 4C:
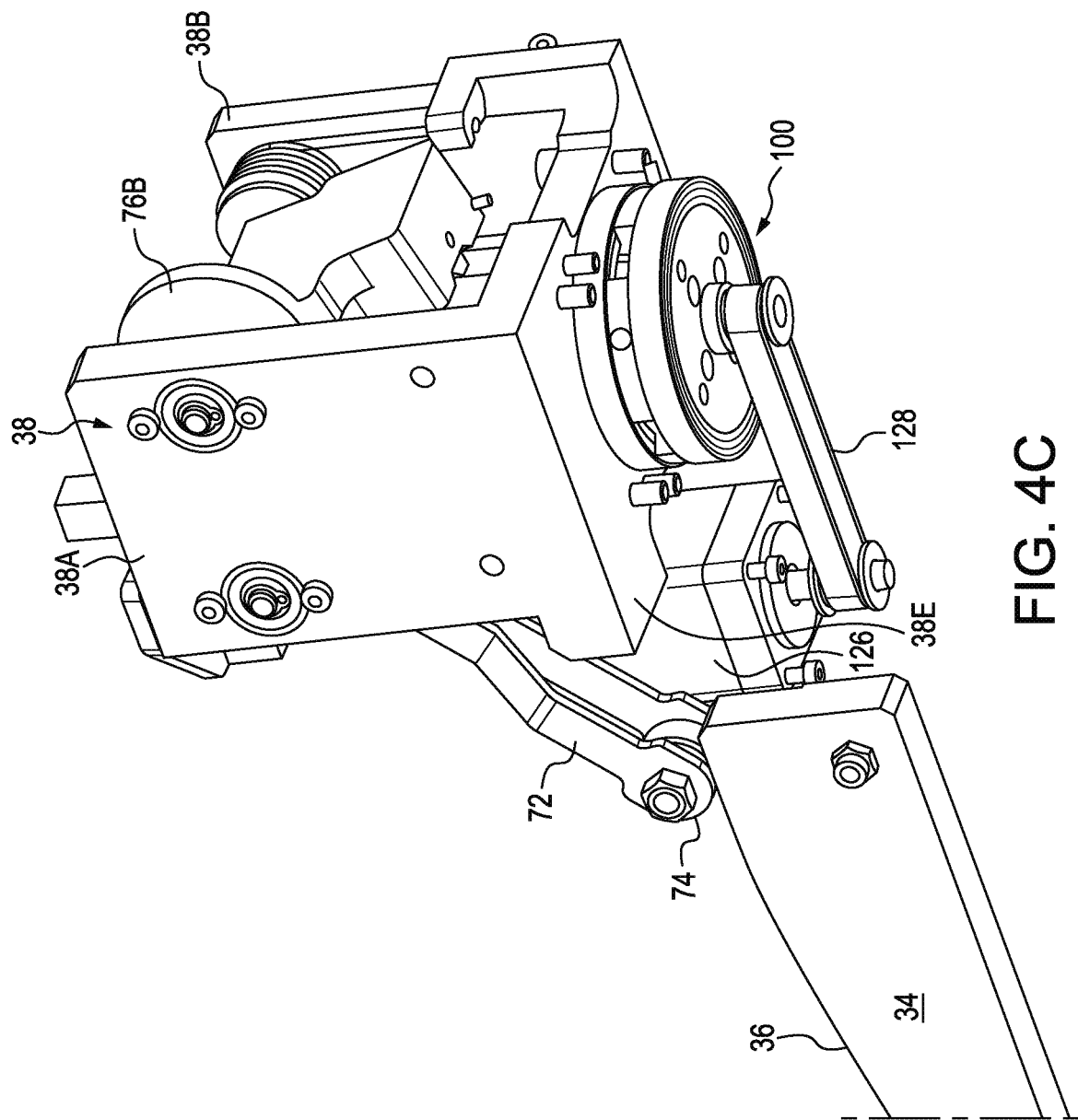
Figure 4D:
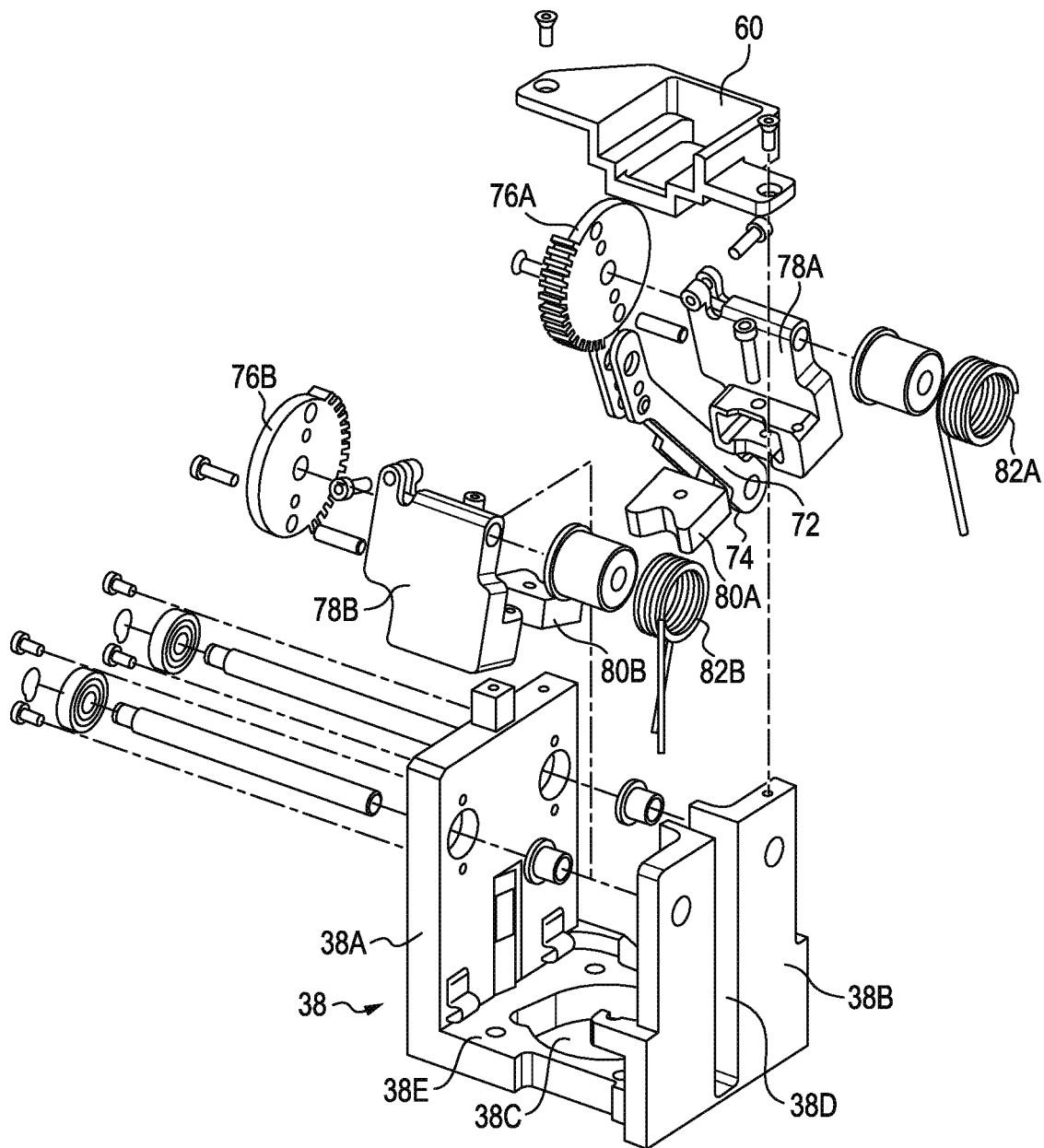
Figure 4E:
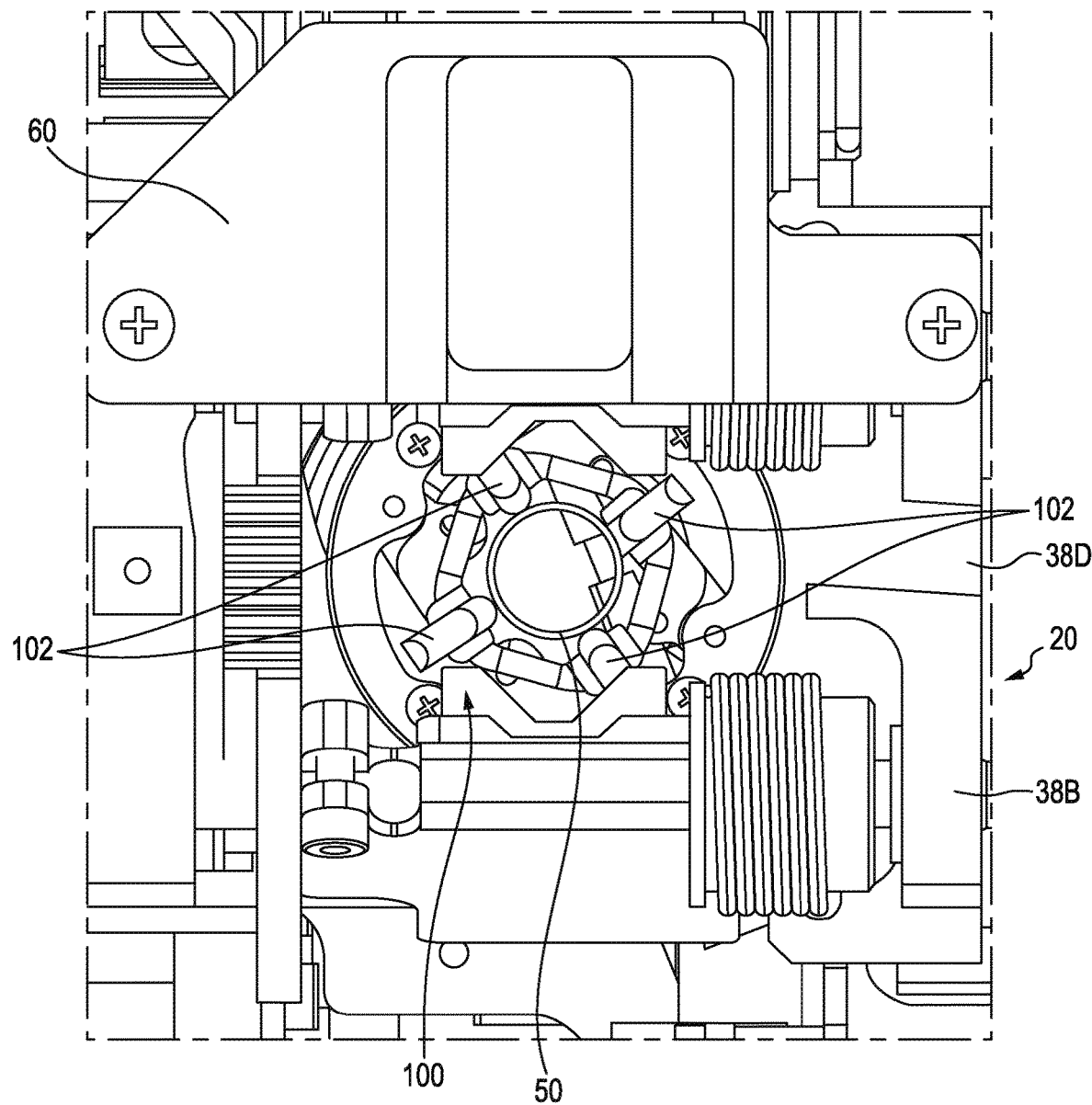
Figure 4F:
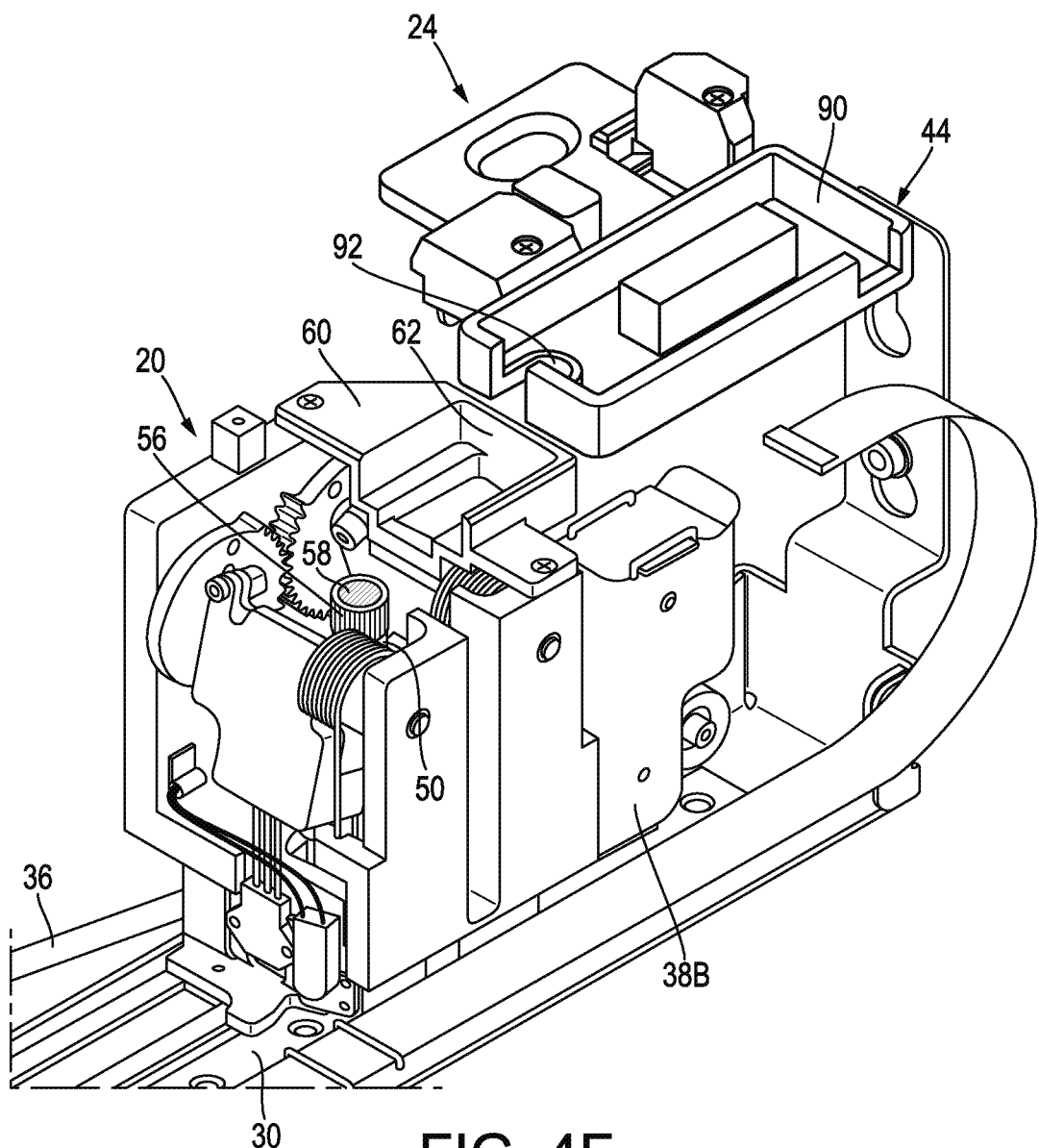
Figure 4G:
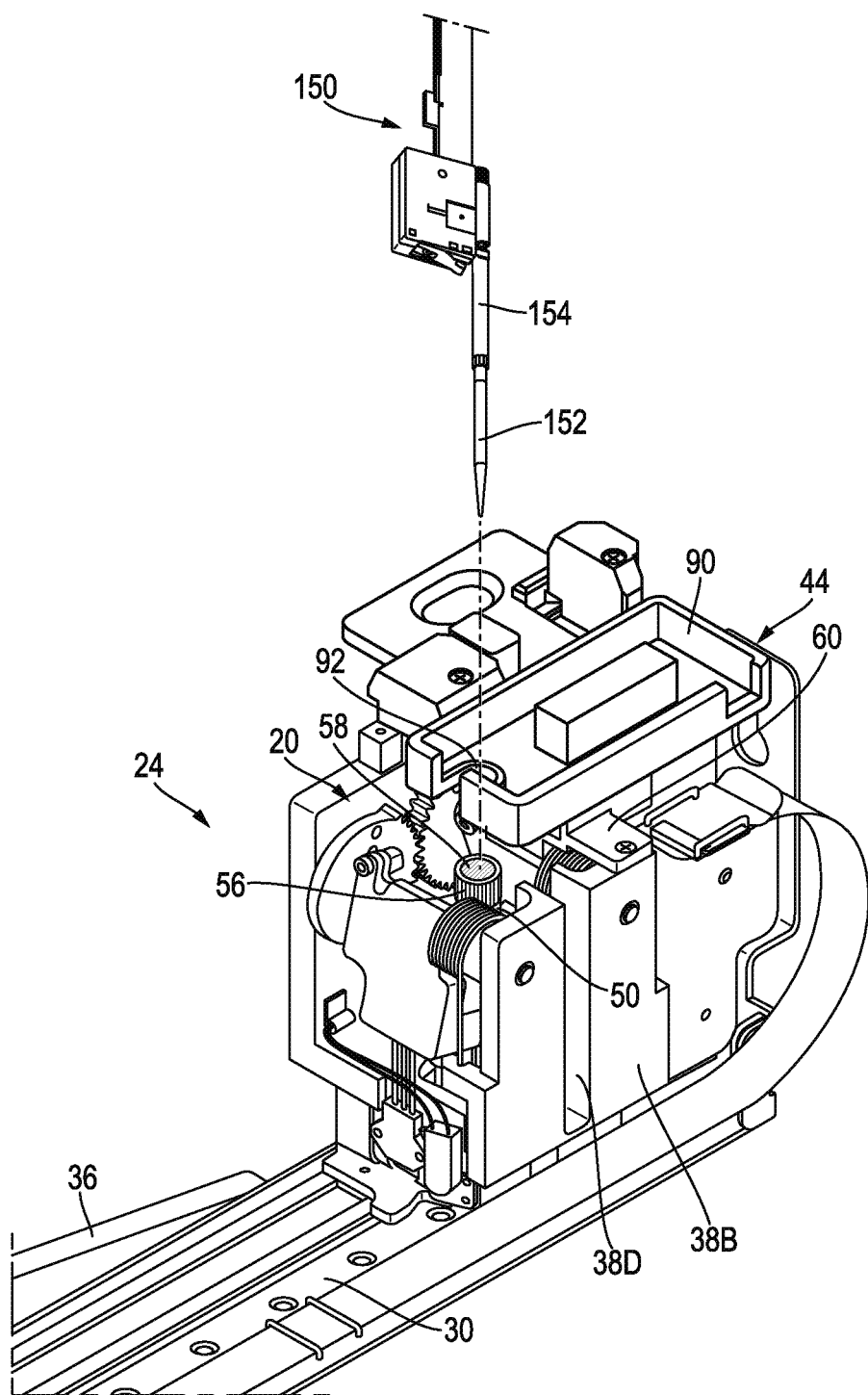

FIGS. 4A-4E illustrate different views of carriage 20 positioned at first end 22 of shuttle 16, FIG. 4G illustrates carriage 20 positioned at second end 24 of shuttle 16, and FIG. 4F illustrates carriage positioned at an intermediate location between first and second ends 24. FIGS. 4A, 4B, and 4C illustrate perspective views of carriage 20 from different viewpoints, FIG. 4D illustrates an exploded view, and FIG. 4E illustrates a top view. Some components of carriage 20 and shuttle 16 (and receptacle 50) are removed in some of these figures to show features that are hidden by these components. As best seen in FIG. 4D, carriage 20 includes bracket 38 having sidewalls 38A, 38B and a base 38E. In some embodiments, bracket 38 may be substantially C-shaped or U-shaped. Sidewall 38B of bracket 38 includes a vertically extending slot 38D and base 38E includes a substantially circular opening or cavity 38C. Secondary mucoid shelf 60 is attached to the top surface of bracket 38 (see FIG. 4A). It should be noted that although specific shapes or configurations of bracket 38, slot 38D and cavity 38C are described herein, these are not requirements. In general, bracket 38, slot 38D and cavity 38C may have any shape and configuration suitable for its function described below.

Carriage 20 includes a puck 100 positioned in a holder 130 and attached below bracket 38. See FIG. 5C and FIG. 4C (with holder 130 removed). FIGS. 5A-5K illustrate different views of puck 100 (with some components removed, in some figures, for clarity). Puck 100 receives and supports receptacle 50 that is transferred to carriage 20 from conveyor 300 (see FIGS. 5H, 5I, 5K). It should be noted that although a specific configuration of puck is described below, this is only exemplary. In general, any receptacle supporting device suitable for the functions described below may be used as puck 100. Exemplary pucks that may be used (with modifications in some cases) in carriage 20 are described in U.S. Pat. No. 8,147,778 and U.S. Patent Application Publication No. 2017/0153262. When supported by puck 100 (or seated in puck 100), receptacle 50 extends into the space between sidewalls 38A and 38B of bracket 38 through cavity 38C (see, FIGS. 5H, SI). Puck 100 includes a plurality of spring-loaded fingers 102 that are arranged to receive receptacle 50 from robotic arm 660 (of pick-and-place device 600) in the space formed between them (see FIGS. 5A-5D). The plurality of fingers 102 are held or coupled together by one or more springs, such as by a resilient elastic O-ring 110 (best seen in FIGS. 5D and 6C). When robotic arm 660 inserts receptacle 50 between the plurality of fingers 102, the compliant O-ring 110 stretches radially outward to increase the space enclosed by, or between, fingers 102 and allow receptacle 50 to slide into this space. The spring force of the stretched O-ring 110 presses the plurality of fingers 102 radially inward against the cylindrical wall of receptacle 50 and maintains receptacle 50 in an upright position between the plurality of fingers 102 (see FIGS. 5C, 5K, 6C). O-ring 110 may be made of any suitable material having spring-like properties. Although not a requirement, in some embodiments, O-ring 110 may be made of an elastomeric material such as, for example, silicone, EPDM (ethylene propylene diene monomer), rubber, etc. It should be noted that although the figures illustrate an embodiment of puck 100 having four fingers 102, this is only exemplary. In general, puck 100 may include any number of fingers 102 (e.g., 3, 4, 5, 6, 7, 8, 9, 10, etc.) arranged to receive a receptacle therebetween. Although, in general, fingers 102 may be made of any suitable material, in some embodiments, fingers 102 may be made of a material having a low coefficient of friction. In some embodiments, fingers 102 may be made of anodized aluminum coated with PTFE (polytetrafluoroethylene) or other suitable fluoropolymer. Further, in some embodiments, in addition to or in place of O-ring 110, another spring member (such as, for example, a metallic spring member, etc.) may be used to constrain the plurality of fingers 102 together.

Figure 5A:
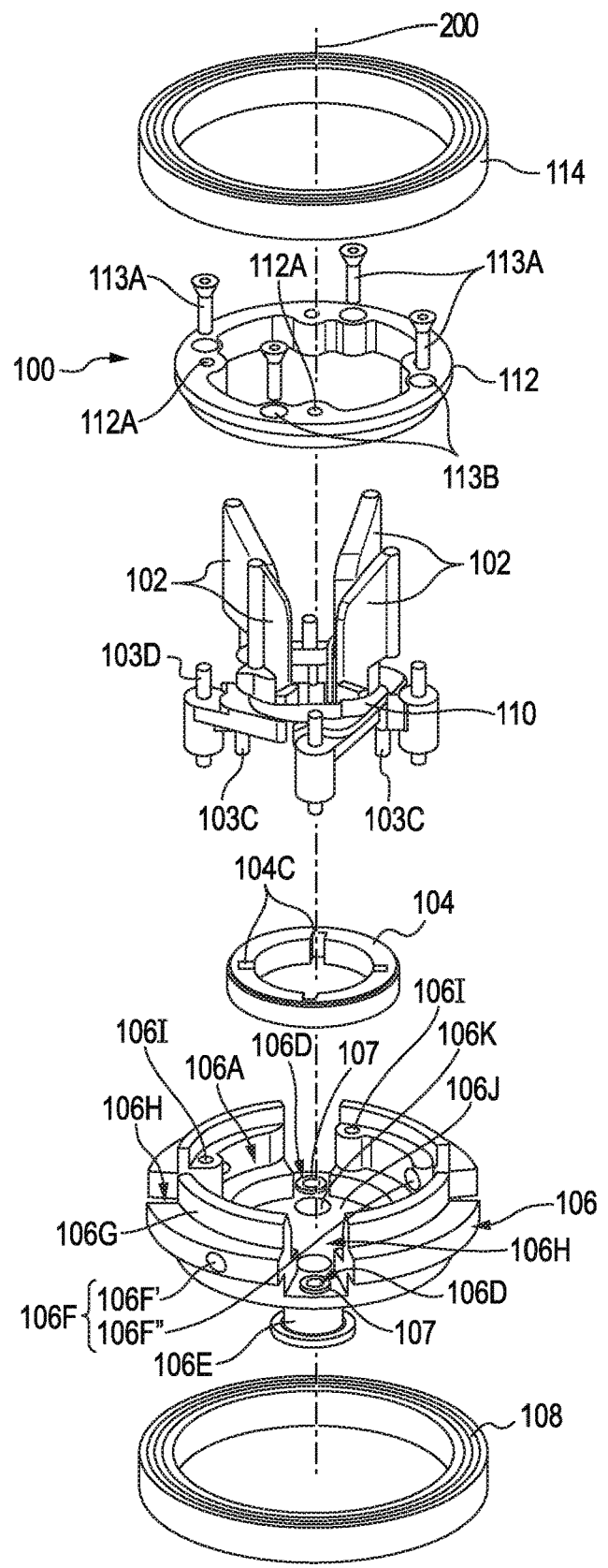

With reference to FIGS. 5D and 5E, each finger 102 includes a sloped first end 102A that serves as a lead-in surface for a receptacle 50 into the space between the plurality of fingers 102. When the plurality of fingers 102 are held together by O-ring 110, the sloped first ends 102A of fingers 102 collectively form a funnel-like feature that tolerates some amount of misalignment between receptacle 50 and puck 100 when robotic arm 14 places a receptacle 50 between the plurality of fingers 102. Each finger 102 also includes a base or a second end 102B arranged substantially transverse to first end 102A. The plurality of fingers 102 are attached to puck 100 at second end 102B. Second end 102B includes a pair of through-holes or cavities extending therethrough. As best seen in FIG. 5E, these through-holes include an inner cavity 102C and an outer cavity 102D. With reference to FIG. 5D, when fingers 102 are attached to puck 100, outer cavities 102D are located radially outwards of inner cavities 102C. That is, inner cavity 102C is positioned closer to axis 200 than outer cavity 102D. With reference to FIG. 5A, puck 100 also includes a synchronization disc 104 and a supporting disc 106 with a centrally positioned recess or pocket 106A. Although not a requirement, in some embodiments synchronization disc 104 and retaining ring 112 may be made from a plastic (e.g., polyoxymethylene (POM)) and the supporting disc 106 (and, in some embodiments, bearings 114 and 108) may be made from a metal (e.g., stainless steel, aluminum, etc.). As could be recognized by a person skilled in the art, POM is a plastic that has high mechanical strength and rigidity, as well as good sliding characteristics and wear resistance. Synchronization disc 104 allows the plurality of fingers 102 to move together (e.g., first end 102A of each finger 102 moves toward and away from vertical axis 200) in a synchronized manner and is positioned in pocket 106A of supporting disc 106. When puck 100 is assembled and a receptacle 50 is supported between the plurality of fingers 102 of puck 100, pocket 106A of supporting disc 106 receives the bottom portion of receptacle 50.

Figure 7A:
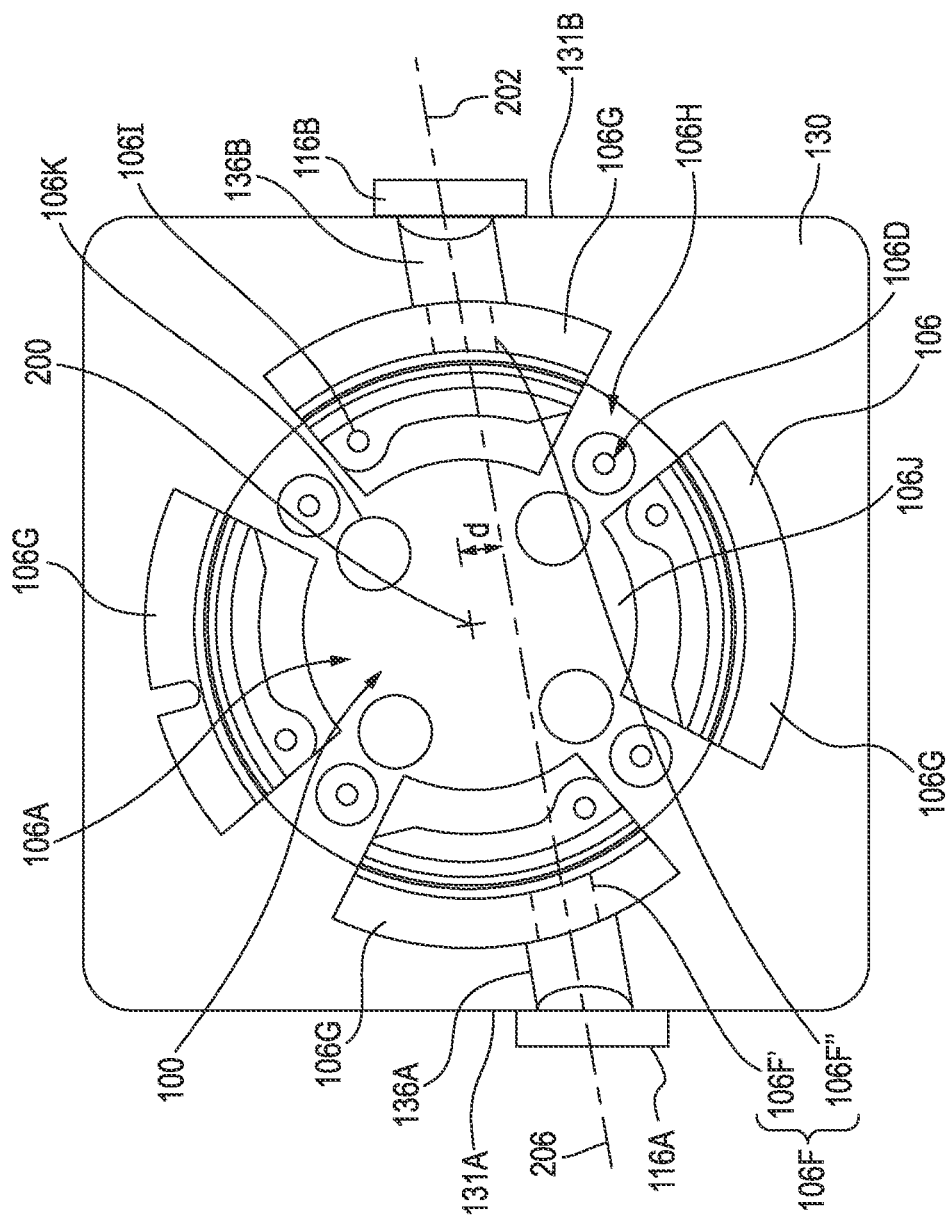

As best seen in FIGS. 5A and 7A, supporting disc 106 includes a rim 106G in the form of a sidewall that projects from a base 106J (of disc 106) and defines pocket 106A. Rim 106G includes four sidewall segments arranged around pocket 106A. A gap 106H may be formed between each adjacent pair of segments of rim 106G. The portion of base 106J in the gaps 106H between each pair of adjacent segments of rim 106G include a cavity 106D. Each cavity 106D includes a bearing 107 (see FIG. 5B). As will be described later, the base of each finger 102 is rotatably coupled to disc 106 by a pin 103D that extends through outer cavity 102D of finger 102 and the bearing 107 in cavity 106D of disc 106. One or more openings or passageways 106F extend through segments of rim 106G located on opposite sides of pocket 106A. Each passageway 106F includes portions that extend through two oppositely positioned segments of rim 106G (see FIG. 7A). That is, with reference to FIG. 7A, a first passageway 106F' extends through one segment of rim 106G positioned on one side of pocket 106A and a second passageway 106F" extends through another segment of rim 106G positioned on the opposite side of pocket 106A. The first and second passageways 106F' and 106F" are arranged on their respective segments of rim 106G such that they are aligned with each other and have a common longitudinal axis 206. In the discussion that follows, the first passageway 106F' and the second passageway 106F" may be collectively referred to as passageway 106F (or puck passageway) having longitudinal axis 206. As best seen in FIG. 7A, passageways 106F' and

106F''' extend through disc 106 such that the common longitudinal axis 206 of these passageways 106F' and 106F''' is substantially perpendicular to and offset from a vertical axis extending through the center of disc 106 (e.g., axis 200). Although not shown in FIG. 7A, disc 106 may have multiple similar passageways 106F (i.e., with a longitudinal axis extending substantially perpendicular to and offset from vertical axis 200) arranged around disc 106 and extending through oppositely positioned segments of rim 106G. In some embodiments, the amount of offset (distance "d" in FIG. 6A) between axes 200 and 206 may be from about 2 mm to about 7 mm, or from about 3 mm to about 6 mm, or preferably from about 4 mm to about 5 mm. As will be described later, an optical beam from an optical emitter 116A may be directed to an optical detector 116B through passageways 106F' and 106F''' and used to detect proper seating of receptacle 50 in puck 100.

Figure 5B:
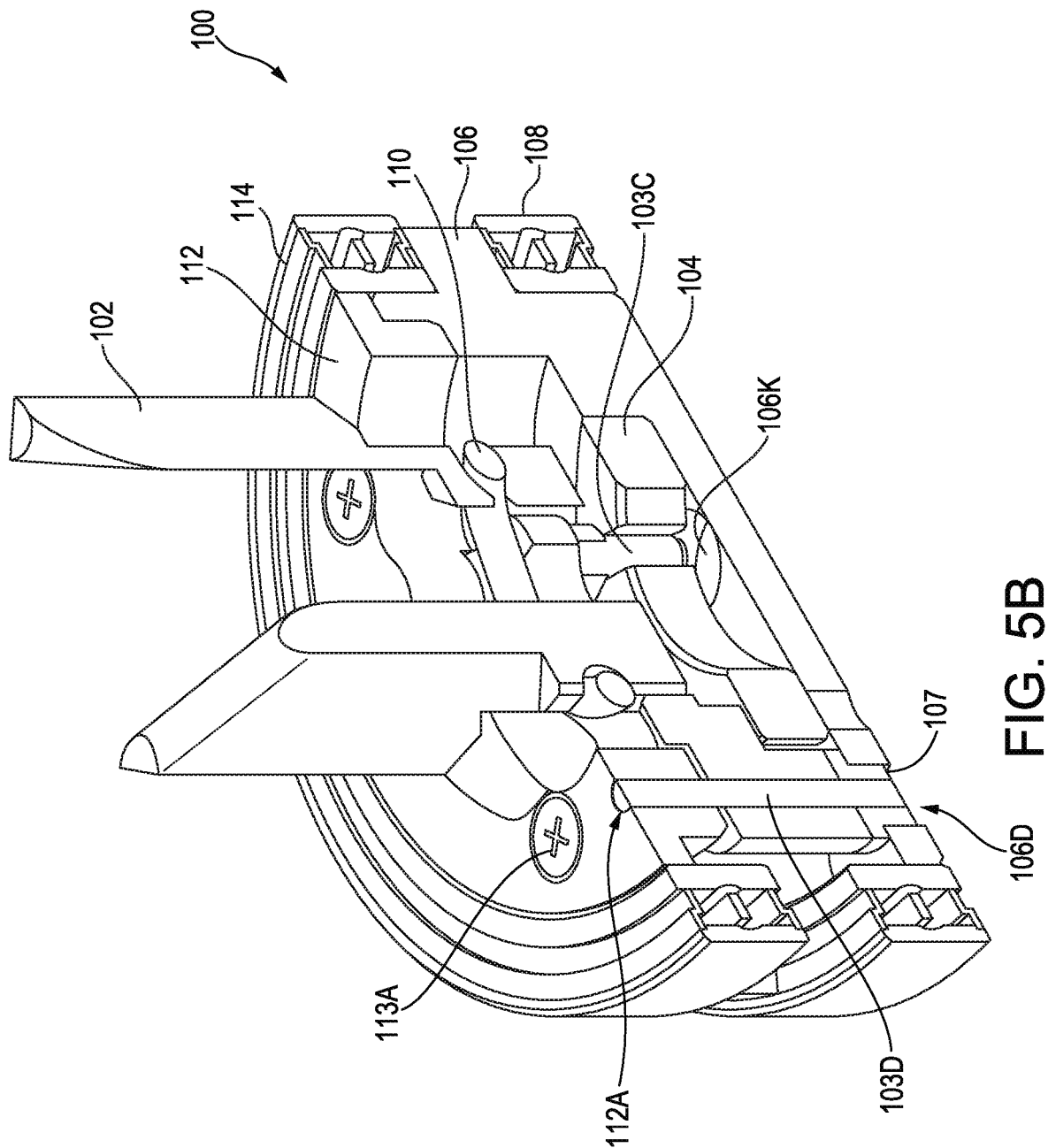
Figure 5C:
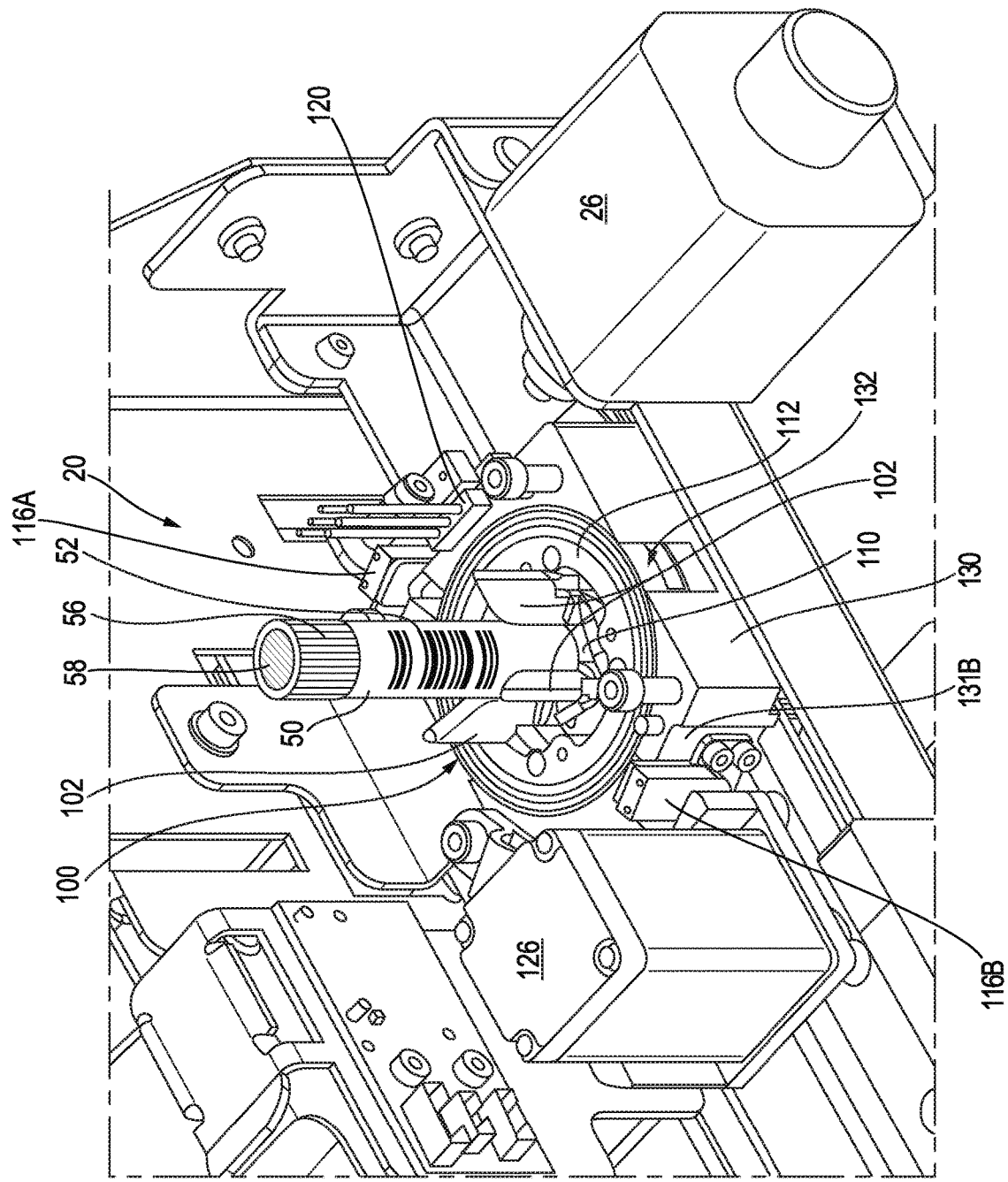
Figure 5G:
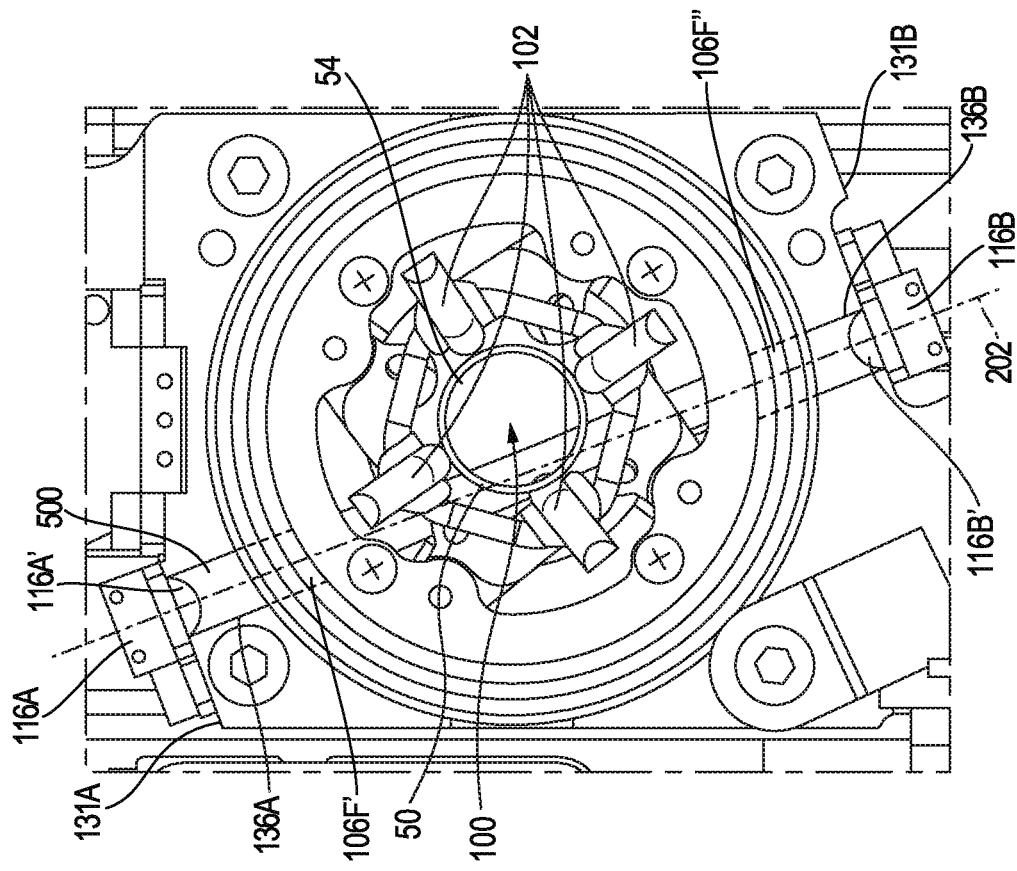
Figure 6A:
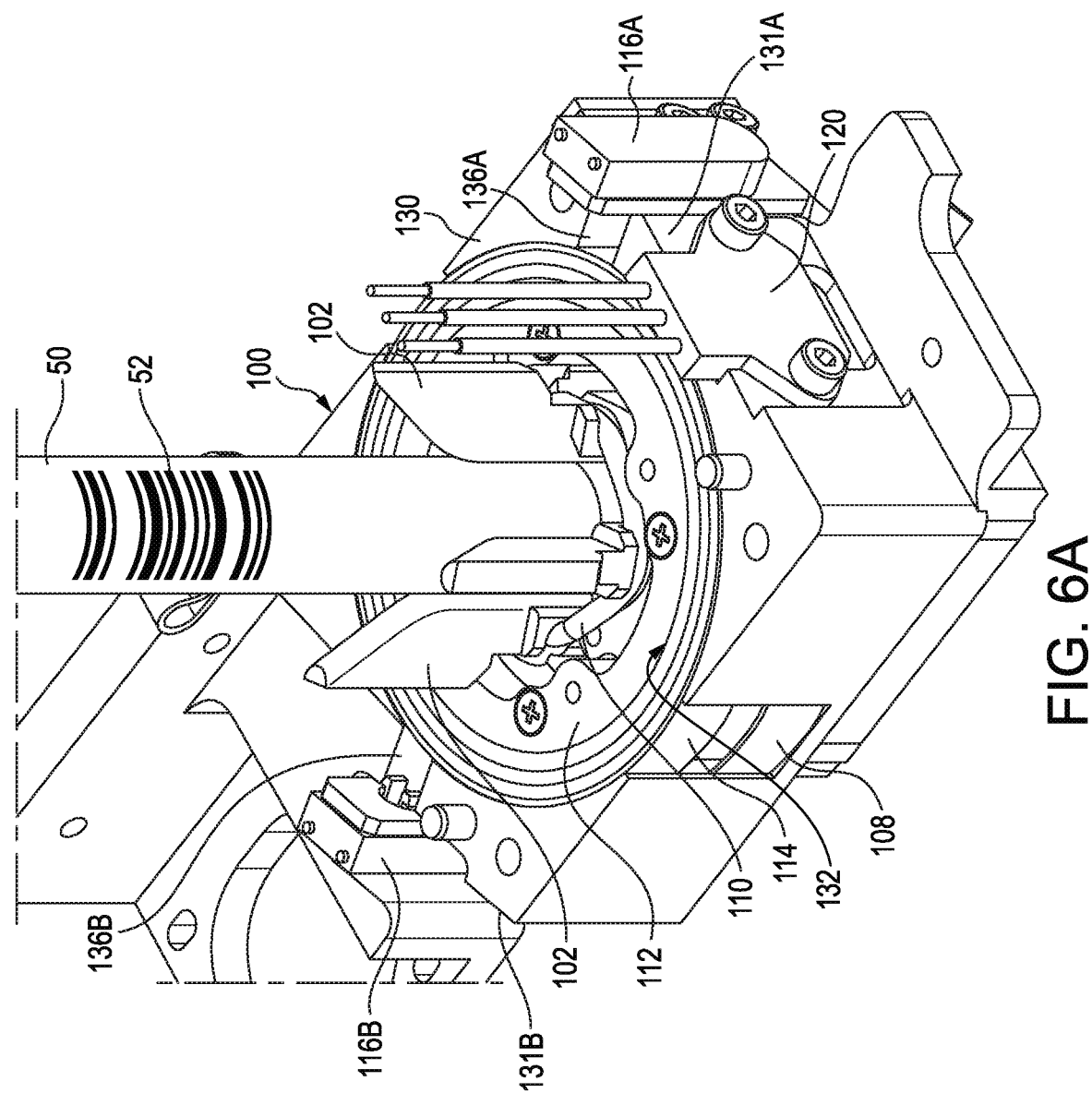
Figure 6B:
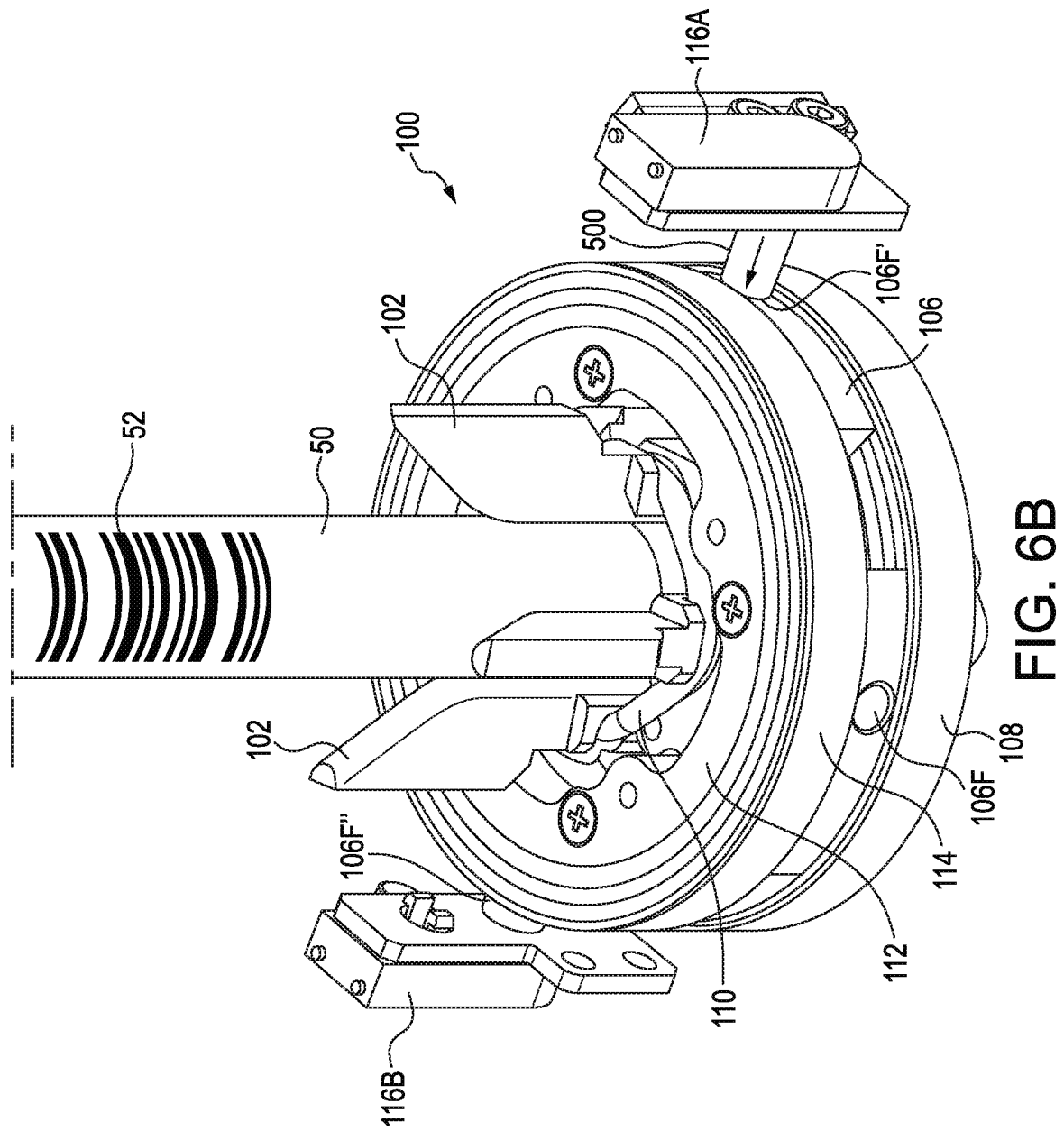
Figure 6C:
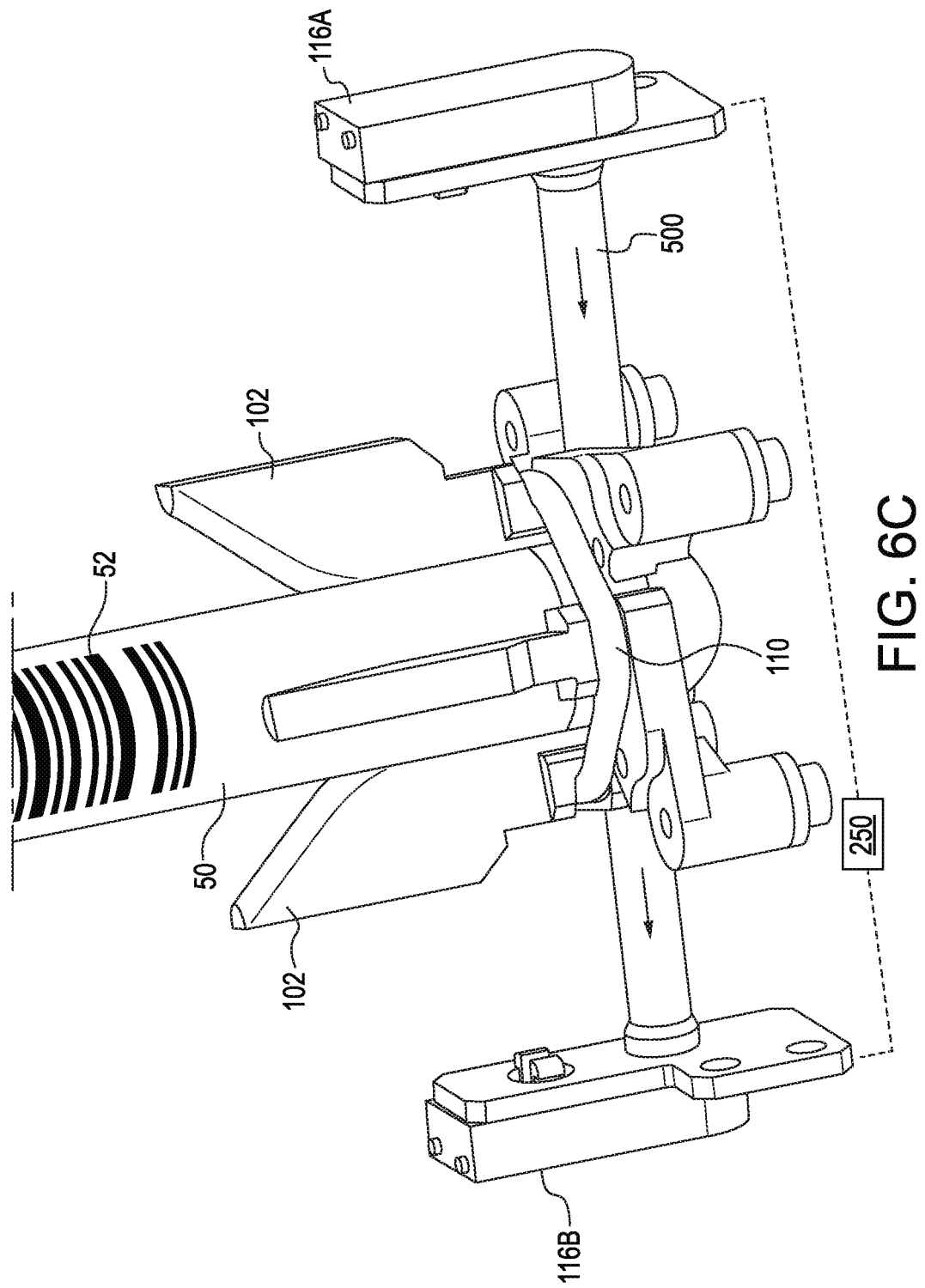

As best seen in FIGS. 5A, 5B, and 5D, a pin 103C inserted through inner cavity 102C of each finger 102 extends through a mated slot 104C (a hole/opening that is elongated in the radial direction) in synchronization disc 104. And, a pin 103D inserted through outer cavity 102D of each finger 102 extends through bearing 107 in cavity 106D of supporting disc 106. As best seen in FIG. 5B, in an assembled puck 100, the top end of pin 103D is received in a cavity 112A of a retaining ring 112, and the bottom end of pin 103D is received in bearing 107. Pin 103D rotatably couples each finger 102 to disc 106. With reference to FIGS. 5A and 5B, cavities 106K are provided on base 106J of supporting disc 106 corresponding to the location of inner cavities 102C of fingers 102. These cavities 106K accommodate the movement of pins 103C in slots 104C of synchronization disc 104. When a receptacle 50 is inserted between the plurality of fingers 102, each finger 102 rotates about disc 106 to increase the space between the fingers 102. As the fingers 102 spread apart from each other, pins 103C slide radially outwards on slots 104C of disc 104 and allow the fingers 102 to spread apart in a synchronized manner. As best seen in the perspective section view of FIG. 5B, retaining ring 112 joins the plurality of fingers 102 and discs 104, 106 together to form puck 100 with bearings 114 and 108 positioned on either side. With reference to FIG. 5A, retaining ring 112 includes cavities 113B that correspond in location with cavities 106I of supporting disc 106. Fasteners 113A (e.g., screws, pins, etc.) engage with cavities 113B (of retaining ring 112) and cavities 106I (of supporting disc 106) to couple retaining ring 112 to supporting disc 106 with the plurality of fingers 102 and the synchronization disc 104 positioned in between. With reference to FIGS. 5C and 6A, puck 100 is then positioned in a cavity 132 of holder 130, and the holder 130 is attached below bracket 38 (see FIG. 4A and FIGS. 5H-5J (shown with holder 130 removed)) such that the plurality of fingers 102 extend through cavity 38C on base 38E of bracket 38. An electric motor 126 (see FIG. 4C) is then coupled to a flange 106E of supporting disc 106 (of puck 100) using a belt 128 (see FIGS. 4C, 5I, 5J). Rotation of electric motor 126 rotates puck 100 (and receptacle 50 positioned between its plurality of fingers 102) within holder 130 about a vertical axis 200 of carriage 20. Bearings 114 and 108 (see FIG. 5B) assist in the rotation of puck 100 in holder 130. As will be described later, rotation of puck 100 assists a label reader 42 of carriage 20 (see FIG. 4B) to read the information encoded in a machine-readable label 52 of receptacle 50.

Carriage 20 includes multiple sensors configured to detect different parameters related to its operation. As best seen in FIG. 6A, in some embodiments, carriage 20 may include a home sensor 120 (see also FIGS. 4A, 5C, 5F, 5G) used to detect that puck 100 is rotating during the label reading operation. Home sensor 120 may be attached to holder 130 of puck 100. Home sensor 120 may be a Hall effect sensor that detects a magnet (not shown) on puck 100. When puck 100 makes a complete rotation (i.e., 360°) within holder 130, and the magnet on the rotating puck 100 aligns with home sensor 120 attached to the stationary holder 130, home sensor 120 may output a signal (e.g., to a controller) to indicate that puck 100 has made one complete rotation. A missing signal from home sensor 120 may indicate that puck 100 is not rotating properly (as result of a fault in motor 126, rupture of belt 128, etc.). Home sensor 120 may also be used as a reference position for a receptacle-present sensing system of carriage 20, as discussed below.

The receptacle-present sensing system may include one or more sensors configured to determine whether a receptacle 50 is present and seated properly in puck 100 of carriage 20. As explained previously, grasping member 662 of robotic arm 660 of pick-and-place device 600 grasps and transfers a receptacle 50 from carrier 400 on conveyor 300 to carriage 20. In some embodiments, the receptacle-present sensing system may be used to confirm that receptacle 50 is stably supported, or seated, in puck 100 before it is released by grasping members 662 of robotic arm 660. As would be recognized by a person skilled in the art, if receptacle 50 is not seated in puck 100 when carriage 20 transports the puck 100 to the second end 24, receptacle 50 could be displaced from puck 100 and spill its contents (i.e., the fluid contained in the receptacle), which may result in contamination of instrument 1000. Therefore, in some embodiments, it is preferable to confirm that receptacle 50 is seated in puck 100 before it is released by grasping members 662 of robotic arm 660. Further, as will be described in more detail infra, when carriage 20 is positioned at second end 24, a pipette tip 152 attached to a mounting end 156 of a pipettor 150 of instrument 1000 is configured to enter receptacle 50 seated in puck 100 and to aspirate a fluid (e.g., sample) contained in receptacle 50 (see, e.g., FIGS. 4G and 11A). Using the receptacle-present sensing system of carriage 20 to confirm that receptacle 50 is seated in puck 100 (or supported by carriage 20) ensures that the fluid contained in receptacle 50 can be accessed, without interference, by pipette tip 152 associated with pipettor 150. In some embodiments, the receptacle-present sensing system may determine that a receptacle is seated in puck 50 if (a) the receptacle 50 has limited tilt with respect to the vertical axis (e.g., the angle between the longitudinal axis 204 of receptacle 50 (see FIGS. 6E and 6F) and the vertical axis 200 that extends centrally between the plurality of fingers 102 of puck 100 (see FIGS. 6E and 6F) is less than or equal to a predetermined value), and/or (b) if receptacle 50 is inserted to an appropriate depth in puck 100 (e.g., if the distance of a base 55 of the receptacle 50 from the base 106J of supporting disc 106 of puck 100 (see FIG. 6J) is less than or equal to a predetermined value). In some embodiments, by determining that base 55 of receptacle 50 is within a certain distance of base 106J of puck 100 (or carriage 20), the receptacle-present sensing system can ensure that there will be no unintended interference between receptacle 50 and some structure of instrument 1000, such as with primary mucoid shelf 90, when carriage 20 moves from first end 22 to second end 24. While the allowable tilt of the receptacle with respect to the vertical axis and the allowable gap between the receptacle base 55 and base 106J may depend upon the application, in some embodiments the sensing system may be configured to detect that a receptacle 50 is seated in puck 100 if (a) base 55 of receptacle 50 is not more than about 5 mm from base 106J of supporting disc 106 and/or (b) if an angle of the longitudinal axis 204 (see FIGS. 5E and 5F) of receptacle 50 relative to the vertical axis 200 of puck 100 (see FIGS. 5E and 5F) is not more than about 30°. It should be noted that the above-described values are intended to be exemplary only. For example, in some embodiments, based on the application, the allowable distance described in (a) above may be less than or equal to any integer between 1 mm and 15 mm (i.e., <2 mm, <10 mm, etc.), and the allowable angle described in (b) above may be less than or equal to any integer between 10° and 30° (i.e., <15°, <10°, etc.). While the receptacle-present sensing system may include any sensor capable of determining whether a receptacle 50 is seated in puck 100 (or supported by carriage 20), the sensor of some embodiments may include a signal emitter and a signal detector pair, such as an optical emitter 116A and an optical detector 116B pair, as shown in FIGS. 5C, 5F, 5G, 6A. In one embodiment an infrared LED emitter and a silicon phototransistor sensor, such as optical emitter OPB100EZ and optical detector OPB100SZ (from Optek Technology Inc., Carrollton, TX), may be used as optical emitter 116A and optical detector 116B, respectively.

Figure 5F:
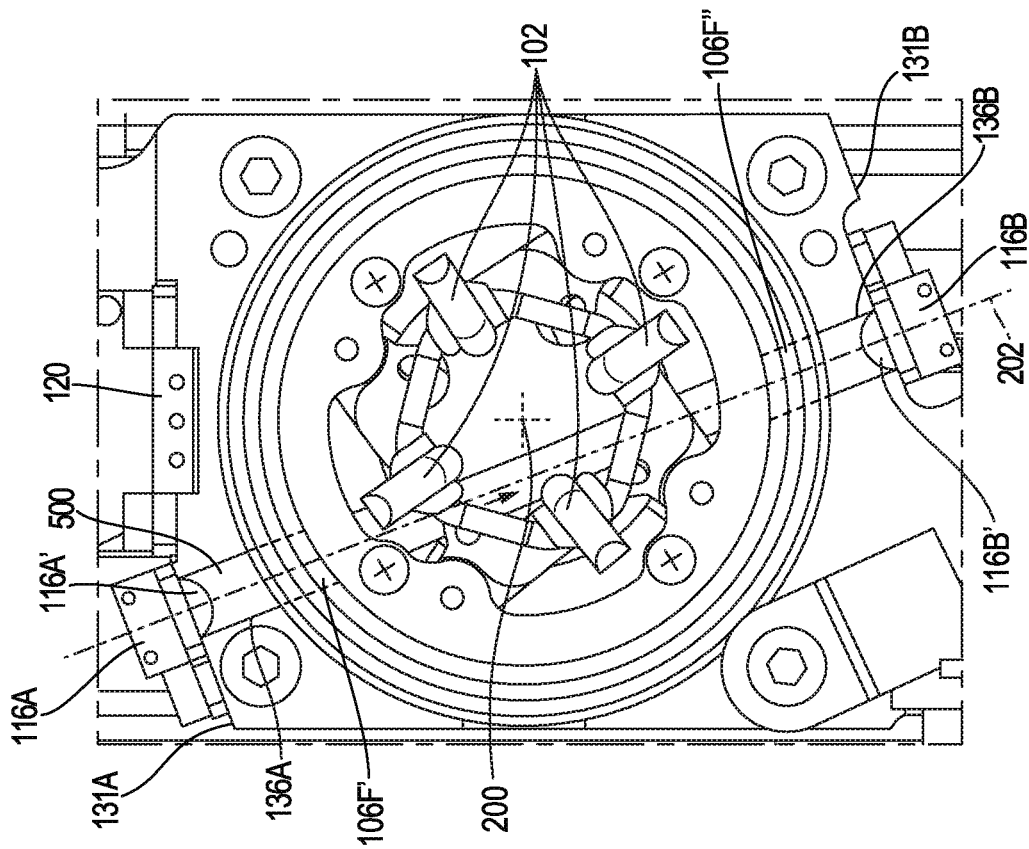
Figure 5I:
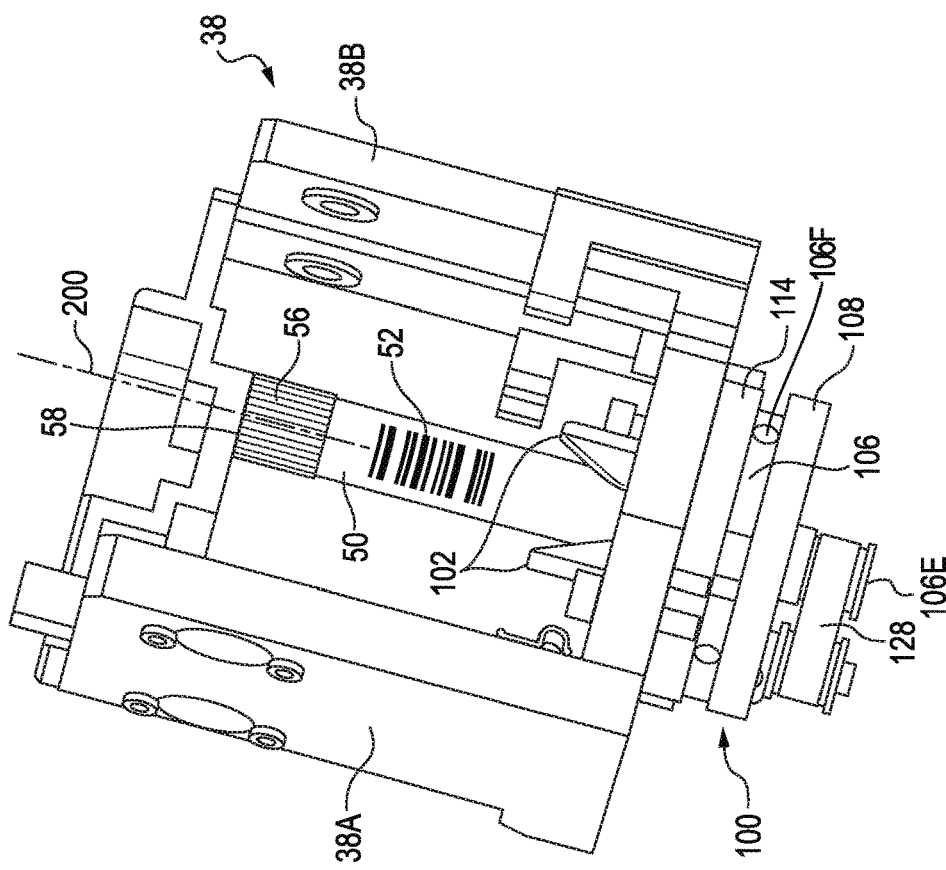
Figure 5H:
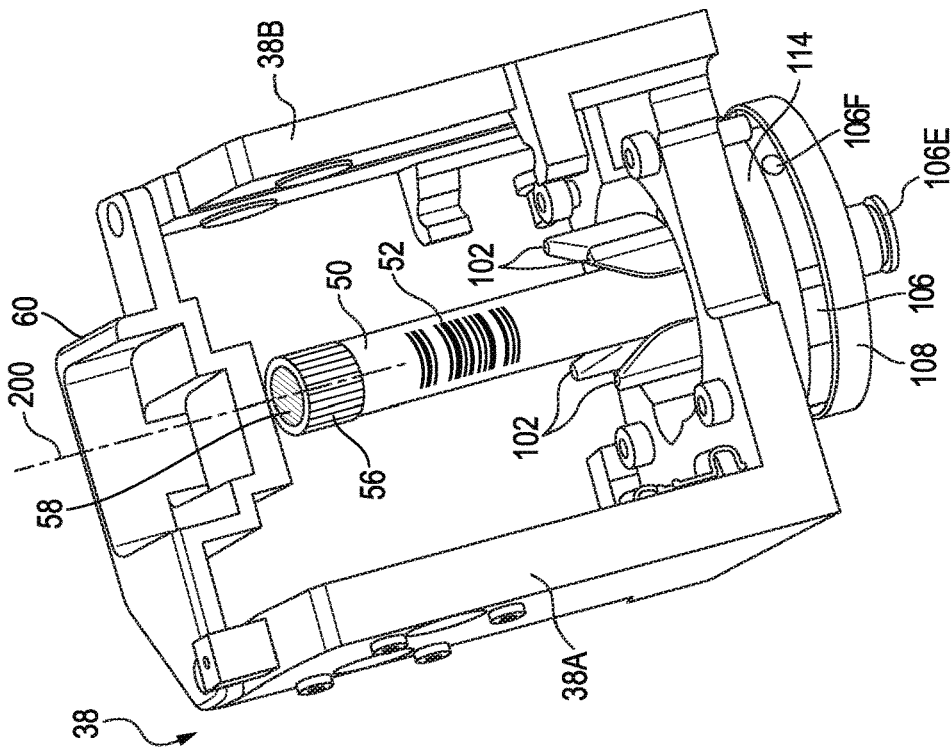
Figure 5K:
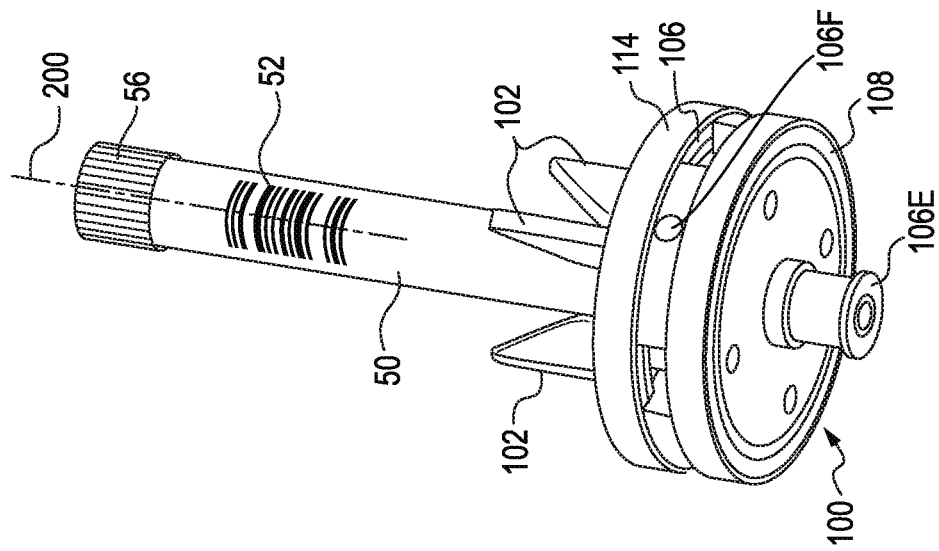
Figure 5J:
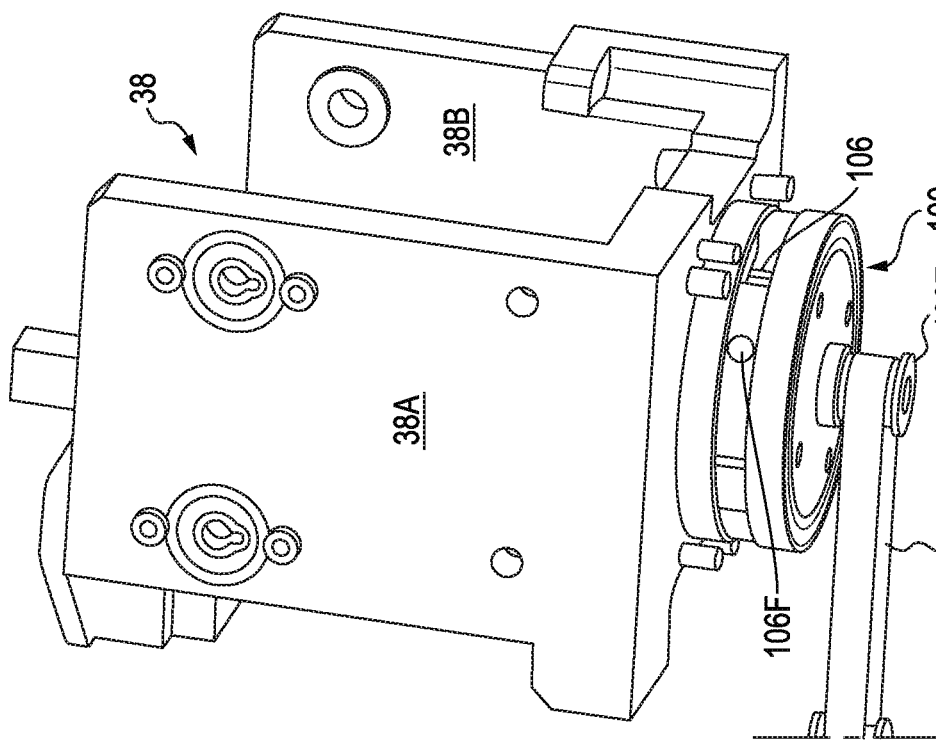

Optical emitter 116A and optical detector 116B are attached to the stationary holder 130 of puck 100. As best seen in FIGS. 5F, 6A, and 7A, optical emitter 116A is attached to a first sidewall 131A and optical detector 116B is attached to a second sidewall 131B of holder 130. Sidewalls 131A and 131B are located on opposite sides of central cavity 132 of holder 130, which receives puck 100. As best seen in FIG. 7A, in holder 130, a passageway 136A extends through first sidewall 131A and a passageway 136B extends through second sidewall 131B, such that these passageways 136A and 136B are aligned with each other and have a common longitudinal axis 202. Passageways 136A and 136B are arranged on holder 130 such their common longitudinal axis 202 is substantially perpendicular to and offset from (i.e. spaced apart) from vertical axis 200 (see FIGS. 5F and 7A). In the discussion that follows, passageways 136A and 136B of holder 130 may be collectively referred to as the holder passageway. Although not a requirement, in some embodiments, the amount of offset (distance "d" in FIG. 7A) may be from about 2 mm to about 7 mm, or from about 3 mm to about 6 mm, or preferably from about 4 mm to about 5 mm Although not a requirement, in some embodiments, optical emitter and detector 116A, 116B are attached to first and second sidewalls 131A, 131B of holder 130 such that a light-emitting element 116A' of emitter 116A is positioned in passageway 136A and a light-detecting element 116W of detector 116B are positioned in passageway 136B (see FIG. 6A). When puck 100 is not present in holder 130, an optical beam 500 emitted by optical emitter 116A is transmitted to optical detector 116B via the aligned passageways 136A, 136B. When puck 100 is positioned in holder 130 and aligned such that passageways 106F' and 106F" of supporting disc 106 (of puck 100) is aligned with passageways 136A, 136B of holder 130, optical beam 500 from emitter 116A is transmitted to detector 116B via the aligned passageways 136A, 106F', 106F", and 136B (see FIGS. 5F, 7A). Although not a requirement, in some embodiments, as illustrated in FIG. 7A, when puck 100 is positioned in holder 130 such that passageways 106F' and 106F" of puck 100 (i.e., the puck passageway) are aligned with passageways 136A and 136B of holder 130 (i.e., the holder passageway), longitudinal axis 202 (of holder passageway) 136A, 136B) and longitudinal axis 206 (of passageway 106F) may be coincident. With reference to FIGS. 5G and 6C-6E, when a receptacle 50 is positioned in puck 100 (and passageways 106F', 106F" of puck 100 are aligned with passageways 136A, 136B of holder 130), optical beam 500 from emitter 116A passes through passageways 136A, 106F" and impinges on the curved sidewall of receptacle 50 at a location proximate its base.

Figure 6F:
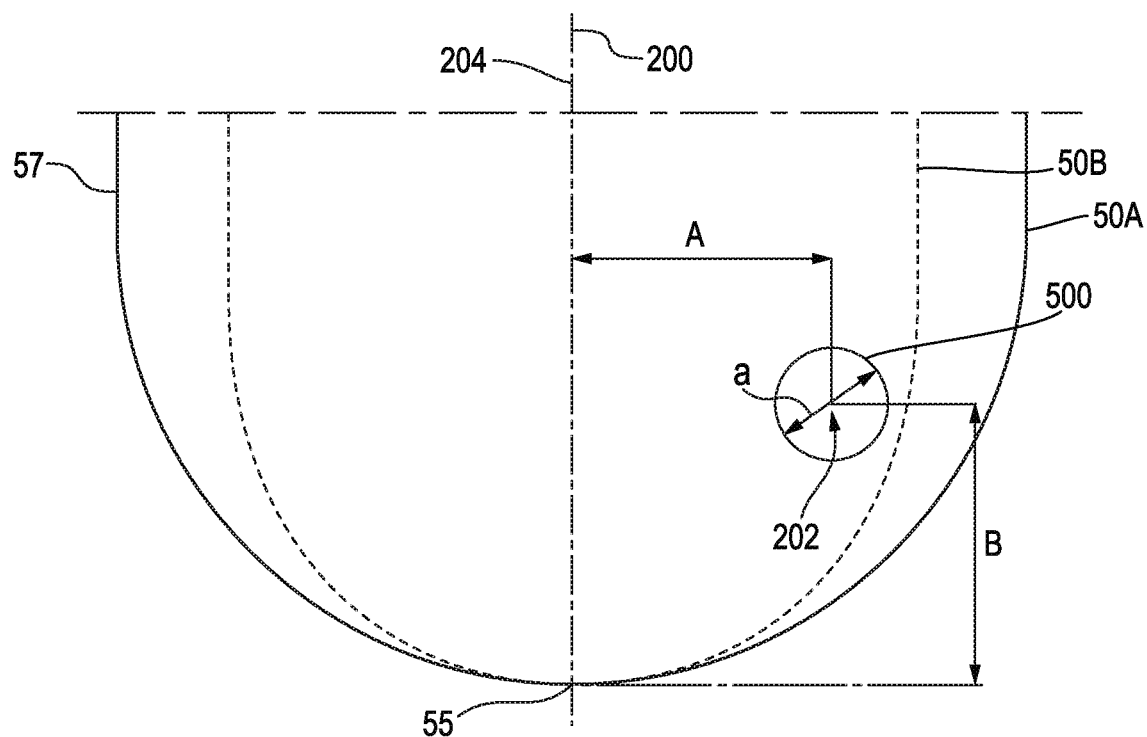

As explained previously, the common longitudinal axis 202 of passageways 136A, 136B (of holder 130) is offset from vertical axis 200 of carriage 20 (see FIGS. 5F and 7A). That is, the common longitudinal axis 202 of passageways 136A, 136B does not extend through a diameter of receptacle 50 seated in puck 100. Therefore, as best seen in FIGS. 6D and 6E, optical beam 500 that impinges on the curved sidewall of the receptacle 500 is also offset from vertical axis 200. Passageways 136A and 136B of holder 130 are arranged such that, when receptacles 50 of different sizes (e.g., diameters) are supported on puck 100, optical beam 500 passes through a side of receptacle 50 offset from vertical axis 200. FIG. 6F is a schematic illustration of the base of a 16 mm diameter receptacle 50A (i.e., largest diameter of receptacle 50A is 16 mm) showing the outline of optical beam 500 impinging on the external curved surface of receptacle 50A. The diameter "a" of optical beam 500 depends on the size of the emitter 116A and passageways 136A, 106F. In some embodiments, diameter "a" may be from about 1 mm to about 3 mm, or about 2 mm. As explained previously, receptacles 50 of different sizes (e.g., diameters, heights) may be supported in puck 100. The profile of a 12 mm diameter receptacle 50B is also shown in FIG. 5F using dashed lines. With reference to FIG. 6F, the common longitudinal axis 202 of passageways 136A, 136B (and passageway 106F of puck 100) may be offset from vertical axis 200 by a distance "A." In general, distance A may depend on the size of the receptacles that are intended to be supported in puck 100 and the size of the emitter 116A used. In some embodiments, distance A may be from about 3 mm to about 6 mm, or preferably from about 4 mm to about 5 mm, or more preferably about 4.5 mm. The common longitudinal axis 202 may also be offset from the base of a properly seated receptacle 50 by a distance "B." As best seen in FIG. 6F, in some embodiments, the distance B may be selected such that optical beam 500 impinges on the hemispherical base of a curved bottom receptacle. Typically, distance B may vary from about 3 mm to about 8 mm, or preferably from about 4 mm to about 7 mm, or more preferably from about 5 mm to about 6 mm Although the values of distances A and B may depend upon the application (e.g., type and size of receptacle), in general, these distances are selected such that the optical beam 500 falls within the profile of a receptacle 50 seated in puck 100 without passing through the diameter of the receptacle 50.

Figure 6G:
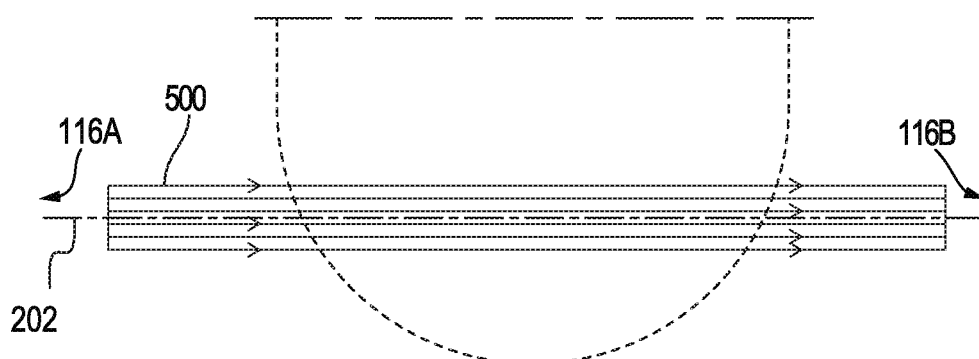
Figure 6H:
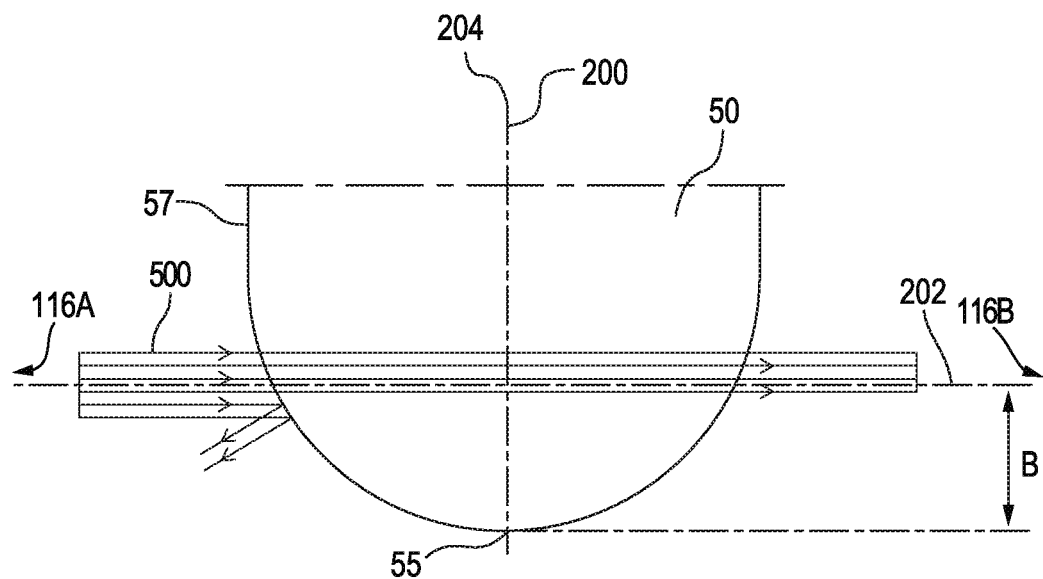
Figure 6I:
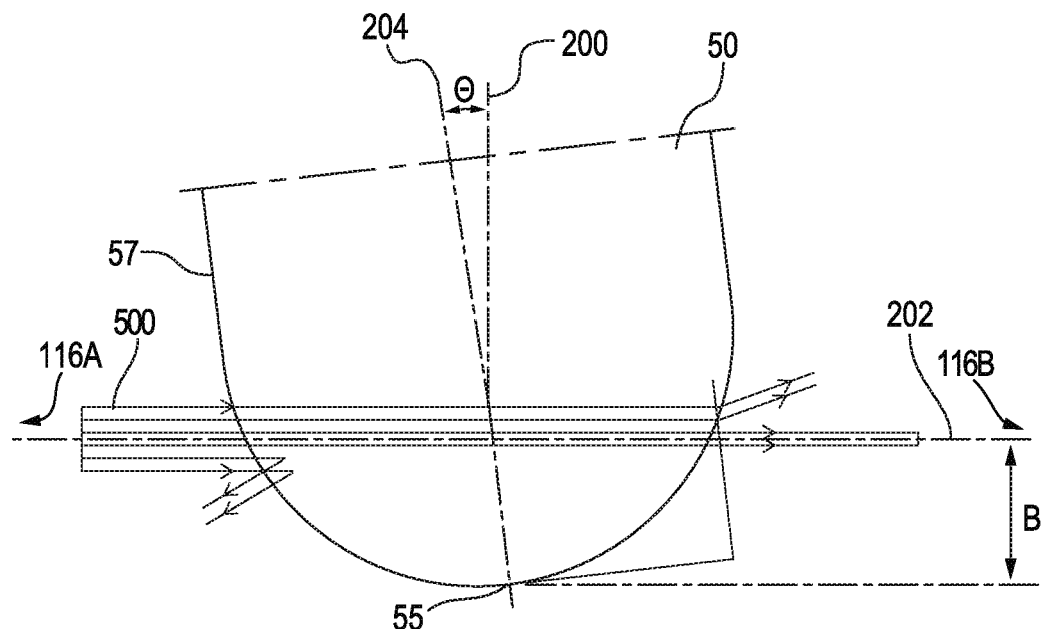
Figure 6J:
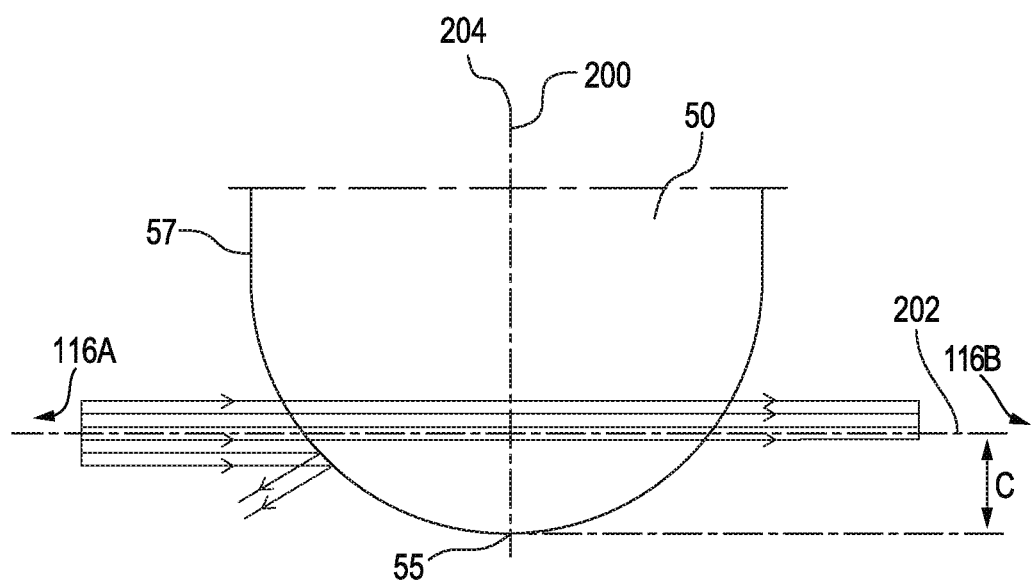

FIGS. 6G-6J schematically illustrate the interaction between an optical beam 500 passing from emitter 116A to detector 116B (not shown) and a receptacle 50 seated in puck 100. As illustrated in FIG. 6G, when a receptacle 50 is not present in puck 100, the entire optical beam 500, or substantially the entire optical beam 500 may be received and detected by detector 116B. Note that although a receptacle is not present in puck 100 in FIG. 6G, the outline of a receptacle is shown using dotted lines for reference. Detector 116B may be configured to send a signal (e.g., voltage) indicative of the intensity (or another parameter) of the received optical beam 500 to a control unit 250 (see FIG. 6C) operatively coupled thereto. As illustrated in FIG. 6H, when a receptacle 50 is seated (or properly seated in some embodiments) in puck 100, the curved side wall of receptacle 50 in the path of optical beam 500 blocks, deflects and/or refracts at least a portion of the optical beam 500 passing from emitter 116 to detector 116B. Consequently, a smaller portion, if any, of optical beam 500 from emitter 116A is received by detector 116B as compared to when no receptacle is present in puck 100. Thus, when a receptacle 50 is seated (or properly seated in some embodiments) in puck 100, detector 116B detects no more than a portion of the optical beam 500 emitted by the emitter 116A. FIGS. 6I and 6J are schematic illustrations of a receptacle 50 that may not be properly oriented or seated in puck 100. FIG. 6I illustrates a receptacle 50 positioned in puck 100 with its longitudinal axis 204 inclined at an angle θ with respect to vertical axis 200 (angle θ may be such that a side wall 57 of receptacle 50 blocks or interferes with pipettor 150 or an associated pipette tip 152 attempting to access the contents of receptacle 50). FIG. 6J illustrates a receptacle 50 positioned on puck 100 such that base 55 of receptacle 50 is spaced apart from base 106J of supporting disc 106 (not shown). As a consequence, the distance "C" between base 55 of receptacle 50 and the common longitudinal axis 202 of passageways 136A, 136B is less than that of distance "B" of FIG. 6H, which represents a receptacle 50 in contact with base 106J of supporting disc 106 (not shown). As such, the distance "B-C" represents the distance that the base 55 of a receptacle 50 seated in puck 100 (or carriage 20) is removed from base 106J of puck 100 (or a base of carriage 20). In both FIGS. 6I and 6J, the shape/curvature of the receptacle sidewall 57 surface upon which optical beam 500 impinges, or is incident upon, will be different as compared to when receptacle 50 is properly seated in puck 100 (FIG. 6H). Because of this difference in curvature of the incident surface, a different (more or less) amount of the optical beam 500 may be blocked/deflected/refracted by the receptacle sidewall. Consequently, when receptacle 50 is not properly seated in puck 100, detector 116B will detect a different (more or less) amount of optical beam 500 as compared to when receptacle 50 is properly seated (FIG. 6H).

The amount of receptacle misalignment (i.e., angle θ in FIG. 6I and distance B-C (compare FIGS. 6I and 6J)) tolerated by instrument 1000 may depend upon the application. For example, in some embodiments, a tilt angle θ of up to about 10° and/or a seating deviation (i.e., distance B-C) of up to about 5 mm may have no adverse effect on performance. By "no adverse effect" is meant that pipettor 150 (or an associated pipette tip 152) is able to access contents of receptacle 50 without interference from receptacle 50 at second end 24, and that no structure of instrument 1000 is capable of interfering with movement of receptacle 50 between first and second ends 22, 24 or positioning of receptacle 50 for pipetting at second end 24. By "interference" is meant that receptacle 50 blocks or otherwise inhibits pipettor 150 (or an associated pipette tip 152) from accessing or aspirating a desired volume of the contents of receptacle 50.

In some embodiments, puck 100 may be configured to receive a receptacle having a curved base (e.g., a hemispherical base as illustrated in FIGS. 6A-6G) and a receptacle having a flat base. As best seen in FIG. 6E, when a receptacle 50 with a curved or hemispherical base is seated in puck 100, the sidewall surface of the receptacle that optical beam 500 (from emitter 116A) is incident on is curved about both axes 200 and 202 (i.e., a vertical and a horizontal axis). And, in embodiments where puck 100 receives a receptacle with a flat base, the surface of the receptacle that the optical beam is incident on is only curved about vertical axis 200. It should be noted that in embodiments, if the common longitudinal axis 202 of passageways 136A, 136B (and passageway 106F) passes through the diameter of the receptacle (i.e., is not offset from vertical axis 200), a sufficient portion of the optical beam 500 may not be blocked/deflected/refracted by the receptacle side wall for the sensing system to determine that a receptacle is seated in puck 100. With reference to FIG. 6F, in some embodiments when a receptacle with a flat base is used, the optical beam 500 may be focused lower on the receptacle (i.e., distance B may be smaller) than when a receptacle with a hemispherical base is used (e.g., because of their differences in profile). In some embodiments, control unit 250 may be calibrated to detect the presence of (or proper seating of, in some embodiments) both a receptacle with a curved base and a receptacle with a flat base. During use, based on signals from detector 116B, control unit 250 (see FIG. 6C) may detect whether receptacle 50 is properly seated in puck 100. In some embodiments, control unit 250 may signal to a user that receptacle 50 is properly or improperly seated in puck 100 using indicators (activating lights, sounds, icons, etc.). It should be noted that although a signal emitter and signal detector pair is described as being used as a sensor of the receptacle-present sensing system, this is only exemplary. In general, any suitable sensor (e.g., optical emitter and optical detector, contact switch, reflective sensor, ultrasonic camera, resistive film sensor, etc.) may be used.

The signal from detector 116B may be calibrated to distinguish between a properly seated and an improperly seated receptacle 50. As would be recognized by a person skilled in the art, calibration of the detector signals to detect proper seating of receptacle 50 in puck 100 may be performed in any manner. In some embodiments, experiments may be performed to determine the emitter signals (voltage indicative of the intensity of detected light, etc.) for different configurations (diameters, types, base curvatures, etc.) and/or positioning (e.g., different angles θ and distances B-C) of receptacles 50 in puck 100. And, based on these results and prior experience threshold values (or ranges) of emitter signals that indicate proper receptacle seating may be selected. The above-described calibration method is only exemplary.

Receptacle 50 may include a machine-readable label 52 (see FIGS. 4B, 5H, 5I) with encoded details (type of sample, collection date, type of test(s), patient information (age, address, sex, etc.), etc.) about the fluid contained in receptacle 50. In general, machine-readable label 52 may include any form of encoded data. In some embodiments, machine-readable label 52 may include marks or lines (e.g., 1D or 2D barcodes, etc.) formed (e.g., printed) directly on the sidewall of receptacle 50. In some embodiments, label 52 may be a tag or sticker with a pattern of marks formed thereon. Carriage 20 includes a label reader 42 (e.g., a barcode reader) (see FIG. 4B) configured to read the information encoded in machine-readable label 52 (e.g., barcode) on receptacle 50. In some embodiments, the information read by label reader 42 may be used to associate the fluid in receptacle 50 with a particular patient sample and/or an assay protocol(s). In some embodiments, label reader 42 may be positioned within a housing 40 (see FIGS. 3A and 4B) of shuttle 16. With reference to FIG. 4B, label reader 42 may be positioned such that, the sidewall of a receptacle 50 seated in puck 100 may be in a line of sight of label reader 42 through a slot 38D (on sidewall 38B) of bracket 38. If receptacle 50 is oriented such that machine-readable label 52 (the sidewall of receptacle 50) is visible to label reader 42, when activated, label reader 42 may readily read label 52. However, in some embodiments, receptacle 50 may be oriented such that machine-readable label 52 is not in the line of sight of label reader 42. Therefore, in some embodiments, when label reader 42 is activated, puck 100, along with receptacle 50, may be rotated (within bracket 38) about vertical axis 200 by activating electric motor 126. Rotating receptacle 50 enables label reader 42 to read machine-readable label 52 even if label 52 was initially oriented away from label reader 42. In general, electric motor 126 may rotate receptacle 50 by any amount (i.e., any angle about axis 200). In some embodiments, electric motor 126 may rotate receptacle 50 in the same direction (i.e., clockwise or counterclockwise) for one or more cycles. In some embodiments, electric motor 126 may rotate receptacle 50 back-and-forth for one or more cycles. One cycle of back-and-forth rotation includes rotating receptacle 50 first in one direction (i.e., clockwise or counterclockwise) by any amount (e.g., from about 15° to about 360°) and then in the opposite direction. In general, receptacle 50 may be rotated back-and-forth, or rotated in the same direction, for any number of cycles (e.g., 1-10). In some embodiments, one cycle of back-and-forth rotation may include rotating receptacle 50 by about 360° in one direction and then by about 360° in the opposite direction. In some embodiments, receptacle 50 may be rotated (in the same direction or back-and-forth) until label reader 42 reads machine-readable label 52. That is, a control unit (e.g., control unit 250 of FIG. 6C) may deactivate electric motor 126 in response to a signal indicative of label reader 42 reading machine-readable label 52. It should be noted that, in some embodiments, other techniques (e.g., RFID tags and RFI reader, etc.) may be used to read information about the fluid contained in receptacle 50.

Typically, prior to placing a receptacle in carriage 20, an initialization routine may be performed on carriage 20. In some embodiments, the initialization routine may include the steps of (a) positioning puck 100 in its home position (or homing the puck 100), (b) confirming that carriage 20 is not supporting a receptacle, (c) aligning the passageways that direct optical beam 500 from emitter 116A to detector 116B, and (d) luminance calibration of optical beam 500. Positioning puck 100 in the home position may include activating electric motor 126 to rotate puck 100 until home sensor 120 attached to holder 130 (see FIG. 6A) is aligned with the magnet (not shown) attached to puck 100. After homing the puck 100, label reader 42 is used to confirm that carriage 20 is not supporting a receptacle. For example, with reference to FIG. 4B, sidewall 38A of bracket 38 opposite slot 38D may include a barcode (not shown) or another machine-readable indicator (e.g., encoded with, for example, the letter "Z"). If a receptacle is seated in puck 100, label reader 42 will not be able to read the barcode on sidewall 38A because the receptacle will be located between slot 38D and the barcode. If label reader 42 reads the barcode on sidewall 38A (i.e., the letter Z), it confirms that a receptacle is not supported by carriage 20. After confirming that puck 100 does not include a receptacle, puck 100 is rotated to align passageways 106F', 106F" of puck 100 (i.e., collectively a puck passageway) with passageways 136A, 136B of the stationary holder 130 (i.e., collectively a holder passageway). When the puck passageway is aligned with the holder passageway, the longitudinal axis of the puck passageway may be parallel to, or coincident with, the longitudinal axis of the holder passageway. Aligning these passageways ensures that detector 116B receives the maximum amount of optical beam 500 emitted by optical emitter 116A when a receptacle 50 is not supported in puck 100 (see FIG. 6G).

FIGS. 7A and 7B are simplified schematic illustrations that depict aligning the optical beam passageways of the puck 100 (i.e., passageways 106F', 106F") and holder 130 (i.e., passageways 136A, 136B). FIG. 7A is a simplified plan view of supporting disc 106 positioned in holder 130. To align the passageways, puck 100 is rotated while monitoring the signal from optical detector 116B. FIG. 7B is a graphical illustration of the signal 118A (e.g., indicative of intensity) from optical emitter 116A as puck 100 is rotated. The outlines of the holder passageways 136A, 136B (marked 130') and the disc passageways 106F', 106F" (marked 106') at different points during the rotation of puck 100 are also illustrated in FIG. 7B. When the puck passageways 106F', 106F" is not aligned with the holder passageways 136A, 136B (i.e., when outlines 130' and 106' are not superimposed), only a portion of (or none of) optical beam 500 from emitter 116A is received by detector 116B. When these passageways are aligned (i.e., when outlines 130' and 106' are superimposed), detector 116B receives the maximum amount of optical beam 500, and therefore measures the maximum intensity. To align the passageways 106F', 106F" of puck 100 with the passageways 136A, 136B of holder 130, rotation of puck 100 is stopped when detector 116B detects the maximum intensity of light (i.e., at rotational position "X" in FIG. 7B). After aligning the holder and the puck passageways, optical beam 500 is calibrated for luminance FIG. 7C is a graphical illustration of luminance calibration. As illustrated in FIG. 7C, the power input to optical emitter 116A is adjusted (increased, decreased, etc.) until the intensity of the light detected by optical detector 116B (the measured luminance 118B) reaches a predetermined target luminance value 118C. Over time, aging of sensors and/or particulate buildup in the passageways 136A, 136B, 106F', 106F" may decrease the amount of optical beam 500 from emitter 116A that is received/detected by detector 116B. In some embodiments, the initialization routine may be performed periodically (e.g., weekly, monthly, before analyzing a set number or a batch of samples, etc.). Periodically aligning the optical passageways in the holder and puck and performing luminance calibration may enable the receptacle-present sensing system to accurately detect whether a receptacle is present in, and/or properly seated in, puck 100 under different practical conditions (e.g., account for sensor aging and/or particulate buildup in the optical passageways over time.

Figure 8A:
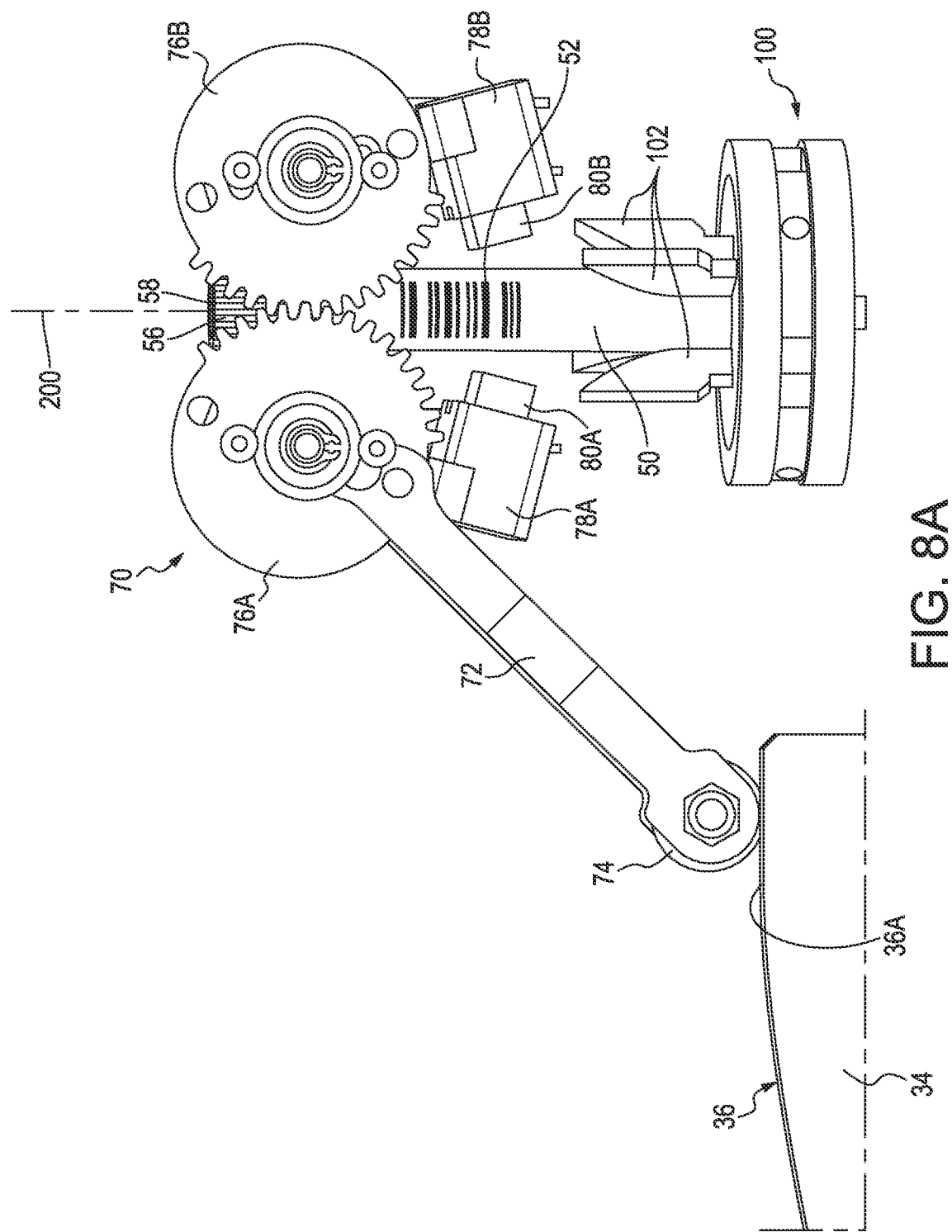
FIGS. 8A-8B illustrate an exemplary receptacle clamping mechanism of the carriage of FIGS. 4A-4E.
Figure 8B:
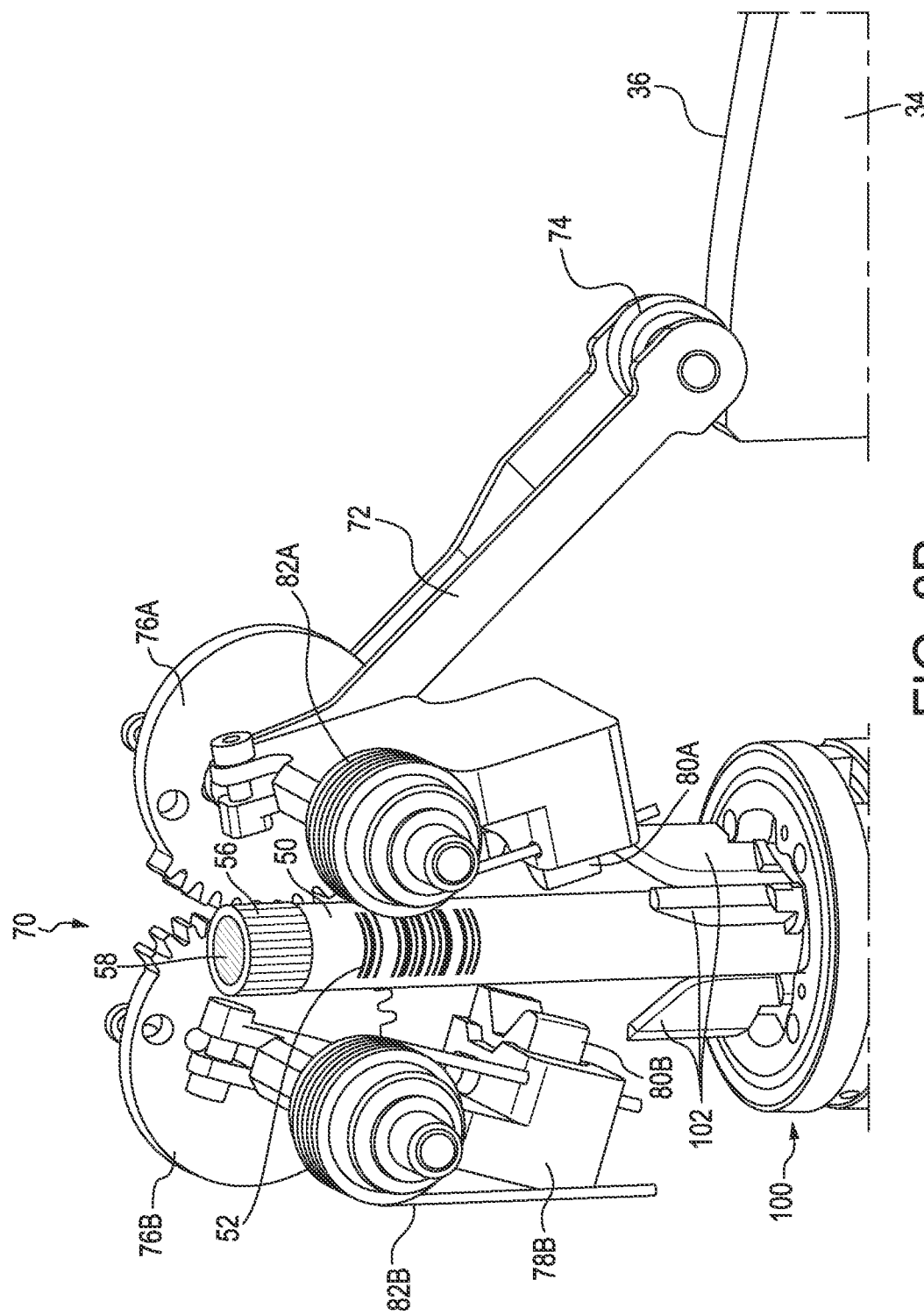

After initializing carriage 20 as described above, a receptacle 50 may be placed in puck 100 (e.g., by robotic arm 660 of FIG. 2J). As explained previously, receptacle 50 is supported on puck 100 by the plurality of fingers 102 (see FIGS. 5H, 5I, 5K, and 6A-6D). Carriage 20 also includes an additional receptacle clamping mechanism 70 adapted to selectively clamp (e.g., restrict the movement of) receptacle 50 when carriage 20 is positioned at second end 24 of shuttle 16. FIGS. 8A and 8B illustrate an exemplary receptacle clamping mechanism 70 of carriage 20. Clamping mechanism 70 includes a cam arm 72 having a roller 74 rotatably coupled at one end. The opposite end of cam arm 72 is attached to a cam gear 76A rotatably coupled to sidewall 38A of bracket 38 (see FIGS. 4B, 4D). Cam gear 76A is meshed with another cam gear 76B, which is also rotatably coupled to sidewall 38A. An actuator arm 78A is coupled to cam gear 76A such that actuator arm 78A rotates along with cam gear 76A (i.e., there is no relative motion between cam gear 76A and actuator arm 78A). And an actuator arm 78B is coupled to cam gear 76B such that actuator arm 78B rotates with cam gear 76B. As best seen in FIG. 8B, actuator arms 78A, 78B have a substantially L-shape and may be attached to the respective cam gear 76A, 76B such that the free ends of both actuator arms 78A, 78B face receptacle 50 seated on puck 100. The free end of actuator arm 78A that faces receptacle 50 includes a support pad 80A, and the free end of actuator arm 78B that faces receptacle 50 includes a support pad 80B. The surfaces of pads 80A, 80B that faces receptacle 50 may be contoured or include a groove (e.g., substantially V-shaped groove, substantially U-shaped groove, etc.). The shape of the contour or groove of pads 80A and 80B may be selected to fit on, and clamp, the sidewalls of receptacles of a range of diameters (e.g., from about 12 mm to about 16 mm) that are intended to be supported in puck 100. When carriage 20 is positioned at first end 22, a spring 82A may bias actuator arm 78A and pad 80A away from receptacle 50, and a spring 82B may bias actuator arm 78B and pad 80B away from receptacle 50. That is, when carriage 20 is positioned at first end 22, the pads 80A and 80B do not apply a clamping force on the receptacle 50. In general, the clamping force exerted by the pads 80A, 80B on receptacle 50 depends on the size and material of the pads and their coefficients of friction.

Although not a requirement, in some embodiments, pads 80A and 80B may be configured to prevent upward movement of a receptacle clamped by the pads when a vertical or upward force of from about 10N to about 30N is applied to receptacle 50. As will be explained later, in some embodiments, a receptacle seated in puck 100 may experience an upward force of a similar magnitude when a pipette tip is withdrawn from receptacle after aspirating fluid from the receptacle. Pads 80A, 80B may, in general, made of any suitable material (e.g., a relatively compliant material). In some embodiments, pads 80A, 80B may be made of silicone, EPDM (ethylene propylene diene monomer rubber), other rubbers, elastomeric material, etc.

With reference to FIGS. 3A-3C, shuttle 16 includes a ramp 34 attached to housing 44. A top surface of ramp 34 is inclined to form an inclined surface 36 that extends parallel to rail 30 (see FIGS. 3A, 3B). Inclined surface 36 is a surface that inclines downwards from its top end 36A located closer to first end 22 to its bottom end 36B located between first end 22 and second end 24. When carriage 20 is positioned at first end 22, roller 74 of cam arm 72 rests at the top end 36A of inclined surface 36. When electric motor 26 is activated and carriage 20 moves from first end 22 to second end 24 on rail 30, roller 74 rolls down inclined surface 36 of ramp 34, and cam arm 72 rotates in one direction (clockwise or downward when viewed from the side of receptacle 50, see FIG. 8B). And when carriage 20 moves from second end 24 to first end 22, cam arm 72 moves up inclined surface 36 and rotates in the opposite direction (counterclockwise in FIG. 8B). With reference to FIG. 8B, when cam arm 72 rotates in a clockwise direction, cam gear 76A also rotates in a clockwise direction, and cam gear 76B rotates in a counterclockwise direction. When cam gear 76A rotates in a clockwise direction, actuator arm 78A also rotates in a clockwise direction and pad 80A moves toward receptacle 50. Similarly, when cam gear 76B rotates in a counterclockwise direction, actuator arm 78B also rotates in a counterclockwise direction and pad 80B moves toward receptacle 50. When cam arm 72 reaches the bottom end 36B of inclined surface 36, pads 80A and 80B press against and secures or locks receptacle 50 in puck 100. In a similar manner, when carriage 20 travels from second end 24 to first end 22, cam gears 76A and 76B rotate in counterclockwise and clockwise directions, respectively, and cause pads 80A, 80B to move away from and release receptacle 50. When carriage 20 reaches first end 22, receptacle 50 is not constrained, or clamped, by pads 80A, 80B. That is, as carriage 20 moves from first end 22 towards second end 24, pads 80A and 80B make contact with and apply a clamping force on receptacle 50, and as carriage 20 moves from the second end 24 towards first end 22, pads 80A and 80B move away from receptacle 50 and release the clamping force (provided to receptacle 50 by pads 80A, 80B). Thus, clamping mechanism 70 selectively applies a clamping force to receptacle 50 only when carriage 20 is positioned at second end 24.

Figure 10B:
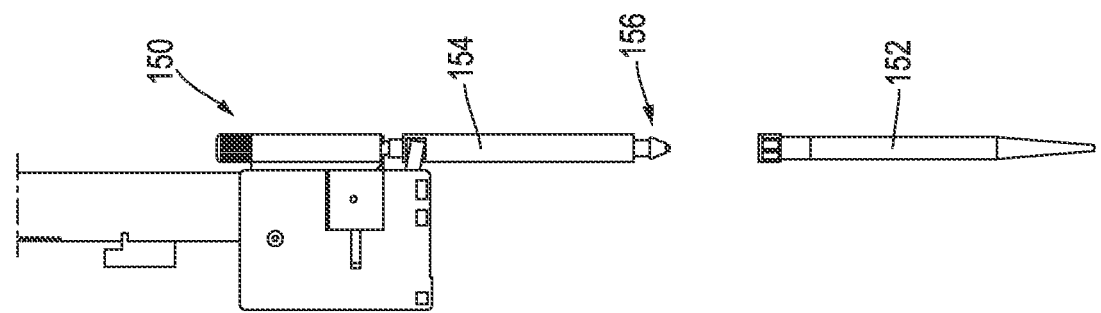
FIGS. 10A and 10B illustrate a pipettor having an associated pipette tip, in an exemplary embodiment.
Figure 10A:
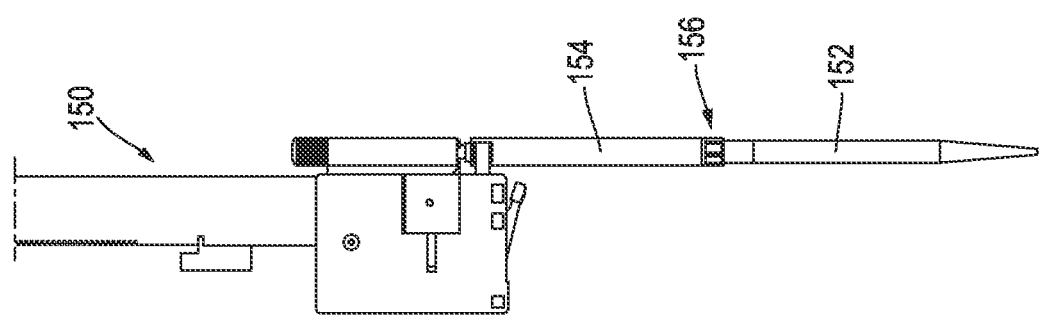
Figure 10C:
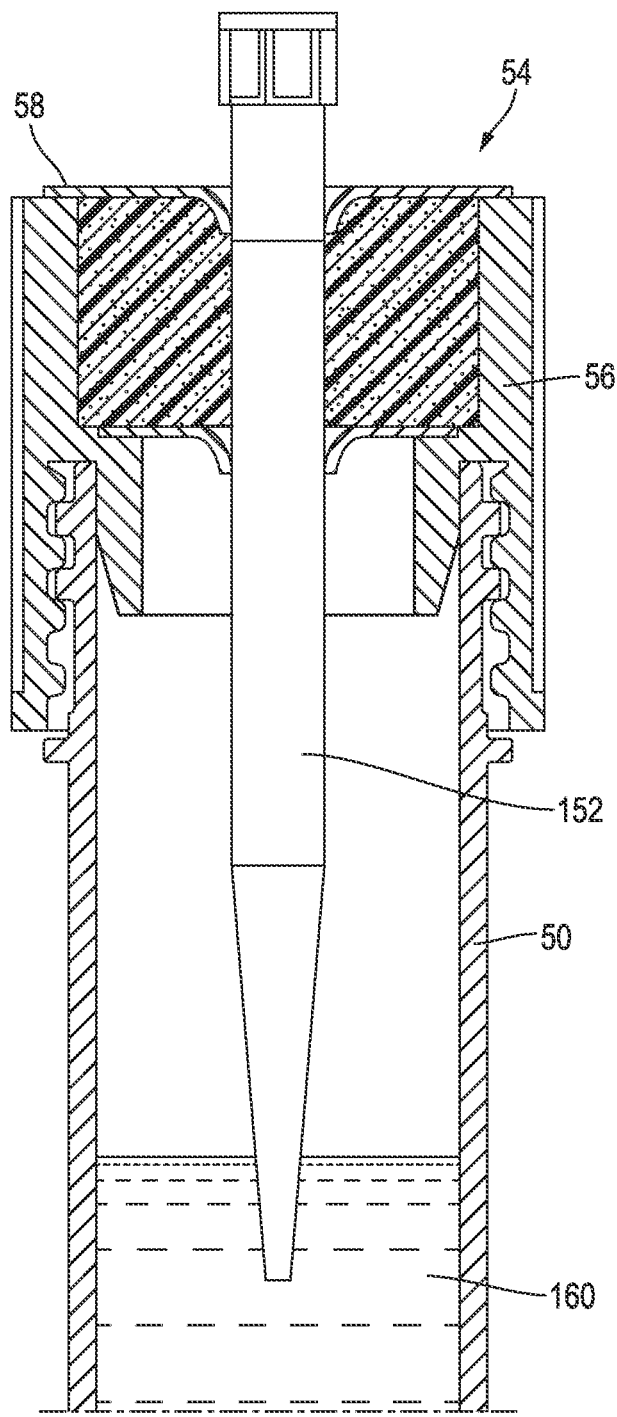
FIG. 10C illustrates the pipette tip of the pipettor of FIGS. 10A-10B positioned in an exemplary capped receptacle.

As best seen in FIG. 4G, second end 24 of instrument 1000 includes an automated pipettor 150 that may be used to aspirate a fluid (e.g., sample) contained in receptacle 50 supported in carriage 20. FIGS. 10A and 10B illustrate an exemplary pipettor 150 of instrument 1000. With reference to FIGS. 4G, 10A and 10B, pipettor 150 includes a disposable pipette tip 152 that may be removably attached to a mounting end 156 (e.g., bottom) of pipettor 150. A slidable sleeve 154 is associated with the pipettor 150 which can be activated to move in a downward direction, thereby ejecting pipette tips 152 from the mounting end 156 after use. When carriage 20 is positioned at second end 24 (see FIG. 4G), pipette tip 152 enters receptacle 50 and aspirates fluid 160 from receptacle 50. FIG. 10C illustrates pipette tip 152 of pipettor 150 aspirating fluid 160 from receptacle 50. In some embodiments, as shown in FIG. 10C, receptacle 50 may have a top opening 54 closed by a cap 56. Cap 56 may be configured to be penetrated (e.g., top opening 54 may be covered with a metallic foil or another pierceable material 58) by pipette tip 152 as it enters receptacle 50. In general, cap 56 may have any configuration. Exemplary receptacles closed with a penetrable cap are disclosed in U.S. Pat. Nos. 8,052,944, and 8,206,662. As pipette tip 152 is withdrawn from receptacle 50 after fluid aspiration, the interaction (e.g., friction) between receptacle cap 56 and pipette tip 152 may result in a retention force being applied to receptacle 50, such that pipettor 150 may tend to lift receptacle 50 and extract it from between the plurality of fingers 102 of puck 100. In some cases, this upward force on receptacle 50 may exceed 10N (or may be from about 10N to about 30N). Clamping receptacle 50 using pads 80A, 80B of clamping mechanism 70 may prevent receptacle 50 from being pulled out of puck 100 when pipette tip 152 is withdrawn from receptacle 50. In contrast, at first end 22, robotic arm 660 picks up receptacle 50 from carriage 20 and transfers it back to carrier 400 of conveyor 300 (see FIG. 2I). Releasing the clamping force (to receptacle 50) provided by pads 80A, 80B at first end 22 enables receptacle 50 to be easily removed from puck 100 by robotic arm 660. It should be noted that the configuration of cap 56 illustrated in FIG. 10C is only exemplary.

Figure 9A:
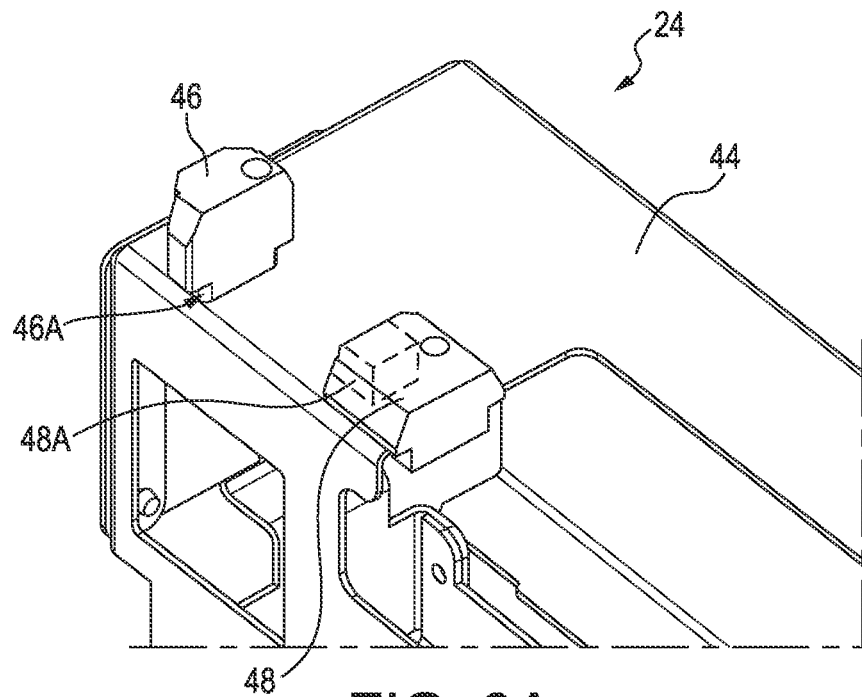
FIG. 9A illustrates the shuttle of FIGS. 3A-3E with a primary mucoid shelf removed, in an exemplary embodiment.
Figure 9B:
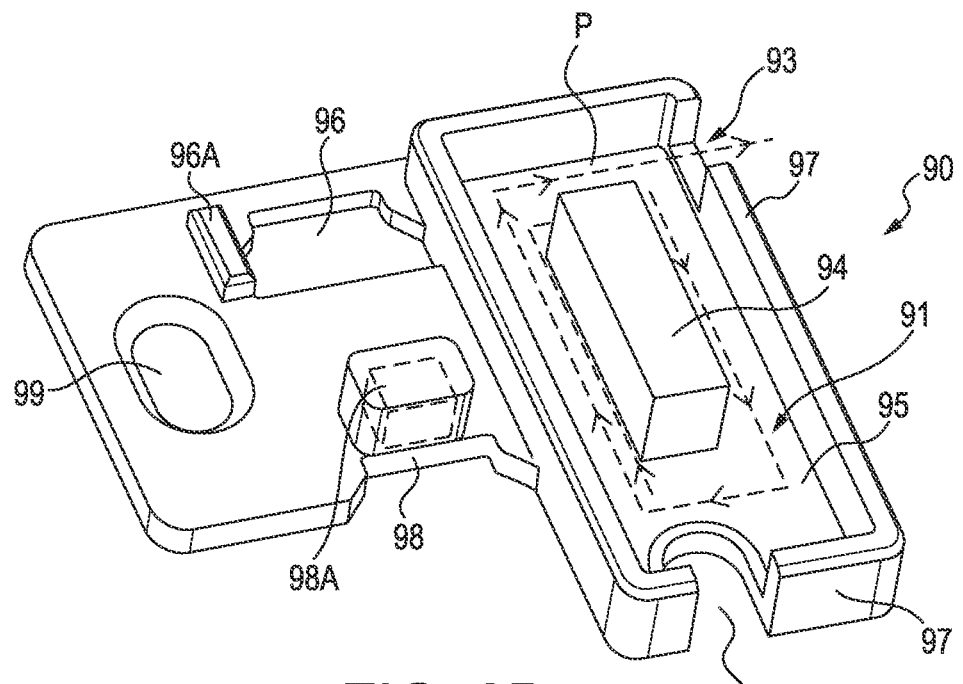
FIG. 9B illustrates an exemplary primary mucoid shelf that may be attached to the shuttle of FIG. 9A.

With reference to FIG. 3A, at second end 24 of shuttle 16, primary mucoid shelf 90 is removably attached to housing 44. FIG. 9A illustrates second end 24 of shuttle 16 with primary mucoid shelf 90 removed, and FIG. 9B illustrates an embodiment of the removed primary mucoid shelf 90. In the description that follows, reference will be made to FIGS. 3A, 9A, and 9B. Primary mucoid shelf 90 may be a plate-like structure arranged substantially horizontally over rail 30. The top surface of primary mucoid shelf 90 includes a recessed pathway or a labyrinth 95 arranged around a first projection 94. As illustrated in FIG. 9B, labyrinth 95 may be bounded by sidewall 97. A first opening 92 (e.g., a hole, recess, cut-out, aperture, etc.) may be formed in or defined by the base 91 of labyrinth 95, and a second opening 93 may be formed in or defined by sidewall 97. In some embodiments, as illustrated in FIG. 9B, first opening 92 may be a recess defined by sidewall 97 extending inward into the base 91 of labyrinth 95 and second opening 93 may be a downwardly extending recess formed in sidewall 97. As will be described in more detail below, pipette tip 152 of pipettor 150 may navigate through labyrinth 95 after aspirating fluid from receptacle 50. The configuration of labyrinth 95 illustrated in FIG. 9B is only exemplary. In general, labyrinth 95 may have any configuration (e.g., a zig-zag path, etc.). With respect to first opening 92, it should be noted that the term "opening" is intended to cover embodiments where the opening is fully defined by base 91 of shelf 90 (e.g., fully contained within the base 91, as in the case of a hole) and embodiments where the opening is only partially defined by the base 91 of shelf 90 (e.g., a recess formed in the base 91 of the shelf, such as, for example, first opening 92 illustrated in the embodiment of FIG. 9B). Second opening 93, when present, is configured to permit lateral passage of pipette tip 152 through second opening 93 without adjusting the height of pipettor 150.

In some embodiments, primary mucoid shelf 90 is removably attached to housing 44 using magnets. Primary mucoid shelf 90 and housing 44 may include mating features that are adapted to align primary mucoid shelf 90 correctly on housing 44 when primary mucoid shelf 90 is attached to housing 44. In some embodiments, as illustrated in FIGS. 9A and 9B, these alignment features include a cavity 96 on primary mucoid shelf 90 and a corresponding projection 46 on housing 44. Cavity 96 and projection 46 may have shape and configuration that will allow projection 46 to fit through cavity 96 only when primary mucoid shelf 90 is aligned on housing 44 in a desired manner. Primary mucoid shelf 90 may also include a projection 96A located proximate cavity 96. This projection may fit into a recess 46A located at the base of projection 46 of housing 44 when primary mucoid shelf 90 is attached to housing 44 and assist in maintaining the height of labyrinth 95 with respect to a datum. A first magnet 98A is provided on primary mucoid shelf 90 and a second magnet 48A (having the opposite polarity as magnet 98A) is provided on housing 44 to removably attach primary mucoid shelf 90 to housing 44. In some embodiments, one of first magnet 98A or second magnet 98B may be a magnet and the other may be a ferromagnetic material. In some embodiments, as illustrated in FIGS. 9A and 9B, first magnet 98A is housed or encased within a feature 98 (e.g., a projecting post) of shelf 90 and second magnet 48A is housed within a feature 48 (e.g., a projecting post) attached to housing 44. When primary mucoid shelf 90 is positioned on housing 44 with projection 46 extending through cavity 96, first and second magnets 98A and 48A attract each other and correctly align primary mucoid shelf 90 on housing 44. A thumb grip 99 may be provided on primary mucoid shelf 90 for the user to securely grasp the primary mucoid shelf 90 while attaching and/or removing it from housing 44. It should be noted that although primary mucoid shelf 90 is described as being removably attached to housing 44 using magnets, this is only exemplary. In some embodiments, tabs or other known alignment features and attachment mechanisms may be used to removably attach shelf 90 to housing 44.

Figure 11A:
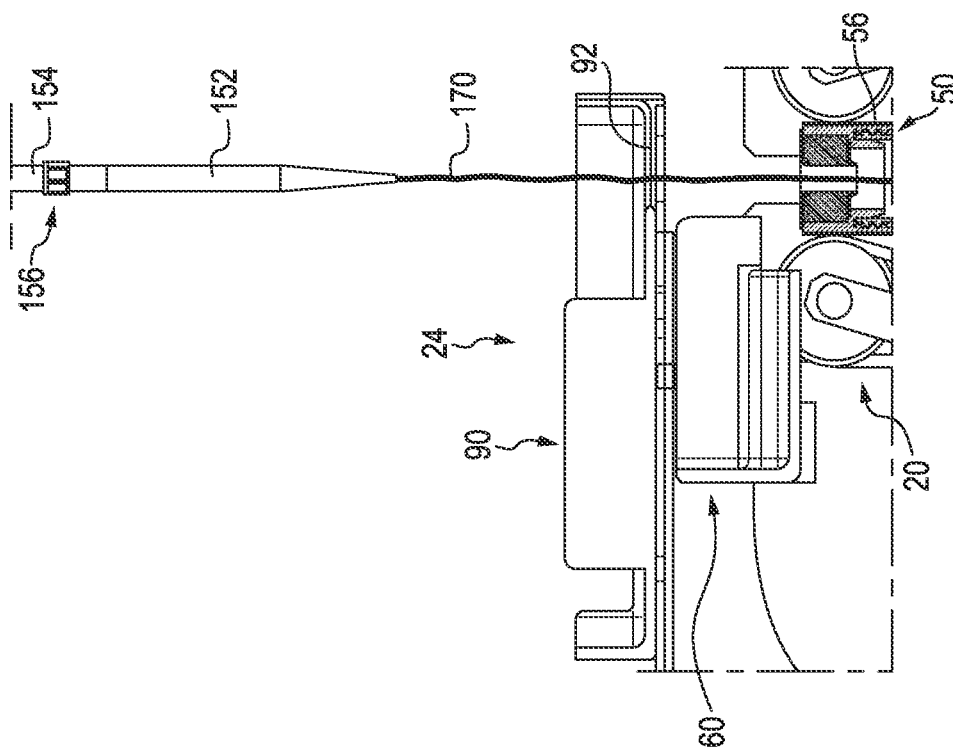
FIGS. 11A-11D illustrate a pipette tip attached to a pipettor aspirating a fluid from a receptacle positioned in the carriage of FIGS. 4A-4E, in an exemplary embodiment.
Figure 11B:
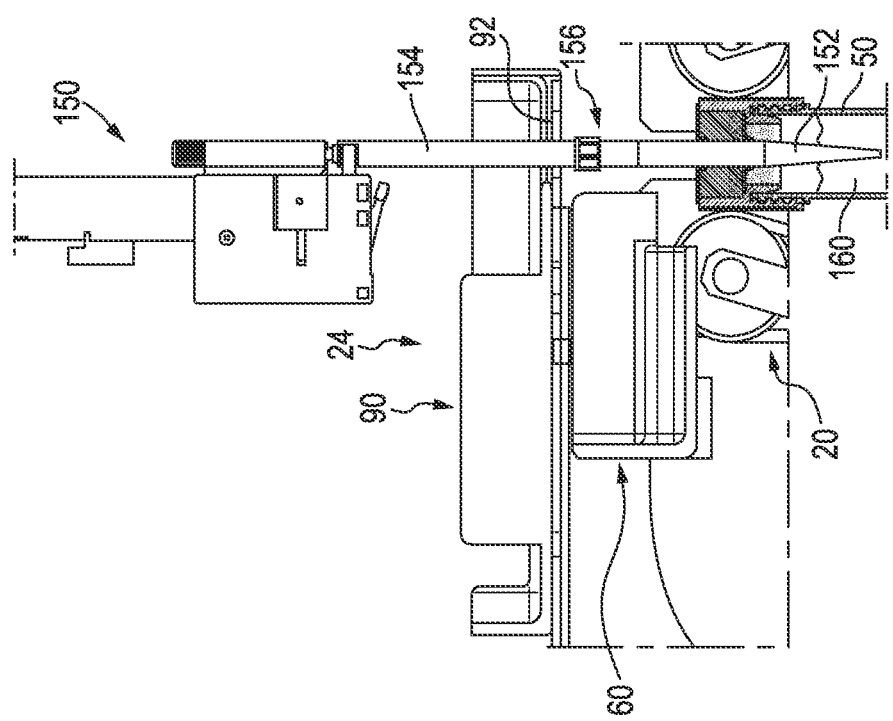
Figure 11C:
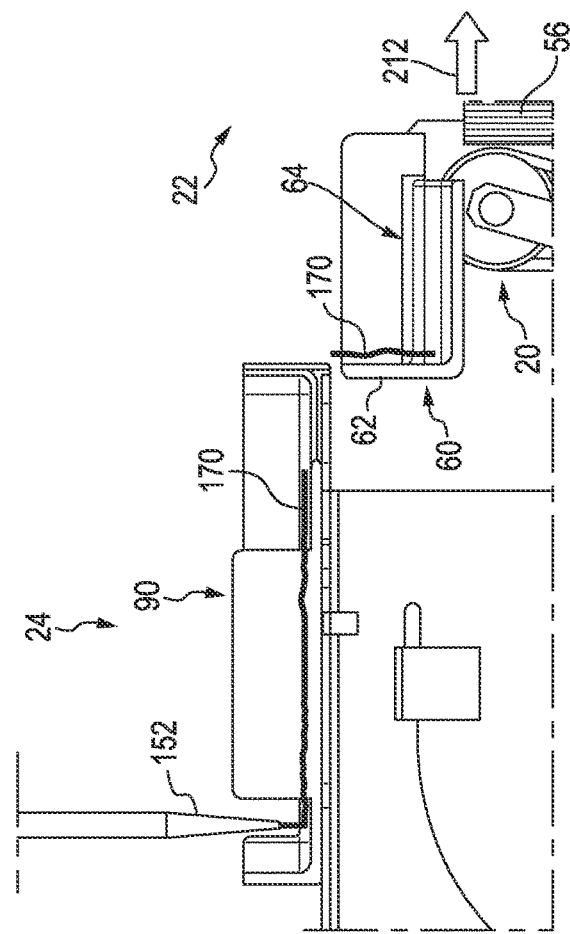

FIGS. 11A-11C illustrate pipette tip 152 attached to the mounting end 156 of pipettor 150 aspirating fluid 160 from receptacle 50 when carriage 20 is positioned at second end 24 of shuttle 16. When carriage 20 is located at second end 24, the top opening 54 of receptacle 50 (or cap 56 of receptacle 50 in embodiments where opening 54 of receptacle 50 is covered by a cap 56) is positioned below, and aligned with, first opening 92 of primary mucoid shelf 90. That is, a vertical axis passing through first opening 92 also passes through top opening 54 (or cap 56) of receptacle 50. In this configuration, secondary mucoid shelf 60 is positioned below primary mucoid shelf 90 (see FIGS. 11A and 4G). In some embodiments, the clearance between the primary mucoid shelf 90 and secondary mucoid shelf 60 may be from about 1 mm to about 6 mm, or preferably from about 2 mm to about 4 mm. The clearance or gap between the bottom surface of primary mucoid shelf 90 and the top of receptacle 50 may vary based on the height of receptacle 50. For example, when a 100 mm tall receptacle is used, the clearance between the receptacle and primary mucoid shelf 90 may be from about 5 mm to about 10 mm, or preferably from about 6 mm to about 8 mm. When receptacle 50 is positioned below first opening 92, pipette tip 152 attached the mounting end 156 of pipettor 150 (of instrument 1000) descends into receptacle 50 through first opening 92 and aspirates fluid 160 contained in receptacle 50 (see FIG. 11A). In embodiments where receptacle 50 is a capped receptacle as described with reference to FIG. 10C, pipette tip 152 pierces the cap 56 as it enters receptacle 50. After a sufficient quantity of fluid 160 is aspirated from receptacle 50, pipette tip 152 is raised and removed from receptacle 50 through first opening 92 of primary mucoid shelf 90 (see FIGS. 11B and 9B).

In some cases, fluid 160 in receptacle 50 may be a viscous fluid, such as, for example, a mucus (e.g., vaginal mucus) In some such cases, a strand of the viscous fluid (referred to herein as mucoid strand 170) may extend from pipette tip 152 to receptacle 50 as pipette tip 152 is removed from receptacle 50 (see FIG. 11B). As would be recognized by a person skilled in the art, this mucoid strand 170 may become dislodged from pipette tip 152 or transported over portions of instrument 1000 (e.g., as pipettor 150 moves) before pipette tip 152 is ejected into a waste container, thus posing a contamination risk. Therefore, it is desirable to remove this mucoid strand 170 from pipette tip 152 after pipettor 150 aspirates fluid 160 from receptacle 50.

Primary mucoid shelf 90 and secondary mucoid shelf 60 assist in removing mucoid strand 170 from pipette tip 152. With reference to FIGS. 9B and 11B, after pipettor 150 is moved in a vertical direction to lift its associated pipette tip 152 above primary mucoid shelf 90 through first opening 92, pipettor 150 is moved horizontally (i.e., sideways) to trace a path defined by labyrinth 95. In some embodiments, before pipettor 150 is moved horizontally along the path, it may be lowered such that the gap between pipette tip 152 and the base 91 of labyrinth 95 is relatively small (e.g., from about 1 mm to about 5 mm) As pipettor 150 moves along this path, mucoid strand 170 suspended from pipette tip 152 is drawn through labyrinth 95. In some embodiments, pipettor 150 may be moved horizontally such that pipette tip 152 traces the dashed-line path identified as "P" in FIG. 9B. That is, pipettor 150 may be moved such that its pipette tip 152, along with mucoid strand 170 suspended therefrom, traverses through labyrinth 95 around projection 94 and is then removed via second opening 93 defined by sidewall 97 of primary mucoid shelf 90. Mucoid strand 170 may break as it is drawn through labyrinth 95, thereby separating it from pipette tip 152. The separated mucoid strand 170 is deposited on labyrinth 95. Labyrinth 95 may have a recessed or reservoir-like configuration that is adapted to collect the mucoid strand 170 deposited thereon. In some cases, as illustrated in FIG. 11C, a portion of mucoid strand 170 may be suspended from primary mucoid shelf 90 and extend toward receptacle 50 through first opening 92. Secondary mucoid shelf 60 may assist in separating and removing the suspended mucoid strand 170 from primary mucoid shelf 90.

Figure 11D:
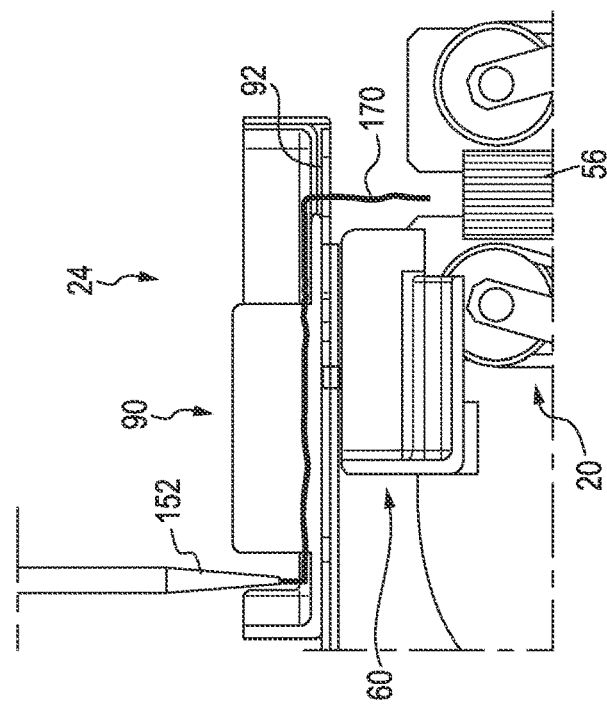
Figure 12:
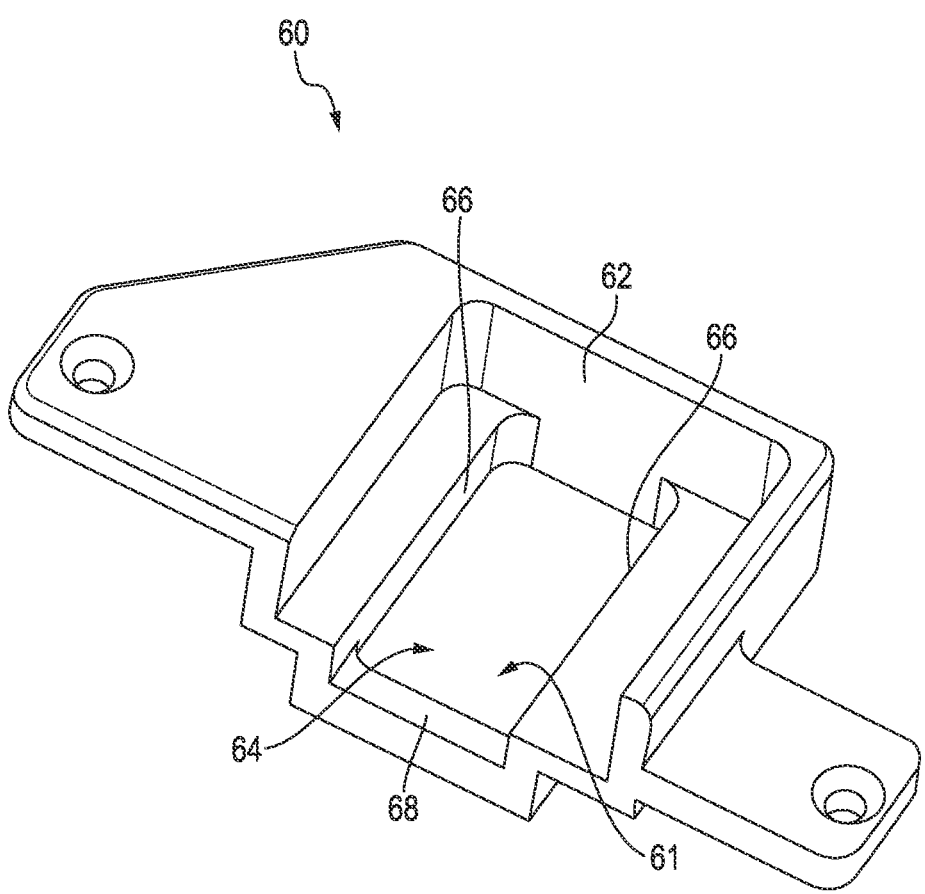
FIG. 12 illustrates an exemplary secondary mucoid shelf that may be attached to the carriage of FIGS. 4A-4E.

As carriage 20 moves from second end 24 back to first end 22, the portion of mucoid strand 170 suspended from mucoid shelf 90 (through first opening 92) is deposited on secondary mucoid shelf 60 (see FIG. 11D). As carriage 20 moves further toward first end 22, the suspended mucoid strand 170 is cleaved by a back wall 62 (of secondary mucoid shelf 60) and deposited on secondary mucoid shelf 60. FIG. 12 illustrates an exemplary secondary mucoid shelf 60 separated from carriage 20. As seen in FIG. 12, secondary mucoid shelf 60 includes side walls 66 and a front wall 68 that, together with back wall 62 and a base 61, define a reservoir 64 or a recessed shape adapted to contain mucoid material deposited thereon. The mucoid material collected on primary and secondary mucoid shelves 90, 60 (i.e., mucoid strand 170 deposited on shelves 60, 90) may then be removed and primary and secondary mucoid shelves 90, 60 cleaned. Removably coupling primary mucoid shelf 90 to housing 44 using self-aligning features 46, 96 and magnets 48A, 98A (see FIGS. 9A, 9B) enables primary mucoid shelf 90 to be easily removed for cleaning and reattached after cleaning. The mucoid collected in secondary mucoid shelf 60 may be cleaned (e.g., manually) when carriage 20 is positioned at first end 22. In some embodiments, secondary mucoid shelf 60 may also be removably coupled to carriage 20 (e.g., using magnets or other suitable mechanisms) for removing secondary mucoid shelf 60 from carriage 20 (for example, for cleaning).

In some embodiments, instrument 1000 may be configured to perform a molecular assay with fluid 160 (e.g., sample) aspirated by pipettor 150 from receptacle 50. In some embodiments, the molecular assay may include one or more reactions and/or treatments tailored to detect and/or quantify a target molecule (e.g., a target nucleic acid) present in the aspirated fluid 160. In some embodiments, the assay may include mixing an aliquot of the aspirated fluid 160, or a processed form of the aspirated fluid, with one or more reagents (e.g., at least one of the reagents being specific for the target molecule), and subjecting the mixture to conditions (thermal cycling, etc.) facilitating the generation of a detectable signal indicative of the presence of the target molecule in the fluid. The signal may provide a qualitative result, or it may be used to approximate the total amount of target molecule present in fluid 160. As would be recognized by a person skilled in the art, in some embodiments, prior to subjecting a sample to conditions for amplification and detection of a targeted molecule, the targeted molecule may be subjected to a procedure (e.g., target capture procedure) for isolating and purifying the targeted molecule, provided it is present in the fluid sample. The selected procedure may remove inhibitors of amplification and detection (e.g., heme). In some embodiments, after isolating and purifying a target molecule, the purified molecule may be further processed in the same receptacle or it may be transferred to a separate receptacle for performing the steps of amplification and detection. Exemplary processes, instrument components, and consumables that may be used in a molecular assay are described in U.S. Pat. Nos. 9,011,771, 6,605,213, 5,234,809, 6,534,273, 6,517,783, 9,162,228, 9,732,374, 9,465,161, and 10,494,668, and in International Publication No. WO 2019/014239 A1. When the molecular assay is a PCR (polymerase chain reaction) assay, the reagents used may be specific for the target molecule and the generation of a detectable signal may be accomplished, at least in part, by providing a labeled probe that hybridizes to the amplicon produced by the associated primers in the presence of the target molecule. Since molecular assays are well known to the skilled person and extensively described elsewhere, they are only generally described above. Exemplary assays are described in more detail in PCT/US2018/041472 and the associated references that are incorporated by reference therein.

Figure 13A:
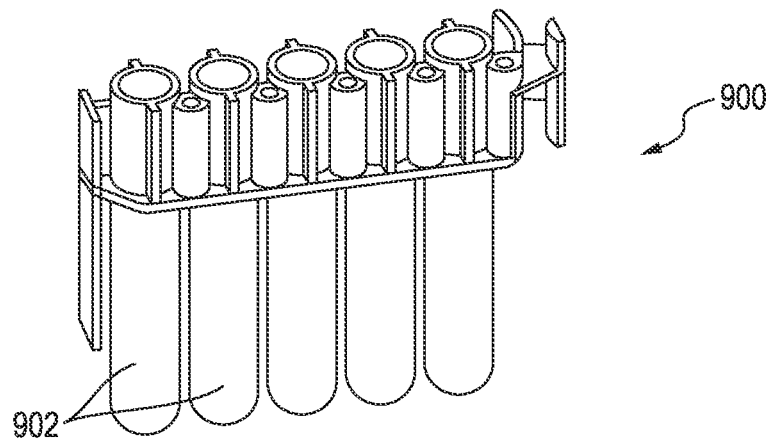
FIG. 13A illustrates an exemplary multi-receptacle unit (MRU) of an instrument of FIG. 1A.
Figure 13B:
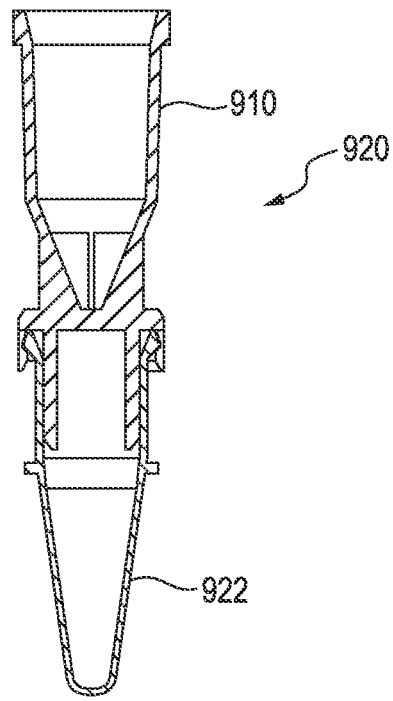
FIG. 13B illustrates an exemplary cap/vial assembly of an instrument of FIG. 1A.

In some embodiments, after pipette tip 152 of pipettor 150 is removed from labyrinth 95 of primary mucoid shelf 90 via the second opening 93 (see FIG. 9B), an aliquot of fluid 160 may be transferred from the pipette tip 152 to a receptacle (e.g., to one or more receptacles 902 of a multi-receptacle unit (MRU) 900 illustrated in FIG. 13A) contained in instrument 1000. A target capture reagent (e.g., a reagent containing a magnetically-responsive solid support capable of immobilizing the target molecule) may be added to receptacle 902, and the contents of the receptacle 902 may be incubated for a prescribed period(s) at a prescribed temperature(s). The contents of the receptacle 902 may then be subjected to a magnetic wash procedure, whereby non-targeted, potentially inhibitory components of the fluid sample are removed from the receptacle 902. Following target capture, an elution buffer may be provided to receptacle 902, and the receptacle 902 may then be subjected to a magnetic process to separate the eluted nucleic acid material from the magnetically-responsive solid support (e.g., magnetic or silica magnetic particles or beads). The eluted material, along with other reagents, may then be combined in a vial 922 by means of a pipettor, and the vial may then be sealed with a cap 910 to form a cap/vial assembly 920. The contents of the cap/vial assembly 920 may then subjected to a thermal cycling protocol in a thermal cycler of instrument 1000 for amplification of any targeted molecules that may be present in the eluate (e.g., PCR amplification) and for fluorometric detection of the resulting amplicon, if any.

EMBODIMENTS

Embodiment 1. A receptacle delivery system for an instrument, comprising:
a puck configured to removably support a receptacle therein, wherein the puck comprises:
a plurality of fingers arranged about a vertical axis, each finger of the plurality of fingers having a contact surface configured to be in contact with a receptacle seated in the puck;
one or more springs coupling the plurality of fingers, thereby biasing the plurality of fingers toward the vertical axis;
a supporting disc comprising (i) a disc sidewall projecting from a base to define a pocket for seating a receptacle, (ii) a plurality of first cavities formed in the base and extending in a direction of the vertical axis, and (iii) a puck passageway extending through opposed portions of the disc sidewall in a direction transverse to and offset from the vertical axis, wherein each of the plurality of fingers is rotatably coupled to the supporting disc at a corresponding first cavity of the plurality of first cavities;
a synchronization disc positioned in the pocket of the supporting disc, wherein each of the plurality of fingers is coupled to the synchronization disc such that the contact surfaces of the plurality of fingers move toward and away from the vertical axis in a synchronous manner; and
a retaining ring coupling the plurality of fingers, the supporting disc, and the synchronization disc together.

Embodiment 2. The system of embodiment 1, wherein the plurality of fingers are arranged substantially symmetrically about the vertical axis.

Embodiment 3. The system of embodiment 1 or 2, wherein at least an upper portion of the contact surface of each finger of the plurality of fingers is sloped.

Embodiment 4. The system of any one of embodiments 1 to 3, wherein each finger of the plurality of fingers comprises a first end and a second end extending substantially transverse to the first end, the first end including the contact surface and the second end including an inner cavity and an outer cavity, the inner cavity being positioned closer to the vertical axis than the outer cavity.

Embodiment 5. The system of embodiment 4, wherein the synchronization disc includes a plurality of radially extending slots, each finger of the plurality of fingers being slidably coupled to the synchronization disc by a first pin that extends through a slot of the plurality of radially extending slots and the inner cavity of the finger.

Embodiment 6. The system of any one of embodiments 1 to 5, wherein each first cavity of the plurality of first cavities of the supporting disc includes a bearing positioned at least partly therein.

Embodiment 7. The system of embodiment 6, wherein each finger of the plurality of fingers is rotatably coupled to the supporting disc by a second pin that extends through the bearing of a first cavity of the plurality of first cavities of the supporting disc and the outer cavity of the finger.

Embodiment 8. The system of embodiment 7, wherein one end of each second pin extends through the bearing and an opposite end of the second pin extends into a corresponding cavity in the retaining ring.

Embodiment 9. The system of any one of embodiments 1 to 8, wherein the one or more springs coupling the plurality of fingers is an O-ring.

Embodiment 10. The system of embodiment 9, wherein the O-ring comprises an elastomeric material.

Embodiment 11. The system of any one of embodiments 1 to 9, wherein the puck further comprises a first bearing positioned on one side of the supporting disc and a second bearing positioned on an opposite side of the supporting disc.

Embodiment 12. The system of any one of embodiments 1 to 11, further comprising a holder, the holder having a central cavity defined by holder sidewalls and a holder passageway extending through the holder sidewalls, wherein the holder passageway extends in a direction transverse to and offset from the vertical axis, and wherein the puck is positioned in the central cavity and configured to rotate about the vertical axis relative to the holder.

Embodiment 13. The system of embodiment 12, wherein the holder sidewalls comprise a first holder sidewall positioned on one side of the central cavity and a second holder sidewall positioned on an opposite side of the central cavity, and the holder passageway comprises a first holder passageway portion extending though the first holder sidewall and a second holder passageway portion extending though the second holder sidewall.

Embodiment 14. The system of embodiment 12 or 13, further comprising a signal emitter and a signal detector, wherein the signal emitter is positioned at one end of the holder passageway and the signal detector is positioned at an opposite end of the holder passageway.

Embodiment 15. The system of embodiment 14, wherein the signal emitter is coupled to the first holder sidewall and the signal detector is coupled to the second holder sidewall.

Embodiment 16. The system of embodiment 14 or 15, wherein the puck is configured to rotate about the vertical axis relative to the holder to bring the puck passageway into alignment with the holder passageway such that a signal from the signal emitter is received by the signal detector when a receptacle is not seated in the puck.

Embodiment 17. The system of any one of embodiments 12 to 16, further including a first sensor coupled to the holder, the first sensor being configured to detect when the puck has rotated to a predetermined position in the holder.

Embodiment 18. The system of embodiment 17, wherein the first sensor is a Hall effect sensor.

Embodiment 19. The system of any one of embodiments 1 to 18, further comprising an electric motor coupled to the supporting disc of the puck via a belt.

Embodiment 20. The system of embodiment 19, wherein the supporting disc of the puck includes a flange projecting from the base in a direction opposite the disc sidewall, and wherein the belt is engaged with the flange of the supporting disc.

Embodiment 21. The system of any one of embodiments 1 to 20, further including a label reader configured to read data encoded in a machine-readable label on a receptacle seated in the puck.

Embodiment 22. The system of embodiment 21, wherein the label reader is a barcode reader, and the machine-readable label is a barcode.

Embodiment 23. The system of any one of embodiments 12 to 22, further comprising a carriage configured to move from a first location to a second location of the instrument, wherein the holder is coupled to the carriage.

Embodiment 24. The system of any one of embodiments 1 to 23, wherein the disc sidewall of the puck comprises multiple sidewall segments spaced apart from each other and arranged around the pocket, the multiple sidewall segments comprising a first sidewall segment positioned on one side of the pocket and a second sidewall segment positioned on an opposite side of the pocket, and wherein the puck passageway comprises a first puck passageway portion extending through the first sidewall segment and a second puck passageway portion extending through the second sidewall segment.

Embodiment 25. The system of embodiment 24, wherein each first cavity of the plurality of first cavities of the puck is positioned in a space formed between two adjacent sidewall segments of the multiple sidewall segments.

Embodiment 26. The system of any one of embodiments 1 to 25, wherein, when a receptacle is seated in the puck, the pocket of the supporting disc receives a bottom portion of the receptacle.

Embodiment 27. The system of any one of embodiments 1 to 26, wherein the plurality of fingers consists of four fingers.

Embodiment 28. The system of any one of embodiments 1 to 27, wherein each of the plurality of fingers comprises anodized aluminum.

Embodiment 29. The system of embodiment 28, wherein each of the plurality of fingers comprises anodized aluminum coated with polytetrafluoroethylene or a fluoropolymer.

Embodiment 30. The system of any one of embodiments 1 to 29, wherein the one or more springs couple the plurality of fingers together such that, when a receptacle is inserted in a space between the contact surfaces of the plurality of fingers, the one or more springs stretch to allow the contact surfaces to move away from the vertical axis and increase the space between the contact surfaces.

Embodiment 31. The system of any one of embodiments 1 to 30, wherein a longitudinal axis of the puck passageway is offset from the vertical axis.

Embodiment 32. The system of embodiment 31, wherein the longitudinal axis of the puck passageway is offset from the vertical axis by a distance of from about 3 mm to about 6 mm.

Embodiment 33. A receptacle delivery system for an instrument, comprising a carriage supporting a puck, wherein the carriage is configured to move with the puck from a first location to a second location within an instrument of the plurality of instruments, the first location being a location where a receptacle supported by the carrier is configured to be transferred to the puck supported by the carriage, and the second location being a location where fluid from the receptacle seated in the puck is configured to be drawn into a tip associated with a fluid extraction device of the instrument.

Embodiment 34. The system of embodiment 33, wherein the puck is configured to rotate relative to the carriage about a vertical axis of the puck.

Embodiment 35. The system of embodiment 33 or 34, further comprising a label reader configured to read information encoded in a machine-readable label on the receptacle seated in the puck when the carriage is positioned at the first location.

Embodiment 36. The system of any one of embodiment 33 to 35, further comprising a sensing system coupled to the carriage, wherein the sensing system is configured to determine whether a receptacle is seated in the puck.

Embodiment 37. The system of embodiment 36, wherein the sensing system is configured to detect (a) whether a longitudinal axis of a receptacle seated in the puck is inclined with respect to a vertical axis of the puck, and/or (b) whether a receptacle seated in the puck is inserted to a desired depth.

Embodiment 38. The system of embodiment 37, wherein the puck comprises a first passageway that extends transverse to and is offset from a vertical axis of the puck, and the carriage comprises a second passageway that extends transverse to and is offset from the vertical axis of the puck.

Embodiment 39. The system of embodiment 38, wherein the sensing system comprises a signal emitter and a signal detector, and wherein when the first and second passageways are aligned, the signal detector is configured to receive a signal from the signal emitter through the aligned first and second passageways.

Embodiment 40. The system of embodiment 39, wherein the signal emitter is an optical emitter, the signal detector is an optical detector, and the signal is an optical beam.

Embodiment 41. The system of any one of embodiments 33 to 40, further comprising a conveyor extending adjacent to each of a plurality of instruments.

Embodiment 42. The system of embodiment 41, further comprising a carrier configured to support a receptacle containing a fluid and move on the conveyor while the receptacle is supported by the carrier.

Embodiment 43. The system of embodiment 42, further comprising a pick and place device configured to transfer a receptacle from the carrier to the puck.

Embodiment 44. The system of any one of embodiments 33 to 43, further comprising a rail, wherein the carriage is configured to move on the rail from the first location to the second location.

Embodiment 45. The system of any one of embodiments 33 to 44, further comprising a first electric motor operatively coupled to the carriage and configured to move the carriage from the first location to the second location.

Embodiment 46. The system of any one of embodiments 33 to 45, wherein the fluid extraction device is a pipettor.

Embodiment 47. The system of any one of embodiments 33 to 46, wherein the carriage further comprises a support mechanism configured to selectively apply a force on the receptacle when the carriage is positioned at the second location to prevent extraction of the receptacle from the puck, when the tip associated with the fluid extraction device is withdrawn from the receptacle.

Embodiment 48. The system of any one of embodiments 33 to 47, wherein the puck comprises a plurality of spring-loaded members configured to removably support the receptacle therebetween.

Embodiment 49. A method of delivering a receptacle to an instrument, comprising:
supporting a receptacle containing a fluid on a carrier;
transporting the carrier supporting the receptacle on a conveyor extending adjacent to each of a plurality of instruments;
transferring the receptacle from the carrier to a puck supported on a carriage when the carriage is positioned at a first location;
moving the carriage with the receptacle seated in the puck from the first location to a second location within an instrument of the plurality of instruments; and
drawing at least a portion of the fluid from the receptacle seated in the puck into a tip associated with a fluid extraction device of the instrument when the carriage is positioned at the second location.

Embodiment 50. The method of embodiment 49, further comprising rotating the puck relative to the carriage about a vertical axis of the puck.

Embodiment 51. The method of embodiment 49 or 50, further comprising using a label reader to read information encoded in a machine-readable label on the receptacle seated in the puck when the carriage is positioned at the first location.

Embodiment 52. The method of any one of embodiments 49 to 51, further comprising determining if the receptacle is seated in the puck.

Embodiment 53. The method of embodiment 52, wherein if it is determined that the receptacle is seated in the puck, then further comprising using a sensing system to detect (a) whether a longitudinal axis of the receptacle seated in the puck is inclined with respect to a vertical axis of the puck, and/or (b) whether the receptacle seated in the puck is inserted to a desired depth.

Embodiment 54. The method of embodiment 52 or 53, wherein the puck comprises a first passageway that extends transverse to and is offset from a vertical axis of the puck, and the carriage comprises a second passageway that extends transverse to and is offset from the vertical axis of the puck, and wherein using the sensing system includes rotating the puck to align the first and second passageways.

Embodiment 55. The method of embodiment 54, wherein the sensing system comprises a signal emitter and a signal detector, and wherein when the first and second passageways are aligned, the signal detector is configured to receive a signal from the signal emitter through the aligned first and second passageways when a receptacle is not seated in the puck.

Embodiment 56. The method of embodiment 55, wherein the signal emitter is an optical emitter, the signal detector is an optical detector, and the signal is an optical beam.

Embodiment 57. The method of any one of embodiments 49 to 56, wherein transferring the receptacle from the carrier to the puck is performed with a pick and place device having a plurality of arms for releasably grasping the receptacle.

Embodiment 58. The method of any one of embodiments 49 to 57, wherein moving the carriage comprises operating an electric motor to move the carriage on a rail from the first location to the second location.

Embodiment 59. The method of any one of embodiments 49 to 58, wherein the fluid extraction device is a pipettor.

Embodiment 60. The method of any one of embodiments 49 to 59, further comprising selectively applying a force on the receptacle when the carriage is positioned at the second location, wherein the force is not applied to the receptacle when the carriage is positioned at the first location.

Embodiment 61. The method of any one of embodiments 49 to 60, wherein transferring the receptacle from the carrier to the puck comprises removably supporting the receptacle between a plurality of spring-loaded members of the puck.

Embodiment 62. A receptacle delivery system for an instrument, comprising:
 a carriage configured to move from a first location to a second location;
 a puck coupled to the carriage, wherein the puck is configured to removably support a receptacle therein; and
 a receptacle clamping mechanism, wherein the receptacle clamping mechanism comprises a pair of opposed support pads configured to be (a) in contact with a receptacle seated in the puck when the carriage is positioned at the second location, and (b) separated from the receptacle when the carriage is positioned at the first location.

Embodiment 63. The system of embodiment 62, wherein the pair of support pads are configured to move toward each other as the carriage moves from the first location to the second location and move away from each other as the carriage moves from the second location to the first location.

Embodiment 64. The system of embodiment 62 or 63, further comprising a pair of meshed gears coupled to the pair of support pads, wherein, when the carriage moves from the first location to the second location, the pair of meshed gears rotate in opposite directions relative to each other to move the pair of support pads toward each other.

Embodiment 65. The system of embodiment 64, further comprising a pair of actuator arms, wherein each actuator arm of the pair of actuator arms is coupled at one end to a different support pad of the pair of support pads and coupled at an opposite end to a different gear of the pair of meshed gears.

Embodiment 66. The system of embodiment 64 or 65, further comprising a cam arm, wherein one end of the cam arm is coupled to a gear of the pair of meshed gears and an opposite end of the cam arm is configured to move on a downwardly inclined path when the carriage moves from the first location to the second location.

Embodiment 67. The system of embodiment 66, wherein the opposite end of the cam arm comprises a roller configured to roll on the inclined path when the carriage moves from the first location to the second location.

Embodiment 68. The system of embodiment 64 or 65, further comprising (a) a cam arm having a first end coupled to a first gear of the pair of meshed gears and a second end opposite the first end and (b) a ramp having an inclined surface extending substantially parallel to a path of the carriage from the first location to the second location, wherein when the carriage moves along the path between the first and second locations, the second end of the cam arm moves along the inclined surface to rotate the first gear.

Embodiment 69. The system of embodiment 64 or 65, further comprising a cam arm configured to (a) rotate a first gear of the pair of meshed gears in a first direction and a second gear of the pair of meshed gears in a second direction opposite the first direction when the carriage moves from the first location to the second location, and (b) rotate the first gear in the second direction and the second gear in the first direction when the carriage moves from the second location to the first location.

Embodiment 70. The system of any one of embodiments 62 to 69, wherein each support pad of the pair of support pads comprises a contoured surface, and wherein the support pads face each other.

Embodiment 71. The system of any one of embodiments 62 to 69, wherein each support pad of the pair of support pads comprises a substantially V-shaped groove, and wherein the support pads face each other.

Embodiment 72. The system of any one of embodiments 62 to 71, wherein each support pad of the pair of support pads comprises an elastomer.

Embodiment 73. The system of embodiment 72, wherein the elastomer is selected from the group consisting of silicone, EPDM (ethylene propylene diene monomer), and rubber.

Embodiment 74. The system of any one of embodiments 62 to 73, wherein the receptacle clamping mechanism further comprises one or more springs configured to bias the pair of support pads away from each other when the carriage is positioned at the first location.

Embodiment 75. The system of any one of embodiments 62 to 74, wherein the pair of support pads are configured to apply a clamping force to the receptacle when the carriage is positioned at the second location and not to apply a clamping force to the receptacle when the carriage is positioned at the first location.

Embodiment 76. The system of embodiment 75, wherein the pair of support pads are configured to apply a clamping force of from about 10N to about 30N to the receptacle when the carriage is positioned at the second location.

Embodiment 77. The system of any one of embodiments 62 to 76, further comprising a first electric motor operatively coupled to the carriage and configured to move the carriage between the first location and the second location.

Embodiment 78. The system of any one of embodiments 62 to 77, further comprising a second electric motor operatively coupled to the puck and configured to rotate the puck in the carriage when the carriage is positioned at the first location.

Embodiment 79. The system of embodiment 78, wherein the carriage further comprises a sensor configured to detect when the puck has rotated to a predetermined position in the carriage.

Embodiment 80. The system of embodiment 79, wherein the sensor is a Hall effect sensor.

Embodiment 81. The system of any one of embodiments 62 to 80, further comprising a sensing system configured to detect whether a receptacle is seated in the puck.

Embodiment 82. The system of any one of embodiments 62 to 80, wherein the puck comprises a first passageway that extends transverse to and is offset from a vertical axis of the puck.

Embodiment 83. The system of embodiment 82, further comprising a sensing system configured to detect (a) whether a longitudinal axis of a receptacle seated in the puck is inclined with respect to the vertical axis of the puck, and/or (b) whether a receptacle seated in the puck is inserted to a desired depth in the puck.

Embodiment 84. The system of embodiment 83, wherein the puck is rotatably supported in a housing of the carriage, and wherein the housing comprises a second passageway that extends transverse to and is offset from the vertical axis of the puck.

Embodiment 85. The system of embodiment 84, wherein the sensing system comprises a signal emitter and a signal detector, and wherein when the first and second passageways are aligned, the signal detector is configured to receive a signal from the signal emitter through the aligned first and second passageways when a receptacle is not seated in the puck.

Embodiment 86. The system of embodiment 85, wherein the signal emitter is an optical emitter, the signal detector is an optical detector, and the signal is an optical beam.

Embodiment 87. The system of embodiment 86, wherein when the first and second passageways are aligned, (a) the optical emitter is configured to direct the optical beam on an incident area on an external surface of a receptacle seated in the puck and (b) the optical detector is configured to receive at least a portion of the optical beam from the optical emitter if a receptacle is not seated in the puck, wherein if the receptacle is properly seated in the puck, the incident area is offset from a longitudinal axis of the receptacle.

Embodiment 88. The system of embodiment 87, wherein if a receptacle is properly seated in the puck, the incident area is offset from the longitudinal axis of the receptacle by a distance from about 3 mm to about 6 mm.

Embodiment 89. The system of embodiment 87 or 88, wherein if a receptacle is properly seated in the puck, the incident area is offset from a base of the receptacle by a distance from about 3 mm to about 8 mm.

Embodiment 90. The system of any one of embodiments 85 to 89, wherein the signal emitter and the signal detector are coupled to the carriage.

Embodiment 91. The system of any one of embodiments 62 to 90, further comprising a first shelf attached to the carriage and a second shelf positioned at the second location, wherein when the carriage is positioned at the second location, the first shelf is positioned below the second shelf.

Embodiment 92. The system of embodiment 91, wherein when the carriage is positioned at the second location, a vertical clearance between the first shelf and the second shelf is from about 1 mm to about 6 mm.

Embodiment 93. The system of embodiment 91 or 92, wherein the second shelf defines a first opening, and wherein when the carriage is positioned at the second location, the first opening is aligned with a receptacle seated in the puck, such that a tip associated with a fluid extraction device of the instrument is moveable through the first opening and into the receptacle.

Embodiment 94. The system of embodiment 93, wherein the first opening is an inwardly extending recess defined by a side wall of the second shelf.

Embodiment 95. The system of any one of embodiments 62 to 94, further comprising a label reader configured to read information encoded in a machine-readable label on the receptacle when the carriage is positioned at the first location.

Embodiment 96. The system of any one of embodiments 62 to 95, further comprising a rail, wherein the carriage is configured to move on the rail between the first and second locations.

Embodiment 97. The system of any one of embodiments 62 to 96, further comprising a pick-and-place device configured to transfer a receptacle to the puck from a location outside the instrument.

Embodiment 98. The system of embodiment 97, wherein the pick-and-place device is configured to transfer a receptacle to the puck from a receptacle carrier supported on a receptacle delivery conveyor, wherein the receptacle delivery conveyor is configured to transport the receptacle carrier supporting the receptacle to locations adjacent multiple instruments.

Embodiment 99. The system of any one of embodiments 62 to 98, wherein the puck comprises a plurality of spring-loaded members configured to removably support a receptacle therebetween.

Embodiment 100. A method of delivering a receptacle to an instrument, comprising:
supporting a receptacle in a carriage;
activating an electric motor to move the carriage between a first location and a second location of the instrument while the receptacle is supported by the carriage;
applying a clamping force to the receptacle as the carriage moves from the first location to the second location; and
releasing the clamping force from the receptacle as the carriage moves from the second location to the first location.

Embodiment 101. The method of embodiment 100, wherein applying the clamping force comprises applying a force of from about 10N to about 30N to the receptacle.

Embodiment 102. The method of embodiment 100 or 101, wherein applying the clamping force to the receptacle comprises moving a pair of support pads into contact with the receptacle as the carriage moves from the first location to the second location.

Embodiment 103. The method of any one of embodiments 100 to 102, wherein releasing the clamping force comprises moving the pair of contact pads away from the receptacle as the carriage moves from the second location to the first location.

Embodiment 104. The method of embodiment 102 or 103, wherein applying the clamping force and releasing the clamping force each comprises rotating a pair of meshed gears coupled to the pair of support pads in opposite directions relative to each other as the carriage moves between the first and second locations.

Embodiment 105. The method of embodiment 104, wherein rotating the pair of meshed gears comprises (a) rotating a first gear of the pair of meshed gears in a first direction and a second gear of the pair of meshed gears in a second direction opposite the first direction when the carriage moves from the first location to the second location, and (b) rotating the first gear in the second direction and the second gear in the first direction when the carriage moves from the second location to the first location.

Embodiment 106. The method of embodiment 104 or 105, wherein rotating the pair of meshed gears comprises (a) moving a first end of a cam arm on a downwardly inclined path when the carriage moves from the first location to the second location and (b) moving the first end on an upwardly inclined surface when the carriage moves from the second location to the first location, wherein a second end of the cam arm is coupled to a gear of the pair of meshed gears.

Embodiment 107. The method of any one of embodiments 100 to 106, wherein supporting the receptacle in the carriage comprises removably supporting the receptacle in a rotatable puck positioned in the carriage.

Embodiment 108. The method of embodiment 107, wherein removably supporting the receptacle comprises positioning the receptacle between a plurality of spring-loaded members of the puck, and the method further comprises transferring the receptacle to the puck from a receptacle delivery system using a pick-and-place device.

Embodiment 109. The method of embodiment 107 or 108, wherein the electric motor is a first electric motor, and the method further comprises activating a second electric motor to rotate the puck in the carriage when the carriage is positioned at the first location.

Embodiment 110. The method of embodiment 109, further comprising using a sensor to detect when the puck has rotated to a predetermined position in the carriage.

Embodiment 111. The method of embodiment 109 or 110, further comprising using a label reader to read information encoded in a machine-readable label on the receptacle as the puck is rotating.

Embodiment 112. The method of any one of embodiments 107 to 111, further comprising using a sensing system associated with the carriage to detect (a) whether a longitudinal axis of the receptacle supported by the puck is inclined with respect to a vertical axis of the puck, and/or (b) whether the receptacle supported by the puck is inserted to a desired depth in the puck.

Embodiment 113. The method of embodiment 112, wherein the puck is rotatably supported in a housing of the carriage, and wherein the puck comprises a first passageway that extends transverse to a vertical axis of the puck, and the housing comprises a second passageway that extends transverse to the vertical axis of the puck.

Embodiment 114. The method of embodiment 113, wherein the sensing system comprises a signal emitter and a signal detector, and wherein when the first and second passageways are aligned, the signal detector is configured to receive a signal from the signal emitter through the aligned first and second passageways when a receptacle is not seated in the puck.

Embodiment 115. The method of embodiment 114, wherein the signal emitter is an optical emitter, the signal detector is an optical detector, and the signal is an optical beam.

Embodiment 116. The method of embodiment 115, wherein using the sensing system comprises:
 directing the optical beam from the optical emitter toward the optical detector, wherein the receptacle seated in the puck is at least partially positioned between the optical emitter and the optical detector; and
 determining what portion of the optical beam, if any, is received by the optical detector.

Embodiment 117. The method of embodiment 116, wherein directing the optical beam comprises directing at least a portion of the optical beam on an incident area of an external surface of the receptacle seated in the puck.

Embodiment 118. The method of embodiment 117, wherein when the receptacle is properly seated in the puck, the incident area is offset from the vertical axis of the puck by a distance of from about 3 mm to about 6 mm.

Embodiment 119. The method of embodiment 117 or 118, wherein when the receptacle is properly seated in the puck, the incident area is offset from the base of the receptacle by a distance of from about 3 mm to about 8 mm.

Embodiment 120. The method of any one of embodiments 100 to 119, wherein activating the electric motor comprises positioning the carriage at the second location such that a first shelf attached to the carriage is positioned below a second shelf coupled to the instrument and positioned at the second location.

Embodiment 121. The method of embodiment 120, wherein the second shelf is removably coupled to the instrument at the second location.

Embodiment 122. The method of embodiment 120 or 121, wherein when the carriage is positioned at the second location, the first shelf is vertically spaced apart from the second shelf by a distance from about 1 mm to about 6 mm.

Embodiment 123. The method of any one of embodiments 120 to 122, wherein positioning the carriage at the second location comprises positioning the carriage such that a first opening formed in the second shelf is positioned above, and aligned with, the receptacle, and the method further comprises directing a tip associated with a fluid extraction device of the instrument through the first opening and into the receptacle, thereby contacting a fluid contained in the receptacle.

Embodiment 124. The method of embodiment 123, further comprising aspirating an aliquot of the fluid into the tip.

Embodiment 125. The method of embodiment 124, further comprising, after aspirating the aliquot of the fluid into the tip, removing the tip from the receptacle to a position above the first opening.

Embodiment 126. The method of any one of embodiments 123 to 125, wherein the receptacle comprises a pierceable cap that covers an opening of the receptacle, and wherein (i) directing the tip into the receptacle comprises piercing the cap with the tip, and (ii) removing the tip from the receptacle comprises moving the tip through the pierced cap.

Embodiment 127. The method of embodiment 125 or 126, further comprising, after removing the tip from the receptacle, moving the tip to a position above a top surface of the second shelf.

Embodiment 128. The method of embodiment 127, further comprising, after moving the tip to the position above the top surface of the second shelf, lowering the tip to a distance of from about 1 mm to about 5 mm from the top surface of the shelf.

Embodiment 129. The method of embodiment 127 or 128, further comprising, after moving the tip to the position above the top surface of the second shelf, moving the tip to trace a predefined path along the surface of the second shelf after the lowering.

Embodiment 130. The method of embodiment 129, wherein moving the tip to trace the predefined path comprises moving the tip around an upwardly extending projection on the top surface of the second shelf.

Embodiment 131. The method of embodiment 129 or 130, further comprising, after moving the tip to trace the predefined path, removing the tip from above the top surface of the second shelf through a second opening formed in a sidewall of the second shelf.

Embodiment 132. The method of embodiment 131, wherein removing the tip from above the top surface of the second shelf comprises moving the tip through the second opening without changing a vertical position of the tip above the surface.

Embodiment 133. The method of any one of embodiments 129 to 132, wherein a portion of the fluid is suspended from the tip when removing the tip from the receptacle, and wherein at least a portion of the fluid suspended from the tip is deposited onto the top surface of the second shelf while moving the tip to trace the path.

Embodiment 134. The method of embodiment 133, wherein, after moving the tip to the position above the top surface of the second shelf, a portion of the fluid suspended from the tip when removing the tip from the receptacle is suspended from the second shelf beneath the first opening.

Embodiment 135. The method of any one of embodiments 131 to 134, wherein activating the electric motor further comprises moving the carriage from the second location to the first location after moving the tip to trace the predefined path, thereby cleaving at least a portion of the fluid suspended from the second shelf and depositing the cleaved fluid on a top surface of the first shelf.

Embodiment 136. The method of any one of embodiments 133 to 135, further comprising decoupling the second shelf from the instrument.

Embodiment 137. The method of embodiment 136, further comprising removing at least a portion of the fluid deposited on the top surface of the second shelf after decoupling the second shelf from the instrument.

Embodiment 138. The method of embodiment 137, further comprising coupling the second shelf to the instrument after removing at least a portion of the fluid deposited on the top surface of the second shelf.

Embodiment 139. The method of any one of embodiments 135 to 138, further comprising removing at least a portion of the fluid deposited on the top surface of the first shelf after moving the carriage from the second location to the first location.

Embodiment 140. A receptacle delivery system for an instrument, comprising:
- a carriage;
- a puck rotatably supported by the carriage, wherein the puck comprises a plurality of spring-loaded fingers arranged around a vertical axis and configured to removably support a receptacle therebetween;
- a first electric motor configured to move the carriage between a first location and a second location of the instrument; and
- a second electric motor configured to rotate the puck about the vertical axis.

Embodiment 141. The system of embodiment 140, wherein an O-ring biases the plurality of fingers toward the vertical axis of the puck.

Embodiment 142. The system of embodiment 141, wherein the O-ring is comprised of an elastomer.

Embodiment 143. The system of embodiment 142, wherein the elastomer is selected from the group consisting of silicone, EPDM (ethylene propylene diene monomer), and rubber.

Embodiment 144. The system of any one of embodiments 140 to 143, wherein each finger of the plurality of fingers comprises a top portion that is configured to contact the receptacle and a base portion that extends substantially transverse to the top portion, wherein the base portion of each finger is rotatably coupled to a supporting disc of the puck at a pivot point.

Embodiment 145. The system of embodiment 144, wherein the base portion of each finger of the plurality of fingers is configured to rotate about the associated pivot point.

Embodiment 146. The system of embodiment 144 or 145, wherein the top portion of each finger of the plurality of fingers comprises an inclined surface, and wherein the inclined surfaces of the plurality of fingers are arranged in a funnel-like configuration with respect to the vertical axis.

Embodiment 147. The system of any one of embodiments 140 to 146, wherein the plurality of fingers comprises four equally spaced-apart fingers.

Embodiment 148. The system of any one of embodiments 140 to 147, wherein each of the plurality of fingers comprises anodized aluminum at least partially coated with PTFE (polytetrafluoroethylene).

Embodiment 149. The system of any one of embodiments 140 to 148, further comprising a sensor configured to detect when the puck has rotated to a predetermined position in the carriage.

Embodiment 150. The system of embodiment 149, wherein the sensor is a Hall effect sensor.

Embodiment 151. The system of any one of embodiments 140 to 150, further comprising a sensing system configured to detect whether a receptacle is seated in the puck.

Embodiment 152. The system of any one of embodiments 140 to 150, wherein the puck comprises a first passageway that extends transverse to and is offset from the vertical axis of the puck.

Embodiment 153. The system of embodiment 152, further comprising a sensing system configured to detect (a) whether a longitudinal axis of a receptacle seated in the puck is inclined with respect to the vertical axis of the puck, and/or (b) whether a receptacle seated in the puck is insert to a desired depth in the puck.

Embodiment 154. The system of embodiment 153, wherein the puck is rotatably supported in a housing of the carriage, and wherein the housing comprises a second passageway that extends transverse to and is offset from the vertical axis of the puck.

Embodiment 155. The system of embodiment 154, wherein the sensing system comprises a signal emitter and a signal detector, and wherein when the first and second passageways are aligned, the signal detector is configured to receive a signal from the signal emitter through the aligned first and second passageways when a receptacle is not seated in the puck.

Embodiment 156. The system of embodiment 155, wherein the signal emitter is an optical emitter, the signal detector is an optical detector, and the signal is an optical beam.

Embodiment 157. The system of embodiment 156, wherein when the first and second passageways are aligned, (a) the optical emitter is configured to direct the optical beam on an incident area on an external surface of a receptacle seated in the puck and (b) the optical detector is configured to receive at least a portion of the optical beam from the optical emitter if a receptacle is not seated in the puck, wherein if the receptacle is properly seated in the puck, the incident area is offset from a longitudinal axis of the receptacle.

Embodiment 158. The system of embodiment 157, wherein, when a receptacle is properly seated in the puck, the incident area is offset from the vertical axis of the puck by a distance from about 3 mm to about 6 mm.

Embodiment 159. The system of embodiment 157 or 158, wherein, when a receptacle is properly seated in the puck, the incident area is offset from a base of the receptacle by a distance from about 3 mm to about 8 mm.

Embodiment 160. The system of any one of embodiments 155 to 159, wherein the signal emitter and the signal detector are coupled to the carriage.

Embodiment 161. A receptacle delivery system for an instrument, comprising:
- a carriage configured to move on a rail from a first location to a second location of the instrument, the carriage comprising:
  - a bracket having opposed first and second sidewalls and a base extending between the first and second sidewalls, wherein the carriage is configured to support a receptacle;
- a pair of opposed support pads, wherein the pair of support pads are configured to (a) move toward a receptacle supported by the carriage as the carriage moves from the first location toward the second location, and (b) move away from a receptacle supported by the carriage as the carriage moves from the second location toward the first location; and a pair of meshed cam gears rotatably coupled to the first sidewall, wherein each cam gear of the pair of meshed cam gears is coupled to a different support pad of the pair of support pads.

Embodiment 162. The system of embodiment 161, wherein the bracket is substantially U-shaped.

Embodiment 163. The system of embodiment 161 or 162, wherein the second sidewall of the bracket comprises an elongated slot aligned with a receptacle supported by the carriage, and wherein the carriage comprises a label reader configured to read information encoded in a machine-readable label on the receptacle through the elongated slot when the carriage is positioned at the first location.

Embodiment 164. The system of any one of embodiments 161 to 163, wherein the carriage further comprises a rotatable puck comprising a plurality of spring-loaded fingers configured to support the receptacle therebetween, and wherein the puck is coupled to the bracket below the base such that the plurality of fingers extend into a space between the first and second sidewalls of the bracket through an opening in the base.

Embodiment 165. The system of embodiment 164, further comprising a first electric motor operatively coupled to the puck and configured to rotate the puck in the carriage when the carriage is positioned at the first location.

Embodiment 166. The system of embodiment 165, wherein the carriage further comprises a sensor configured to detect when the puck has rotated to a predetermined position in the carriage.

Embodiment 167. The system of embodiment 166, wherein the sensor is a Hall effect sensor.

Embodiment 168. The system of any one of embodiment 161 to 167, wherein the carriage further comprises a pair of actuator arms, wherein each actuator arm of the pair of actuator arms is coupled at one end to a different support pad of the pair of support pads and coupled at an opposite end to a different gear of the pair of meshed gears.

Embodiment 169. The system of any one of embodiments 161 to 168, further comprising (a) a cam arm having a first end and a second end, and (b) a ramp having an inclined surface extending substantially parallel to the rail, wherein the first end of the cam arm is coupled to a gear of the pair of meshed gears and the second end of the cam arm is configured to move on the inclined surface of the ramp as the carriage moves between the first and second locations.

Embodiment 170. The system of embodiment 169, wherein the second end of the cam arm includes a roller configured to roll on the inclined surface when the carriage moves between the first and second locations.

Embodiment 171. The system of embodiment 169 or 170, wherein the cam arm is configured to (a) rotate a first gear of the pair of meshed gears in a first direction and a second gear of the pair of meshed gears in a second direction opposite the first direction when the carriage moves from the first location to the second location, and (b) rotate the first gear in the second direction and the second gear in the first direction when the carriage moves from the second location to the first location.

Embodiment 172. The system of any one of embodiments 161 to 171, wherein each support pad of the pair of support pads comprises a contoured surface.

Embodiment 173. The system of any one of embodiments 161 to 172, wherein each support pad of the pair of support pads comprises a substantially V-shaped groove.

Embodiment 174. The system of any one of embodiments 161 to 173, wherein each support pad of the pair of support pads comprises an elastomer.

Embodiment 175. The system of embodiment 174, wherein the elastomer is selected form the group consisting of silicone, EPDM (ethylene propylene diene monomer), and rubber.

Embodiment 176. The system of any one of embodiments 161 to 174, further comprising one or more springs configured to bias the pair of support pads away from each other when the carriage is positioned at the first location.

Embodiment 177. The system of any one of embodiments 161 to 176, wherein the pair of support pads are configured to apply a clamping force of from about 10N to about 30N to a receptacle supported by the carriage when the carriage is positioned at the second location.

Embodiment 178. The system of any one of embodiments 161 to 177, further comprising a second electric motor operatively coupled to the carriage and configured to move the carriage between the first and second locations.

Embodiment 179. The system of any one of embodiments 164 to 178, wherein the carriage further comprises a sensing system configured to detect whether a receptacle is seated in the puck.

Embodiment 180. The system of any one of embodiments 164 to 179, wherein the puck includes a first passageway that extends transverse to and is offset from a vertical axis of the puck.

Embodiment 181. The system of embodiment 180, further comprising a sensing system configured to detect (a) whether a longitudinal axis of a receptacle seated in the puck is inclined with respect to the vertical axis of the puck, and/or (b) whether a receptacle seated in the puck is inserted to a desired depth in the puck.

Embodiment 182. The system of embodiment 181, wherein the puck is rotatably supported in a housing of the carriage, and wherein the housing includes a second passageway that extends transverse to and is offset from the vertical axis of the puck.

Embodiment 183. The system of embodiment 182, wherein the sensing system comprises a signal emitter and a signal detector, and wherein when the first and second passageways are aligned, the signal detector is configured to receive a signal from the signal emitter through the aligned first and second passageways when a receptacle is not seated in the puck.

Embodiment 184. The system of embodiment 183, wherein the signal emitter is an optical emitter, the signal detector is an optical detector, and the signal is an optical beam.

Embodiment 185. The system of embodiment 184, wherein when the first and second passageways are aligned, (a) the optical emitter is configured to direct the optical beam on an incident area on an external surface of a receptacle seated in the puck and (b) the optical detector is configured to receive at least a portion of the optical beam from the optical emitter if a receptacle is not seated in the puck, wherein if the receptacle is properly seated in the puck, the incident area is offset from a longitudinal axis of the receptacle.

Embodiment 186. The system of embodiment 185, wherein if a receptacle is properly seated in the puck, the incident area is offset from the longitudinal axis of the receptacle by a distance of from about 3 mm to about 6 mm.

Embodiment 187. The system of embodiment 185 or 186, wherein if a receptacle is properly seated in the puck, the incident area is offset from a base of the receptacle by a distance of from about 3 mm to about 8 mm.

Embodiment 188. The system of any one of embodiments 183 to 187, wherein the signal emitter and the signal detector are coupled to the carriage.

Embodiment 189. The system of any one of embodiments 161 to 188, further comprising a first shelf attached to the carriage and a second shelf positioned at the second location, wherein when the carriage is positioned at the second location, the first shelf is positioned below the second shelf.

Embodiment 190. The system of embodiment 189, wherein when the carriage is positioned at the second location, a vertical clearance between the first shelf and the second shelf is from about 1 mm to about 6 mm.

Embodiment 191. The system of embodiment 189 or 190, wherein the second shelf defines an first opening, and wherein when the carriage is positioned at the second location, the first opening is aligned with a receptacle supported by the carriage, such that a tip associated with a fluid extraction device of the instrument is moveable through the first opening and into the receptacle.

Embodiment 192. A receptacle delivery system for an instrument, comprising:
  a carriage configured to move from a first location of the instrument to a second location of the instrument;
  a puck supported by the carriage, wherein the puck is configured to removably support a receptacle such that a longitudinal axis of the receptacle is substantially coincident with a vertical axis of the puck; and
  a first shelf positioned at the second location of the instrument, wherein the shelf comprises (a) a base extending substantially transverse to the vertical axis of the puck and (b) a first opening defined by the base, and wherein when the carriage is positioned at the second location, the longitudinal axis of a receptacle seated in the puck extends through the first opening.

Embodiment 193. The system of embodiment 192, wherein the shelf is removably coupled to a housing of the instrument.

Embodiment 194. The system of embodiment 193, wherein shelf is removably coupled to the housing of the instrument using one or more magnets.

Embodiment 195. The system of embodiment 194, wherein the one or more magnets comprises a pair of corresponding magnets, and wherein the shelf comprises a first projection extending upward from the base, and the housing of the instrument comprises a second projection, the first projection containing a first magnet of the pair of magnets and the second projection containing a second magnet of the pair of magnets.

Embodiment 196. The system of any one of embodiments 192 to 195, wherein a top surface of the base comprises a passageway defined by an interior projection extending upward from the top surface the base and a sidewall circumscribing the base.

Embodiment 197. The system of embodiment 196, wherein the sidewall comprises a second opening, the second opening being sized to permit the lateral passage of a distal end of a pipette tip.

Embodiment 198. The system of any one of embodiments 193 to 197, wherein the shelf and the housing include mated registration elements configured to correctly align the shelf on the instrument.

Embodiment 199. The system of embodiment 198, wherein the mated registration elements include a third opening on the shelf and third projection coupled to the housing, and wherein the third projection extends through the third opening when the second shelf is coupled to the housing.

Embodiment 200. The system of embodiment 199, wherein a shape of an outer surface of the third projection generally conforms to a shape of the third opening.

Embodiment 201. The system of embodiment 199 or 200, wherein the third projection of the housing comprises a first recess located at an end of the third projection, and the shelf comprises a fourth projection positioned proximate the third opening, and wherein when the second shelf is coupled to the housing, the fourth projection is positioned in the first recess.

Embodiment 202. The system of any one of embodiments 192 to 201, wherein the surface of the shelf comprises a recessed thumb grip.

Embodiment 203. The system of any one of embodiments 192 to 202, wherein the carriage comprises a second shelf coupled to a top surface of the carriage.

Embodiment 204. The system of embodiment 203, wherein the second shelf comprises a recessed region configured to contain a fluid.

Embodiment 205. The system of embodiment 203 or 204, wherein the second shelf is removably coupled to the top surface of the carriage.

Embodiment 206. The system of any one of embodiments 203 to 205, wherein when the carriage is positioned at the second location, a vertical clearance between the first shelf and the second shelf is from about 1 mm to about 6 mm.

Embodiment 207. A receptacle clamping mechanism of an instrument, comprising:
  a carriage configured to move between a first location and a second location of the instrument, wherein the carriage comprises (a) one or more support members configured to removably support a receptacle therebetween, and (b) a pair of opposed support pads configured to apply a clamping force to a receptacle supported by the carriage as the carriage moves from the first location to the second location and release the clamping force from the receptacle as the carriage moves from the second location to the first location; and
  a sensing system configured to determine whether a receptacle is supported by the carriage.

Embodiment 208. The mechanism of embodiment 207, wherein the sensing system is configured to determine (a) whether a longitudinal axis of a receptacle supported by the carriage is inclined with respect to a vertical axis, and/or (b) whether a receptacle supported by the carriage is inserted to a desired depth.

Embodiment 209. The mechanism of embodiment 207 or 208, wherein the sensing system comprises a signal emitter and a signal detector positioned at two ends of a linear axis, and wherein when a receptacle is properly supported by the carriage, the linear axis (a) passes through a sidewall of the receptacle and (b) is offset from the longitudinal axis of the receptacle.

Embodiment 210. The mechanism of embodiment 209, wherein the signal emitter is an optical emitter and the signal detector is an optical detector.

Embodiment 211. The mechanism of embodiment 210, wherein (a) the optical emitter configured to direct an optical beam on an incident area on an external surface of a receptacle supported by the carriage and (b) the optical detector configured to receive at least a portion of the optical beam from the optical emitter if a receptacle is not supported by the carriage, wherein when a receptacle is properly supported by the carriage, the incident area is offset from a longitudinal axis of the receptacle.

Embodiment 212. The mechanism of embodiment 211, wherein when a receptacle is properly supported by the carriage, the incident area is offset from a longitudinal axis of the receptacle by a distance of from about 3 mm to about 6 mm.

Embodiment 213. The mechanism of embodiment 211 or 212, wherein when a receptacle is properly supported by the carriage, the incident area is offset from a base of the receptacle by a distance of from about 3 mm to about 8 mm.

Embodiment 214. The mechanism of any one of embodiments 209 to 213, wherein the signal emitter and the signal detector are coupled to the carriage.

Embodiment 215. The mechanism of any one of embodiments 207 to 214, wherein the pair of support pads are configured to be (a) in contact with a receptacle supported by the one or more support members when the carriage is positioned at the second location, and (b) separated from the receptacle when the carriage is positioned at the first location.

Embodiment 216. The mechanism of any one of embodiments 207 to 215, wherein the pair of support pads are configured to move toward each other as the carriage moves from the first location to the second location and move away from each other as the carriage moves from the second location to the first location.

Embodiment 217. The mechanism of any one of embodiments 207 to 216, further comprising a pair of meshed gears coupled to the pair of support pads, wherein when the carriage moves from the first location to the second location, the pair of meshed gears rotate in opposite directions relative to each other to move the pair of support pads toward each other.

Embodiment 218. The mechanism of embodiment 217, further comprising a pair of actuator arms, wherein each actuator arm of the pair of actuator arms is coupled at one end to a different support pad of the pair of support pads and coupled at an opposite end to a different gear of the pair of meshed gears.

Embodiment 219. The mechanism of embodiment 217 or 218, further comprising a cam arm, wherein one end of the cam arm is coupled to a gear of the pair of meshed gears and an opposite end of the cam arm is configured to move on a downwardly inclined path when the carriage moves from the first location to the second location.

Embodiment 220. The mechanism of embodiment 219, wherein the opposite end of the cam arm comprises a roller configured to roll on the inclined path when the carriage moves from the first location to the second location.

Embodiment 221. The mechanism of embodiment 219 or 220, wherein the cam arm is configured to (a) rotate a first gear of the pair of meshed gears in a first direction and a second gear of the pair of meshed gears in a second direction opposite the first direction when the carriage moves from the first location to the second location, and (b) rotate the first gear in the second direction and the second gear in the first direction when the carriage moves from the second location to the first location.

Embodiment 222. The mechanism of any one of embodiments 207 to 221, wherein each support pad of the pair of support pads comprises a contoured surface or a V-shaped groove.

Embodiment 223. The mechanism of any one of embodiments 207 to 222, wherein each support pad of the pair of support pads comprises an elastomer.

Embodiment 224. The mechanism of embodiment 223, wherein the elastomer is selected from the group consisting of silicon, EPDM (ethylene propylene diene monomer), and rubber.

Embodiment 225. The mechanism of any one of embodiments 207 to 224, further comprising one or more springs configured to bias the pair of support pads away from each other when the carriage is positioned at the first location.

Embodiment 226. The mechanism of any one of embodiments 207 to 225, wherein the pair of support pads are configured to apply a clamping force of from about 10N to about 30N to a receptacle supported by the one or more support members when the carriage is positioned at the second location.

Embodiment 227. A method of delivering a receptacle to an instrument, comprising:
supporting a receptacle in a carriage when the carriage is positioned at a first location of the instrument;
activating a sensing system coupled to the carriage to confirm that the receptacle is supported by the carriage;
moving the carriage, and the receptacle supported therein, to a second location of the instrument;
applying a clamping force to the receptacle as the carriage moves from the first location to the second location;
at the second location, extracting at least a portion of a fluid contained in the receptacle using a fluid extraction device of the instrument;
moving the carriage, and the receptacle supported therein, from the second location to the first location; and
releasing the clamping force from the receptacle as the carriage moves from the second location to the first location.

Embodiment 228. The method of embodiment 227, further comprising using the sensing system to determine (a) whether a longitudinal axis of the receptacle supported by the carriage is inclined with respect to a vertical axis, and/or (b) whether the receptacle supported by the carriage is inserted to a predetermined depth.

Embodiment 229. The method of embodiment 227 or 228, wherein applying the clamping force comprises applying a force of from about 10N to about 30N to the receptacle.

Embodiment 230. The method of any one of embodiments 227 to 229, wherein applying the clamping force to the receptacle comprises moving a pair of opposed support pads into contact with the receptacle as the carriage moves from the first location to the second location.

Embodiment 231. The method of embodiment 230, wherein releasing the clamping force comprises moving the pair of support pads away from the receptacle as the carriage moves from the second location to the first location.

Embodiment 232. The method of embodiment 230 or 231, wherein applying the clamping force and releasing the clamping force each comprise rotating a pair of meshed gears coupled to the pair of support pads in opposite directions relative to each other as the carriage moves between the first and second locations.

Embodiment 233. The method of embodiment 232, wherein rotating the pair of meshed gears comprises (a) rotating a first gear of the pair of meshed gears in a first direction and a second gear of the pair of meshed gears in a second direction opposite the first direction when the carriage moves from the first location to the second location, and (b) rotating the first gear in the second direction and the second gear in the first direction when the carriage moves from the second location to the first location.

Embodiment 234. The method of embodiment 232 or 233, wherein rotating the pair of meshed gears comprises (a)

moving a first end of a cam arm on a downwardly inclined path when the carriage moves from the first location to the second location and (b) moving the first end of the cam arm on an upwardly inclined surface when the carriage moves from the second location to the first location, and wherein a second end of the cam arm is coupled to a gear of the pair of meshed gears.

Embodiment 235. The method of any one of embodiments 227 to 234, wherein supporting the receptacle in the carriage comprises removably supporting the receptacle in a rotatable puck positioned in the carriage.

Embodiment 236. The method of embodiment 235, wherein removably supporting the receptacle comprises positioning the receptacle between a plurality of spring-loaded members of the puck, and wherein the method further comprises transferring the receptacle to the puck from a conveyor located outside of the instrument using a pick-and-place device.

Embodiment 237. The method of embodiment 235 or 236, further comprising rotating the puck in the carriage when the carriage is positioned at the first location.

Embodiment 238. The method of embodiment 237, further comprising using a sensor to detect when the puck has rotated to a predetermined position in the carriage.

Embodiment 239. The method of embodiment 237 or 238, further comprising using a label reader to read information encoded in a machine-readable label on the receptacle as the puck is rotating.

Embodiment 240. The method of any one of embodiments 227 to 239, wherein activating the sensing system comprises:
directing a signal from a signal emitter toward a signal detector, wherein the receptacle supported by the carriage is positioned between the signal emitter and the signal detector; and determining what portion of the signal, if any, is received by the signal detector.

Embodiment 241. The method of embodiment 240, wherein directing the signal comprises directing at least a portion of the signal on an incident area of an external surface of the receptacle supported by the carriage.

Embodiment 242. The method of embodiment 240 or 241, wherein the signal emitter is an optical emitter, the signal detector is an optical detector, and the signal is an optical beam.

Embodiment 243. The method of embodiment 241 or 242, wherein when the receptacle is properly supported by the carriage, the incident area is offset from a longitudinal axis of the receptacle by a distance of from about 3 mm to about 6 mm.

Embodiment 244. The method of any one of embodiments 241 to 243, wherein when the receptacle is properly supported by the carriage, the incident area is offset from the base of the receptacle by a distance of from about 3 mm to about 8 mm.

Embodiment 245. The method of any one of embodiments 227 to 244, wherein moving the carriage, and the receptacle supported therein, to the second location comprises positioning the carriage at the second location such that (a) at least a portion of the carriage is positioned below a second shelf of the instrument positioned at the second location and (b) the receptacle is positioned below a first opening defined by the second shelf.

Embodiment 246. The method of any one of embodiments 227 to 244, wherein moving the carriage, and the receptacle supported therein, to the second location comprises positioning the carriage at the second location such that (a) a first shelf coupled to the carriage is positioned below a second shelf removably coupled to the instrument at the second location and (b) the receptacle is aligned with a first opening defined by the second shelf.

Embodiment 247. The method of embodiment 246, wherein when the carriage is positioned at the second location, the first shelf is vertically spaced apart from the second shelf by a distance of from about 1 mm to about 6 mm.

Embodiment 248. The method of any one of embodiments 245 to 247, wherein extracting at least a portion of the fluid from the receptacle comprises directing a tip associated with the fluid extraction device through the first opening and into the receptacle to contact the fluid contained in the receptacle.

Embodiment 249. The method of embodiment 248, wherein extracting at least a portion of the fluid from the receptacle comprises drawing at least a portion of the fluid into the tip.

Embodiment 250. The method of embodiment 249, further comprising, after drawing at least a portion of the fluid into the tip, removing the tip from the receptacle to a position above the first opening.

Embodiment 251. The method of any one of embodiments 248 to 250, wherein the receptacle comprises a pierceable cap that covers an opening of the receptacle, and wherein (i) directing the tip into the receptacle comprises piercing the cap with the tip, and (ii) removing the tip from the receptacle comprises moving the tip through the pierced cap.

Embodiment 252. The method of embodiment 250 or 251, further comprising, after removing the tip from the receptacle, laterally moving the tip to a position above the second shelf.

Embodiment 253. The method of embodiment 252, further comprising, after laterally moving the tip to the position above the second shelf, lowering the tip to a distance of from about 1 mm to about 5 mm above a top surface of the second shelf.

Embodiment 254. The method of embodiment 252 or 253, further comprising, after laterally moving the tip to a position above the second shelf, moving the tip along a pre-defined path above the top surface of the second shelf.

Embodiment 255. The method of embodiment 254, wherein moving the tip along the predefined path comprises moving the tip around a projection extending upward from the top surface of the second shelf.

Embodiment 256. The method of embodiment 254 or 255, further comprising, after moving the tip along the predefined path, removing the tip from above the top surface of the second shelf through a second opening formed in a sidewall of the second shelf.

Embodiment 257. The method of any one of embodiments 254 to 256, wherein a portion of the fluid extracted from the receptacle is suspended from the tip prior to moving the tip along the predefined path, and wherein at least a portion of the fluid suspended from the tip is deposited on the top surface of the second shelf while moving the tip along the predefined path.

Embodiment 258. The method of embodiment 257, wherein at least a portion of the fluid suspended from the tip prior to moving the tip along the predefined path is suspended from the second shelf beneath the first opening after moving the tip along the predefined path.

Embodiment 259. The method of embodiment 258, wherein moving the carriage, and the receptacle supported therein, from the second location to the first location comprises cleaving at least a portion of the fluid suspended from the second shelf directly beneath the first opening and depositing the cleaved fluid onto a top surface of a first shelf supported by the carriage as the carriage moves from the second location to the first location.

Embodiment 260. The method of any one of embodiments 257 to 259, further comprising decoupling the second shelf from the instrument.

Embodiment 261. The method of embodiment 260, further comprising removing at least a portion of the fluid deposited on the top surface of the second shelf after decoupling the second shelf from the instrument.

Embodiment 262. The method of embodiment 261, further comprising coupling the second shelf to the instrument after removing at least a portion of the fluid deposited on the top surface of the second shelf.

Embodiment 263. The method of any one of embodiments 259 to 262, further comprising removing at least a portion of the fluid deposited on the first shelf after moving the carriage to the first location.

Embodiment 264. The method of any one of embodiments 227 to 263, further comprising removing the receptacle from the carriage using a pick-and-place device after releasing the clamping force from the receptacle.

Embodiment 265. A method of delivering a receptacle to an instrument, comprising:
 positioning a carriage at a first location of the instrument, wherein the carriage comprises a rotatable puck and is configured to move from the first location to a second location of the instrument, and wherein the puck is configured to seat a receptacle therein;
 rotating the puck in the carriage about a vertical axis to position the puck in a desired rotational position;
 determining whether a receptacle is seated in the puck using a first sensor;
 if it is determined that a receptacle is not seated in the puck, calibrating a sensing system, the sensing system being configured to determine whether a receptacle is seated in the puck;
 after calibrating the sensing system, seating a receptacle in the puck;
 after seating the receptacle in the puck, using the sensing system to determine whether the receptacle is properly seated in the puck; and
 after determining that the receptacle is properly seated in the puck, moving the carriage from the first location to the second location.

Embodiment 266. The method of embodiment 265, wherein determining whether the receptacle is properly seated in the puck comprises determining (a) whether a longitudinal axis of the receptacle seated in the puck is inclined with respect to the vertical axis, and/or (b) whether the receptacle seated in the puck is inserted to a desired depth.

Embodiment 267. The method of embodiment 265 or 266, wherein the puck comprises a first passageway that extends transverse to and is offset from the vertical axis of the puck, wherein the carriage comprises a second passageway that extends transverse to and is offset from the vertical axis of the puck, and wherein calibrating the sensor assembly includes rotating the puck to align the first and second passageways.

Embodiment 268. The method of embodiment 267, wherein the sensing system comprises a signal emitter and a signal detector, and wherein when the first and second passageways are aligned, the signal detector is configured to receive a signal from the signal emitter through the aligned first and second passageways.

Embodiment 269. The method of embodiment 268, wherein the signal emitter is an optical emitter, and the signal detector is an optical detector, and the method further comprises performing luminance calibration of an optical beam from the optical emitter after aligning the first and second passageways.

Embodiment 270. The method of any one of embodiments 265 to 269, wherein the first sensor is a label reader of the instrument, and wherein determining whether a receptacle is seated in the puck comprises using the label reader to detect a label on the carriage, the label being positioned at a location that is not in a line of sight of the label reader if a receptacle is seated in the puck.

Embodiment 271. The method of any one of embodiments 265 to 270, wherein rotating the puck to position the puck in a desired rotational position comprises stopping rotation of puck when a Hall effect sensor indicates that the puck is at the desired rotational position.

Embodiment 272. The method of any one of embodiments 265 to 271, wherein moving the carriage from the first location to the second location comprises positioning the carriage at the second location such that a first shelf attached to the carriage is positioned below a second shelf positioned at the second location.

Embodiment 273. The method of embodiment 272, wherein positioning the carriage at the second location comprises positioning the carriage at the second location such that the first shelf is vertically spaced apart from the second shelf by a distance of from about 1 mm to about 6 mm.

Embodiment 274. The method of embodiment 272 or 273, wherein positioning the carriage at the second location comprises positioning the carriage such that the receptacle seated in the puck is positioned below and aligned with a first opening defined by the second shelf.

Embodiment 275. The method of embodiment 274, further comprising directing a tip associated with a fluid extraction device of the instrument through the first opening and into the receptacle to contact a fluid contained in the receptacle.

Embodiment 276. The method of embodiment 275, further comprising drawing at least a portion of the fluid into the tip.

Embodiment 277. The method of embodiment 276, further comprising, after drawing at least a portion of the fluid into the tip, removing the tip from the receptacle to a position above the first opening.

Embodiment 278. The method of embodiment 277, wherein the receptacle comprises a pierceable cap that covers an opening of the receptacle, and wherein (i) directing the tip into the receptacle comprises piercing the cap with the tip, and (ii) removing the tip from the receptacle comprises moving the tip through the pierced cap.

Embodiment 279. The method of embodiment 277 or 278, further comprising, after removing the tip from the receptacle, laterally moving the tip to a position above the second shelf.

Embodiment 280. The method of embodiment 279, further comprising, after laterally moving the tip to the position above the second shelf, lowering the tip to a distance of from about 1 mm to about 5 mm above a top surface of the shelf.

Embodiment 281. The method of embodiment 279 or 280, further comprising, after laterally moving the tip to a position above the second shelf, moving the tip along a predefined above the top surface of the second shelf.

Embodiment 282. The method of embodiment 281, wherein moving the tip along the predefined path comprises moving the tip around a projection extending upward from the top surface of the second shelf.

Embodiment 283. The method of embodiment 281 or 282, further comprising, after moving the tip along the predefined path, removing the tip from above the top surface of the second shelf through a second opening formed in a sidewall of the second shelf.

Embodiment 284. The method of any one of embodiments 281 to 283, wherein a portion of the fluid drawn from the receptacle is suspended from the tip prior to moving along the predefined path, and wherein at least a portion of the fluid suspended from the tip is deposited on the top surface of the second shelf while moving the tip along the predefined path.

Embodiment 285. The method of embodiment 284, wherein at least a portion of the fluid suspended from the tip prior to moving the tip along the predefined path is suspended from the second shelf directly beneath the first opening after moving the tip along the predefined path.

Embodiment 286. The method of embodiment 285, further comprising moving the carriage from the second location to the first location after moving the tip along the predefined path.

Embodiment 287. The method of embodiment 286, wherein moving the carriage from the second location to the first location comprises cleaving at least a portion of the fluid suspended from the second shelf beneath the first opening and depositing the cleaved fluid onto a top surface of the first shelf as the carriage moves from the second location to the first location.

Embodiment 288. The method of any one of embodiments 284 to 287, further comprising decoupling the second shelf from the instrument.

Embodiment 289. The method of embodiment 288, further comprising removing at least a portion of the fluid deposited on the top surface of the second shelf after decoupling the second shelf from the instrument.

Embodiment 290. The method of embodiment 289, further comprising coupling the second shelf to the instrument after removing at least a portion of the fluid deposited on the top surface of the second shelf.

Embodiment 291. The method of any one of embodiments 287 to 290, further comprising removing at least a portion of the fluid deposited on the top surface of the first shelf after moving the carriage to the first location.

Embodiment 292. A method for providing a fluid to an instrument located adjacent a conveyor for transporting receptacles between a plurality of modules, the method comprising the steps of:
(a) supporting a sample receptacle in an upright orientation on a first carrier;
(b) transporting the first carrier on a conveyor extending adjacent to each of a plurality of modules, at least one of the modules being an analytical instrument;
(c) stopping the first carrier at a position adjacent the analytical instrument;
(d) after step (c), and while the first carrier remains on the conveyor, removing the sample receptacle from the first carrier and transporting the sample receptacle to a pick-up position of the analytical instrument;
(e) transporting the sample receptacle from the pick-up position to a pipetting station located within the analytical instrument;
(f) at the pipetting station, aspirating a fluid contained within the sample receptacle and transferring the aspirated fluid to a reaction receptacle supported by the analytical instrument;
(g) after aspirating the fluid from the sample receptacle, transporting the sample receptacle from the pipetting station to the pick-up position;
(h) removing the sample receptacle from the pick-up position and transporting the sample receptacle to a second carrier located on the conveyor adjacent the analytical instrument, the second carrier supporting the sample receptacle in an upright orientation;
(i) in the analytical instrument, performing an assay with the aspirated fluid, thereby determining the presence or absence of an analyte in the aspirated fluid; and
(j) transporting the second carrier supporting the sample receptacle on the conveyor to one or more of the plurality of modules other than the analytical instrument.

Embodiment 293. The method of embodiment 292, wherein the first carrier is a puck having a cylindrically shaped base and a pocket formed in a top surface of the base for seating the sample receptacle.

Embodiment 294. The method of embodiment 293, wherein the puck has a plurality of upwardly extending fingers for supporting the sample receptacle in the upright orientation.

Embodiment 295. The method of any one of embodiments 292 to 294, wherein the conveyor comprises a stationary track for supporting the first carrier during step (b).

Embodiment 296. The method of embodiment 295, wherein the first carrier is propelled on the track by a magnetic attraction between the first carrier and the conveyor.

Embodiment 297. The method of any one of embodiments 292 to 296, wherein the analytical instrument is an instrument for performing nucleic acid-based amplification reactions.

Embodiment 298. The method of any one of embodiments 292 to 297, wherein step (c) is performed with a stop element operationally associated with the conveyor, and wherein the stop element is actuated from an open position allowing passage of the first carrier on the conveyor to a closed position during step (c), the stop element immobilizing the first carrier in the closed position.

Embodiment 299. The method of any one of embodiments 292 to 298, wherein the sample receptacle is removed from the first carrier and transported to the pick-up position with a gripper apparatus.

Embodiment 300. The method of any one of embodiments 292 to 299 further comprising the step of determining whether the height and orientation of the sample receptacle is acceptable.

Embodiment 301. The method of any one of embodiments 292 to 300, wherein a receptacle holder supported by a carriage receives the sample receptacle at the pick-up position in step (d).

Embodiment 302. The method of embodiment 301, wherein the pick-position is located outside of a housing of the analytical instrument.

Embodiment 303. The method of embodiment 301 or 302, wherein the carriage transports the sample receptacle from the pick-up position and to the pipetting station in step (d).

Embodiment 304. The method of embodiment 303 further comprising the step of securing the sample receptacle in the carriage as the sample receptacle is transported from the pick-up position to the pipetting station, thereby impeding vertical movement of the sample receptacle.

Embodiment 305. The method of any one of embodiments 292 to 304, wherein the first carrier and the second carrier are the same carrier.

Embodiment 306. The method of any one of embodiments 292 to 305, wherein the assay comprises exposing the sample to reagents and conditions for performing a nucleic acid-based amplification reaction.

The present disclosure has been described and shown in considerable detail with reference to certain illustrative embodiments. Those skilled in the art will readily appreciate that other embodiments and variations and modifications of the disclosed embodiments are encompassed within the scope of the present disclosure. The description of the disclosed embodiments, combinations, and sub-combinations is not intended to convey that the disclosure requires features or combinations of features other than those expressly recited in the claims. Accordingly, the present disclosure is deemed to include all modifications and variations encompassed within the spirit and scope of the following appended claims.

The invention claimed is:

1. A method of delivering a receptacle to an instrument, comprising:
   supporting a receptacle containing a fluid on a carrier;
   transporting the carrier supporting the receptacle on a conveyor extending adjacent to each of a plurality of instruments;
   transferring the receptacle from the carrier to a puck supported on a carriage when the carriage is positioned at a first location;
   moving the carriage with the receptacle seated in the puck from the first location to a second location within an instrument of the plurality of instruments; and
   drawing at least a portion of the fluid from the receptacle seated in the puck into a tip associated with a fluid extraction device of the instrument when the carriage is positioned at the second location.

2. The method of claim 1, further comprising rotating the puck relative to the carriage about a vertical axis of the puck.

3. The method of claim 1, further comprising using a label reader to read information encoded in a machine-readable label on the receptacle seated in the puck when the carriage is positioned at the first location.

4. The method of claim 1, further comprising determining if the receptacle is seated in the puck.

5. The method of claim 4, wherein if it is determined that the receptacle is seated in the puck, then further comprising using a sensing system to detect (a) whether a longitudinal axis of the receptacle seated in the puck is inclined with respect to a vertical axis of the puck, and/or (b) whether the receptacle seated in the puck is inserted to a desired depth.

6. The method of claim 4, wherein the puck comprises a first passageway that extends transverse to and is offset from a vertical axis of the puck, and the carriage comprises a second passageway that extends transverse to and is offset from the vertical axis of the puck, and wherein using the sensing system includes rotating the puck to align the first and second passageways.

7. The method of claim 6, wherein the sensing system comprises a signal emitter and a signal detector, and wherein when the first and second passageways are aligned, the signal detector is configured to receive a signal from the signal emitter through the aligned first and second passageways when a receptacle is not seated in the puck.

8. The method of claim 7, wherein the signal emitter is an optical emitter, the signal detector is an optical detector, and the signal is an optical beam.

9. The method of claim 1, wherein transferring the receptacle from the carrier to the puck is performed with a pick and place device having a plurality of arms for releasably grasping the receptacle.

10. The method of claim 1, wherein moving the carriage comprises operating an electric motor to move the carriage on a rail from the first location to the second location.

11. The method of claim 1, wherein the fluid extraction device is a pipettor.

12. The method of claim 1, further comprising selectively applying a force on the receptacle when the carriage is positioned at the second location, wherein the force is not applied to the receptacle when the carriage is positioned at the first location.

13. The method of claim 1, wherein transferring the receptacle from the carrier to the puck comprises removably supporting the receptacle between a plurality of spring-loaded members of the puck.

* * * * *